(12) United States Patent
Sreekanthan et al.

(10) Patent No.: US 11,842,085 B1
(45) Date of Patent: Dec. 12, 2023

(54) UP-SIZED CLUSTER PERFORMANCE MODELING FOR A TIERED DATA PROCESSING SERVICE

(71) Applicant: Amazon Technologies, Inc., Seattle, WA (US)

(72) Inventors: Induja Sreekanthan, Mountain View, CA (US); Sriram Subramanian, Mountain View, CA (US); Athanasios Papathanasiou, Los Gatos, CA (US); Vijayan Prabhakaran, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,444

(22) Filed: Mar. 31, 2022

(51) Int. Cl.
*G06F 3/06* (2006.01)

(52) U.S. Cl.
CPC ............ *G06F 3/0683* (2013.01); *G06F 3/061* (2013.01); *G06F 3/064* (2013.01); *G06F 3/0647* (2013.01)

(58) Field of Classification Search
CPC ......... G06F 3/064; G06F 3/0647–0649; G06F 3/061; G06F 3/0683
See application file for complete search history.

(56) References Cited

U.S. PATENT DOCUMENTS

| | | | |
|---|---|---|---|
| 8,935,493 B1 | 1/2015 | Dolan | |
| 10,394,611 B2 | 8/2019 | Mallipeddi et al. | |
| 10,579,597 B1 | 3/2020 | Anand | |
| 10,650,017 B1 | 5/2020 | Gupta et al. | |
| 10,817,203 B1 | 10/2020 | Anand et al. | |
| 10,915,498 B2 | 2/2021 | Bhagwat | |
| 11,151,081 B1 | 10/2021 | Anand | |
| 2016/0085696 A1 | 3/2016 | Chiu | |
| 2018/0089259 A1 | 3/2018 | James | |
| 2019/0243783 A1* | 8/2019 | Lewis | ................... G06F 12/121 |
| 2021/0263887 A1 | 8/2021 | Malecki | |
| 2022/0222002 A1 | 7/2022 | Danilov | |

OTHER PUBLICATIONS

U.S. Appl. No. 17/535,940, filed Nov. 26, 2021, Ippokratis Pandis, et al.

(Continued)

*Primary Examiner* — Chie Yew
(74) *Attorney, Agent, or Firm* — Alexander A. Knapp; Kowert, Hood, Munyon, Rankin & Goetzel P.C.

(57) ABSTRACT

Methods for modeling performance of tiered storage of a data processing service given an increase in the storage capacity of a warm storage tier of the tiered storage are disclosed. Buffers in the warm storage tier are used to store data block identifiers corresponding to a set of data blocks that would be stored in the warm storage tier given the increase in storage capacity in addition to those already stored in the warm storage tier. When an incoming query targets a data block that has a corresponding data block identifier in one of the buffers, a hit counter is incremented in order to track the hit rate that would be made on the up-sized warm storage tier. In response to adding the data block targeted by the query to the warm storage tier, one or more evictions from the warm storage tier may additionally be triggered.

20 Claims, 26 Drawing Sheets

(56) References Cited

OTHER PUBLICATIONS

U.S. Appl. No. 17/547,831, filed Dec. 10, 2021, Gaurav Saxena, et al.
U.S. Appl. No. 17/535,446, filed Nov. 24, 2021, Ippokratis Pandis, et al.
U.S. Appl. No. 17/710,459, filed Mar. 31, 2022, Induja Sreekanthan, et al.
U.S. Appl. No. 17/410,476, filed Mar. 31, 2022, Induja Sreekanthan et al.

* cited by examiner

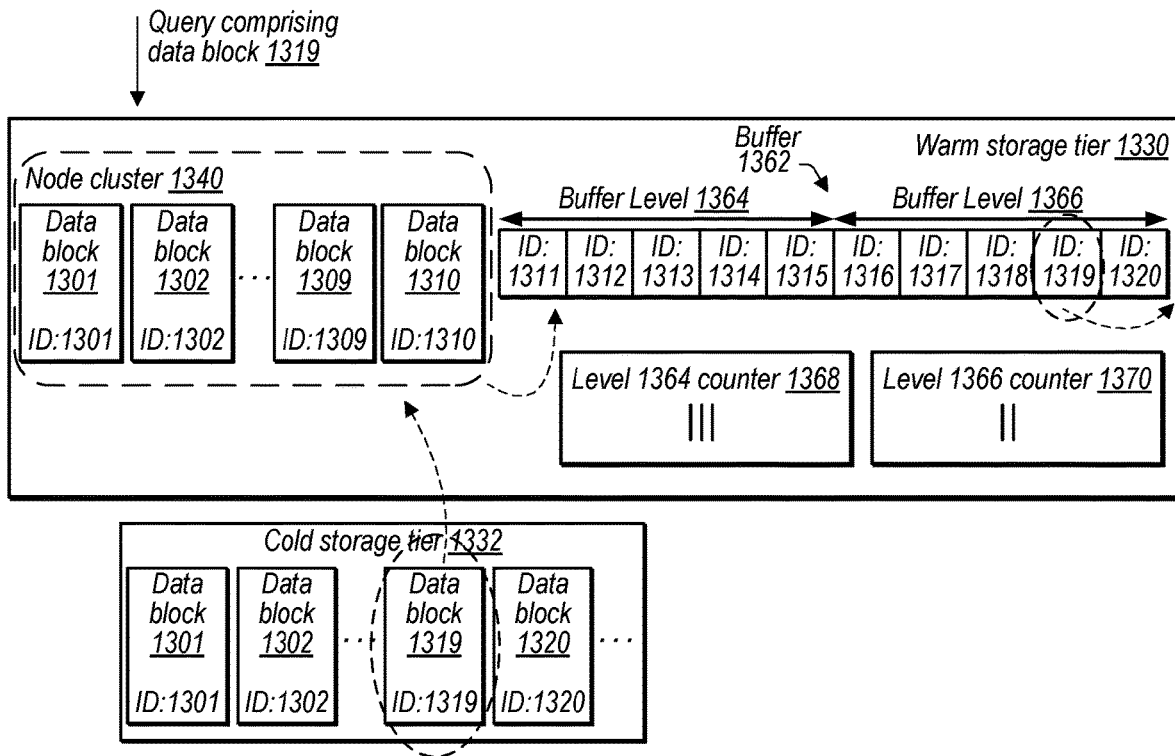
FIG. 13A
FIG. 13B
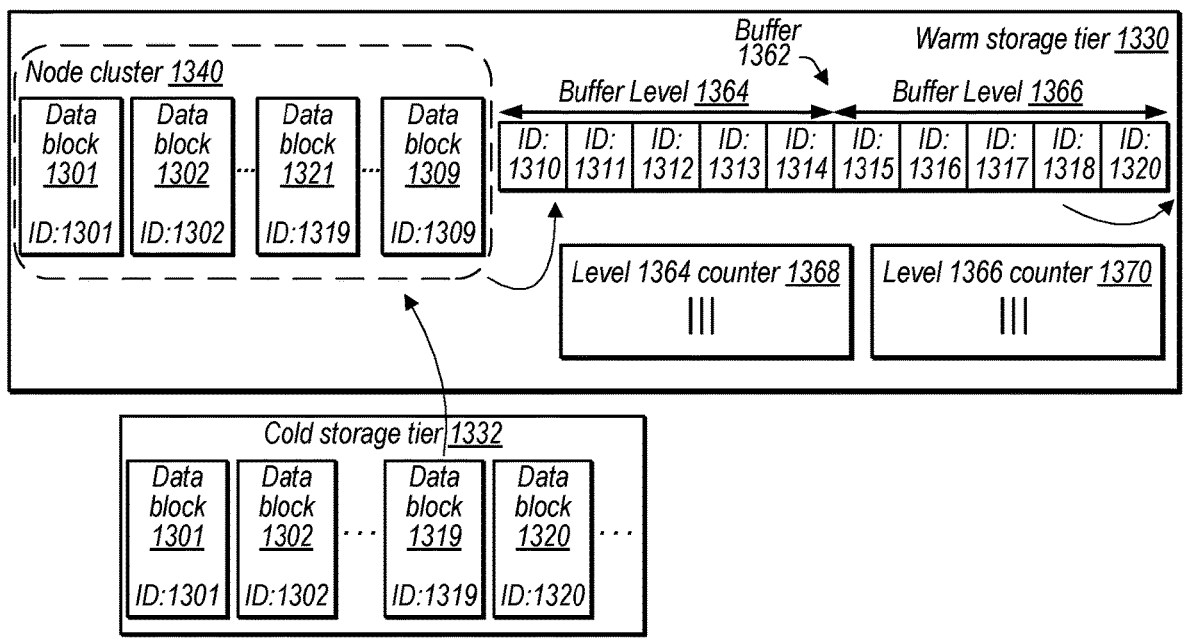

UP-SIZED CLUSTER PERFORMANCE MODELING FOR A TIERED DATA PROCESSING SERVICE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

BRIEF DESCRIPTION OF THE DRAWINGS

FIG. 13A illustrates a sixth example of an incoming query to the data processing service, according to some embodiments.

FIG. 13B illustrates an example of the utilization of the buffer in response to the query of FIG. 13A, according to some embodiments.

Figure 1A:
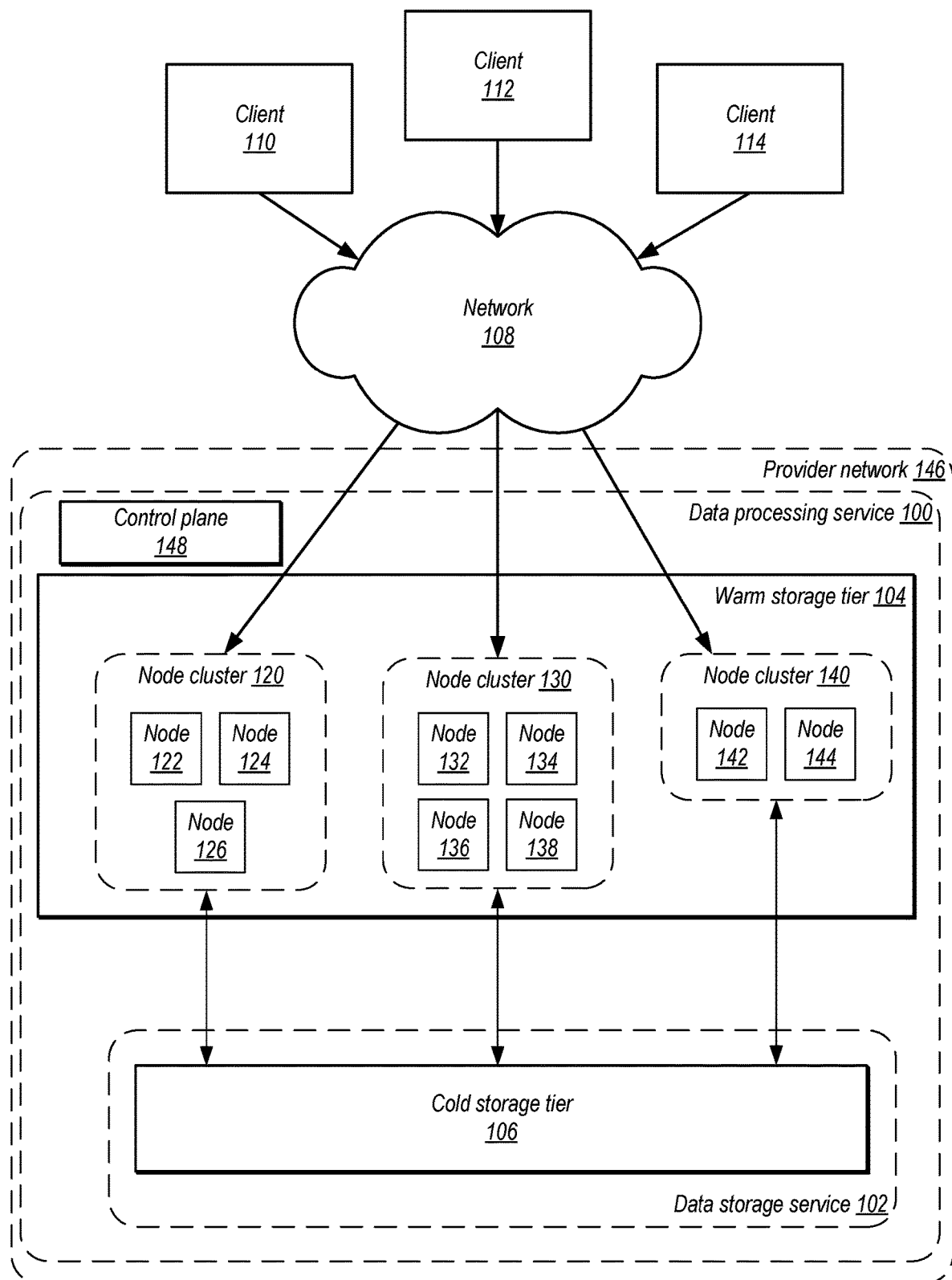
FIG. 1A illustrates a data processing service configured to use warm and cold storage tiers to store data blocks for clients of the data processing service, wherein the warm storage tier comprises one or more node clusters associated with said clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of up-sizing and/or down-sizing prediction and/or thrashing detection and/or thrashing avoidance are described. In some embodiments, a data processing system, which in some embodiments, may implement a database, comprises a plurality of nodes. At least some of the nodes perform front-end computing actions to respond to a query, such as performing query parsing, query planning, query execution, and/or query processing according to a query execution plan. In some embodiments, responding to a query may include accessing a set of data blocks, e.g., a working set. Some queries or types of queries may require working sets that comprise more or fewer data blocks. Also, in addition to different quantities of data blocks, different combinations of data blocks may be needed to respond to different queries. The nodes of a data processing system may additionally include locally attached storage such as hard disk drives, solid-state drives, or other local storage. In some embodiments, locally attached storage may be implemented as block-storage, for example provided to a virtual computing instance from a block-storage service. In some embodiments, respective nodes of the data processing service may be implemented using virtual computing instances, such as virtual machines, with attached block storage. A given user of a data processing service may be provisioned a set of nodes in order to perform queries on behalf of the user. The set of nodes provisioned to the user may form a node cluster and locally attached storage of the nodes included in the node cluster may form a "warm tier" storage. Additionally, not all of the user's data may be required to be stored locally on locally attached storage of the storage nodes. For example, user data that may be used to respond to queries may be stored in a separate data storage service, such as an object-based storage service. The non-local storage provided by the object-based storage service may form a "cold tier." In some embodiments, "cold tier" storage may additionally comprise locally attached storage, or some combination of locally attached and non-local, or remote, storage. Furthermore, user's data may be stored in a plurality of tiers comprising at least the "warm tier" and "cold tier" storage described above, in addition to other storage tiers.

Data blocks may be cached in the warm storage tier and used by the processing portions of the nodes of the node clusters to respond to queries. In some embodiments, authoritative versions of user data may be stored in the cold tier, such as in a data storage service, and may be replicated into the warm tier for query processing. When a capacity of the warm tier to store additional data blocks is reached, the warm storage tier may evict previously cached data blocks. For example, various prioritization schemes may be used to determine which data blocks are to be evicted from warm storage, such as, age in the cache, touch count while in the cache, most recently accessed, and various combinations therefore, amongst others. In some embodiments, a node cluster may include a leader node and a set of one or more processing nodes. Each processing node may cache data blocks and may store metadata used to determine a prioritization of the cached data blocks, wherein the prioritization is further used to determine which data blocks to evict upon the cache reaching full capacity.

Because different queries may implicate different working sets and various prioritization schemes may be used to order cached data bocks for eviction, determining the effects of up-sizing or down-sizing of a node cluster on cache hit performance may not be straight forward. For example, in a first scenario, data blocks stored in a cache of a set of nodes of a node cluster may be "hit" by queries in an evenly distributed manner, in which case increasing a cache size may roughly increase a cache-hit rate in a predictable linear fashion. However, in other scenarios, data blocks stored in a cache may be "hit" in an un-evenly distributed manner. For example, a few highly prioritized data blocks may be hit repeatedly while lower prioritized data blocks are seldom hit by a query. In this case, down-sizing a cache may have little impact on query hit performance because seldom hit data blocks in the currently sized cache would be the ones evicted in a down-sized cache. Because the data blocks in the alternate down-sized scenario are still seldomly targeted by queries, the effects of moving these data blocks out of the cache may be negligible with regard to cache hit performance.

A similar situation takes place with regard to up-sizing a cache of a node cluster. If query hits are highly concentrated with regard to query blocks already stored in the cache, up-sizing the cache may lead to minimal improvements in query performance. However, if working sets implicated by queries submitted by a user are consistently distributed across a working set larger than a capacity of the current cache, up-sizing the cache (e.g., warm tier) to a larger node cluster configuration may provide significant improvement to query hit performance. In some embodiments, the larger node cluster configuration may be implemented via the addition of one or more additional nodes to the node cluster. In other embodiments, the larger node cluster configuration may be implemented via an incremental increase in storage in comparison to the current storage capacity of the node cluster.

In some embodiments, a sizing of a warm tier (e.g., cache) may be at least in part defined based on a number of nodes included in a node cluster. For example, a six-node cluster may have a capacity to store more data bocks in cache (e.g., warm tier) than a four-node cluster, as an example, assuming all else equal. Additionally, in some embodiments, node types may be substituted to alter warm tier capacity. For example, nodes with more locally attached storage may be used.

In some embodiments a buffer may be used to track a hit count of a contemplated re-configured node cluster. For example, on a four-node cluster, a portion of the storages of the nodes of the four-node cluster may be used as one or more buffers for modeling hit rate performance for a six-node cluster. Continuing the example, respective nodes of the four-node cluster may store actual data blocks and data block identifiers for the data blocks stored in the locally attached storage of the nodes of the four-node cluster. The block identifiers may be prioritized based on "heat" and used to determine "cold" data blocks to be evicted from the warm storage tier in order to make additional space available in the warm storage tier to accommodate recently promoted data blocks. Further continuing the example, additional metadata may be stored in the one or more buffers of the nodes of the four-node cluster, wherein the additional metadata comprises a listing of block identifiers for blocks that would have been cached in a six-node cluster (but that are not currently cached in the four-node cluster). Furthermore, the metadata may keep a "hit count" of queries that would have "hit" the block identifiers of the fictional six-node cluster, had the current node cluster been up-sized to a six-node cluster. In some embodiments, this hit count for the up-sized configuration (that has not yet been implemented) may be provided for use in determining a recommendation regarding up-sizing.

For example, an operator of a data processing service may provide a performance recommendation to a user regarding whether or not up-sizing to a larger node cluster will meet customer needs based on the modeled hit count for the up-sized node cluster. In some embodiments, a data processing service may use hit count along with other factors, such as query processing capacity requirements, memory requirements, etc. in order to provide a customer a configuration recommendation for the customer's node cluster. In some embodiments, an automated recommendation engine may provide such recommendation and may further coordinate with a re-scaling module of the data processing service to initiate the re-configuration. In some embodiments, a data processing service may be configured to perform an elastic re-size, in which customer node clusters remain available to respond to queries while being re-sized (either up or down).

In some embodiments, in order to determine a hit count for a down-sized node cluster, a data processing service may maintain one or more counters for partitioned metadata of the nodes of the node clusters. For example, a prioritized list of data block identifiers for data blocks stored on a given node may be partitioned in order to model cache performance for a down-sized node cluster. Taking an example of an eight-node cluster currently implemented and modelling of a down-sized node cluster comprising four nodes, the metadata of each of the eight nodes of the eight-node cluster may be partitioned in half. The full set of metadata of a given node (e.g., both partitions) may comprise data block identifiers (in prioritized order) for data blocks that fit within the capacity of the eight-node cluster. Also, a first half of the metadata (e.g., a first partition) may comprise data block identifiers for only those data blocks that would fit in a warm tier of a down-sized node cluster, such as the four-node cluster. A counter for the first partition may keep track of query hits for data blocks with data block identifiers included in the first partition. A hit count generated via this counter may model a hit rate performance of the down-sized node cluster. Also, in some embodiments, another counter may keep track of query hits in the second partition (or in the full set of metadata). A current hit rate versus a modeled hit rate for a down-sized node cluster may be used to determine a recommendation as to whether it makes sense for a customer to down-size a current node cluster to a smaller node cluster. Also, in some embodiments the hit-rate for the modeled down-sized node cluster, the hit-rate for the current-sized node cluster, and/or a hit-rate for a modeled up-sized node cluster may be used by a recommendation engine to determine a configuration recommendation.

In some embodiments, in addition to, in the alternative to, modeling hit rate performance for upsized and/or down-sized node clusters, a data processing system may detect thrashing of data objects between warm tier storage and cold tier storage and may further implement one or more thrashing mitigation protocols to improve performance. Also, configuration recommendations may further be based on detection of thrashing. In some embodiments, thrashing occurs when a working set size of a working set for a given query or set of queries exceeds a capacity of a warm storage tier to store data blocks. For example, a working set may require 1.2X data blocks to execute and a warm tier of a currently sized node cluster configuration may have a capacity to store X data blocks. Thus, in the process of executing the query data blocks are repeatedly evicted and promoted between the warm storage tier and the cold storage tier.

In some embodiments, in order to detect thrashing, a data processing system may maintain timing information for recently evicted data blocks. For example, a timestamp of a time of eviction may be appended to a data block or metadata for the data block, such as the data block's block identifier. If an elapsed time between eviction and subsequent promotion of the data block is less than a threshold duration, this may indicate thrashing. In some embodiments, in which recently evicted data blocks have block identifiers stored in a warm tier buffer (e.g., for modeling an up-sized configuration) the additional timing metadata may be stored for each block identifier included in the buffer and may be used for detecting thrashing.

In some embodiments, in order to mitigate thrashing, promotion of recently evicted data blocks back to the warm tier storage may be postponed. For example, in some embodiments, recently evicted data blocks may be required to be "hit" by at least a threshold number of queries (e.g., at least two or more) prior to being promoted back to the warm tier storage. For example, a recently evicted data block for which there is still a data block identifier in a buffer (e.g., for modeling an up-sized configuration) may be required to be hit by a second query while still having its block identifier included in the buffer, in order to be eligible to be promoted back to the warm storage tier. In such embodiments, in addition to implementing an overall counter for the buffer (e.g., that models up-sized cache hit rate performance) individual counters may be maintained for block identifiers included in the buffer to track when a threshold number of query hits has been reached in order to make the given data blocks eligible for promotion back to the warm tier storage.

In some embodiments, delayed promotion to warm tier (e.g., requiring at least a threshold number of query hits as described above) may be limited to only data blocks that received a single query hit when last included in the warm tier storage. For example, the warm tier storage metadata may keep track of data blocks that were only hit a single time (that caused the promotion to warm tier storage) and upon eviction of such data blocks, flag the data blocks as "one-hit wonders", which may be flagged using a single data bit in metadata, as an example. Then, the buffer may only apply the delayed promotion criteria to the flagged "one-hit wonder" data blocks. However, in some embodiments, delayed promotion may be applied more generally to all data blocks with block identifiers stored in the buffer and/or even more generally to all data blocks that are not currently cached in the warm storage tier.

In some embodiments, delayed promotion may be initially turned off in a data processing system and may be "turned on" in response to detection of thrashing. Also, in some embodiments a user may be provided an application programmatic interface (API) that enables the user to turn on/off delayed promotion. Also, in some embodiments, a user may be able to use an API to adjust a threshold number of query hits required in a delayed promotion protocol, such as two hits, three hits, etc.

In some embodiments, processing clusters, such as processing clusters 120, 130, and 140, may implement distributed query and other access request processing frameworks to access data in a database hosted by data processing service 100, as discussed in detail below with regard to FIGS. 1A and 1B. Processing clusters may include a leader node to plan and direct execution of requests and compute node(s) to perform various data operations to execute the requests.

Please note that the previous and following description of a data processing service is a logical description and thus is not to be construed as limiting as to the implementation of a data processing service, data storage service, processing clusters, or portions thereof.

This specification continues with a general description of a provider network that implements multiple different services, including a data processing service and storage service, which may implement up-sizing or down-sizing prediction and/or thrashing detection or avoidance for managed databases. Then various examples of the data processing service and storage service, including different components/modules, or arrangements of components/module that may be employed as part of implementing the services are discussed. A number of different methods and techniques to implement up-sizing or down-sizing prediction and/or thrashing detection or avoidance for managed databases are then discussed, some of which are illustrated in accompanying flowcharts. Finally, a description of an example computing system upon which the various components, modules, systems, devices, and/or nodes may be implemented is provided. Various examples are provided throughout the specification.

FIG. 1A illustrates a data processing service configured to use warm and cold storage tiers to store data blocks for clients of the data processing service, wherein the warm storage tier comprises one or more node clusters associated with said clients, according to some embodiments. FIG. 1B illustrates an example of a node cluster performing queries to database data stored locally in a warm tier or remotely in a cold tier, according to some embodiments.

In some embodiments, data processing service 100 may be included in a provider network, such as provider network 146. In some embodiments, provider network 146 may be implemented in a variety of manners, such as a private or closed system or may be set up by an entity such as a company or a public sector organization to provide one or more services (such as various types of cloud-based storage) accessible via the Internet and/or other networks to clients 110-114.

In some embodiments a provider network 146 may be implemented in a single location or may include numerous data centers hosting various resource pools, such as collections of physical and/or virtualized computer servers, storage devices, networking equipment and the like (e.g., computing system 2400 described below with regard to FIG. 24), needed to implement and distribute the infrastructure and storage services offered by the provider network 146. The provider network 146 can be formed as a number of regions, where a region is a separate geographical area in which the cloud provider clusters data centers. Each region can include two or more availability zones connected to one another via a private high-speed network, for example a fiber communication connection.

An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time.

Customers can connect to availability zones of the provider network 146 via a publicly accessible network (e.g., the Internet, a cellular communication network). Regions are connected to a global network which includes private networking infrastructure (e.g., fiber connections controlled by the cloud provider) connecting each region to at least one other region. The provider network 146 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 146 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 146 may implement various computing resources or services, such as database service(s), (e.g., relational database services (such as data processing service 100), non-relational database services, a map reduce service, a data warehouse service (such as data processing service 100), and/or other large scale data processing services or various other types database services), data storage services, such as data storage service 102 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in various ones of the figures may be implemented directly within computer hardware, as instructions directly or indirectly executable by computer hardware (e.g., a microprocessor or computer system), or using a combination of these techniques. For example, the components of shown in FIGS. 1A and 1B may be implemented by a system that includes a number of computing nodes (or simply, nodes), each of which may be similar to the computer system embodiment illustrated in FIG. 24 and described below. In various embodiments, the functionality of a given system or service component (e.g., a component of data processing service 100 or data storage service 102) may be implemented by a particular node or may be distributed across several nodes. In some embodiments, a given node may implement the functionality of more than one service system component (e.g., more than one data store component).

Data processing services 100 may be various types of data processing services that perform general or specialized data processing functions (e.g., anomaly detection, machine learning, data mining, big data querying, or any other type of data processing operation). For example, in at least some embodiments, data processing services 100 may include a map reduce service that creates clusters of processing nodes that implement map reduce functionality over data stored in the map reduce cluster as well as data stored in data storage service 102. In another example, data processing service 100 may include various types of database services (both relational and non-relational) for storing, querying, and updating data. Such services may be enterprise-class database systems that are highly scalable and extensible. Queries may be directed to a database in data processing service 100 that is distributed across multiple physical resources, and the data processing system may be scaled up or down on an as needed basis.

Data processing service 100 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service 100 may implement, in some embodiments, a data warehouse service, that utilizes another data processing service, to execute portions of queries or other access requests with respect to data that is stored in a remote data store, such as data storage service(s) 102 (or a data store external to provider network 146) to implement distributed data processing for distributed data sets.

In at least some embodiments, data processing service 100 may be a data warehouse service. Thus, in the description that follows data processing service 100 may be discussed according to the various features or components that may be implemented as part of a data warehouse service, including a control plane, such as control plane 148, and processing node clusters 120, 130, and 140. Note that such features or components may also be implemented in a similar fashion for other types of data processing services and thus the following examples may be applicable to other types of data processing services, such as database services. Data processing service 100 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where data processing service 100 is a data warehouse service, the data warehouse service may offer clients a variety of different data management services, according to their various needs. In some cases, clients may wish to store and maintain large amounts of data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data processing service 100 may be implemented by a large collection of computing devices, such as customized or off-the-shelf computing systems, servers, or any other combination of computing systems or devices, such as the various types of systems 2400 described below with regard to FIG. 24. Different subsets of these computing devices may be controlled by a control plane of the data processing service 100. Control plane 148, for example, may provide a cluster control interface to clients or users who wish to interact with the processing clusters, such as node cluster(s) 120, 130, and 140 managed by control plane 148. For example, control plane 148 may generate one or more graphical user interfaces (GUIs) for clients, which may then be utilized to select various control functions offered by the control interface for the processing clusters 120, 130, and 140 hosted in the data processing service 100. Control plane 148 may provide or implement access to various metrics collected for the performance of different features of data processing service 100, including processing cluster performance, in some embodiments.

As discussed above, various clients (or customers, organizations, entities, or users) may wish to store and manage data using a data processing service 100. Processing clusters 120, 130, and 140 may respond to various requests, including write/update/store requests (e.g., to write data into storage) or queries for data (e.g., such as a Server Query Language request (SQL) for particular data). For example, multiple users or clients may access a processing cluster to obtain data warehouse services.

Processing clusters, such as node clusters 120, 130, and 140, hosted by data processing service 100 may provide an enterprise-class database query and management system that allows users to send data processing requests to be executed by the clusters, such as by sending a query. Processing clusters 120, 130, and 140 may perform data processing operations with respect to data stored locally in a processing cluster, as well as remotely stored data. For example, data storage service 102 implemented by provider network 146 that stores remote data, such as cold storage tier 106, which may comprise backups or other data of a database stored in a cluster. In some embodiments, database data may not be stored locally in a processing cluster 120, 130, or 140 but instead may be stored in data storage service 102 (e.g., with data being partially or temporarily stored in processing cluster 120, 130, or 140 to perform queries). Queries sent to a processing cluster 120, 130, or 140 (or routed/redirect/ assigned/allocated to processing cluster(s)) may be directed to local data stored in the processing cluster and/or remote data. Therefore, processing clusters may implement local data processing, such as local data processing, to plan and execute the performance of queries with respect to local data in the processing cluster, as well as a remote data processing client.

Data processing service 100 may implement different types or configurations of processing clusters. For example, different configurations 120, 130, or 140, may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations of processing cluster 120, 130, 140, etc. may offer different execution times. As shown in FIG. 1A, node cluster 120 comprises nodes 122, 124, and 126, node cluster 130 comprises nodes 132, 134, 136, and 138, and node cluster 140 comprises node 142 and 144. Different configurations of processing clusters may be maintained in different pools of available processing clusters to be attached to a database. Attached processing clusters may then be made exclusively assigned or allocated for the use of performing queries to the attached database, in some embodiments. The number of processing clusters attached to a database may change over time according to the selection techniques discussed below.

In some embodiments, data processing service 100 may have at least one processing cluster attached to a database, which may be the "primary cluster." Primary clusters may be reserved, allocated, permanent, or otherwise dedicated processing resources that store and/or provide access to a database for a client, in some embodiments. Primary clusters, however, may be changed. For example, a different processing cluster may be attached to a database and then designated as the primary database (e.g., allowing an old primary cluster to still be used as a "secondary" processing cluster or released to a pool of processing clusters made available to be attached to a different database). Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary cluster. Control plane 148 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored separate from data processing service 100 in data storage service 102, in some embodiments. For example, a leader node, or other processing cluster component, may implement a backup agent or system that creates and store database backups for a database to be stored as database data in data storage service 102. Database data may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data may be maintained in some embodiments, so that the latest database data may, for instance, be obtained by a processing cluster in order to perform queries. In at least some embodiments, database data (e.g., cold storage tier 106 data) may be treated as the authoritative version of data, and data stored in processing clusters 120, 130, and 140 for local processing (e.g., warm storage tier 104) as a cached version of data.

Data storage service 102 may implement different types of data stores for storing, accessing, and managing data on behalf of clients 110, 112, 114, etc. as a network-based service that enables clients 110, 112, 114, etc. to operate a data storage system in a cloud or network computing environment. Data storage service(s) 102 may also include various kinds of object or file data stores for putting, updating, and getting data objects or files. For example, one data storage service 102 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 102 may be treated as a data lake. For example, an organization may generate many different kinds of data, stored in one or multiple collections of data objects in a data storage service 102. The data objects in the collection may include related or homogenous data objects, such as database partitions of sales data, as well as unrelated or heterogeneous data objects, such as audio files and web site log files. Data storage service(s) 102 may be accessed via programmatic interfaces (e.g., APIs) or graphical user interfaces. For example, format independent data processing service 100 may access data objects stored in data storage services via the programmatic interfaces.

Generally speaking, clients 110, 112, 114, etc. may encompass any type of client that can submit network-based requests to provider network 146 via network 108, including requests for storage services (e.g., a request to query a data processing service 100, or a request to create, read, write, obtain, or modify data in data storage service(s) 102, etc.). For example, a given client 110 may include a suitable version of a web browser, or may include a plug-in module or other type of code module that can execute as an extension to or within an execution environment provided by a web browser. Alternatively, a given client 110 may encompass an application such as a database application (or user interface thereof), a media application, an office application or any other application that may make use of data processing service(s) 100 or storage resources in data storage service(s) 102 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, a given client 110 may be an application that can interact directly with provider network 146. In some embodiments, client 110 may generate network-based services requests according to a Representational State Transfer (REST)-style network-based services architecture, a document- or message-based network-based services architecture, or another suitable network-based services architecture.

In some embodiments, a client 110, 112, 114, etc. may provide access to provider network 146 to other applications in a manner that is transparent to those applications. For example, a given client 110 may integrate with an operating system or file system to provide storage on one of data storage service(s) 102 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 102 may be coordinated by client 110 and the operating system or file system on behalf of applications executing within the operating system environment. Similarly, a client 110, 112, 114, etc. may be an analytics application that relies upon data processing service(s) 100 to execute various queries for data already ingested or stored in the data processing service (e.g., such as data maintained in a data warehouse service).

Clients 110, 112, 114, etc. may convey network-based services requests (e.g., access requests to read or write data may be directed to data in data storage service(s) 102, or operations, tasks, or jobs, such as queries, being performed as part of data processing service(s) 100) to and receive responses from provider network 146 via network 108. In various embodiments, network 108 may encompass any suitable combination of networking hardware and protocols necessary to establish network-based-based communications between clients 110, 112, 114, etc. and provider network 146. For example, network 146 may generally encompass the various telecommunications networks and service providers that collectively implement the Internet. Network 146 may also include private networks such as local area networks (LANs) or wide area networks (WANs) as well as public or private wireless networks. For example, both a given client 110 and provider network 146 may be respectively provisioned within enterprises having their own internal networks. In such an embodiment, network 146 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and provider network 146. It is noted that in some embodiments, clients 110, 112, 114, etc. may communicate with provider network 146 using a private network rather than the public Internet. In some embodiments, clients of data processing services 100 and/or data storage service(s) 102 may be implemented within provider network 146 (e.g., an application hosted on a virtual computing resource that utilizes a data processing service 100 to perform database queries) to implement various application features or functions and thus various features of client(s) 110, 112, 114, etc. discussed above may be applicable to such internal clients as well.

Figure 1B:
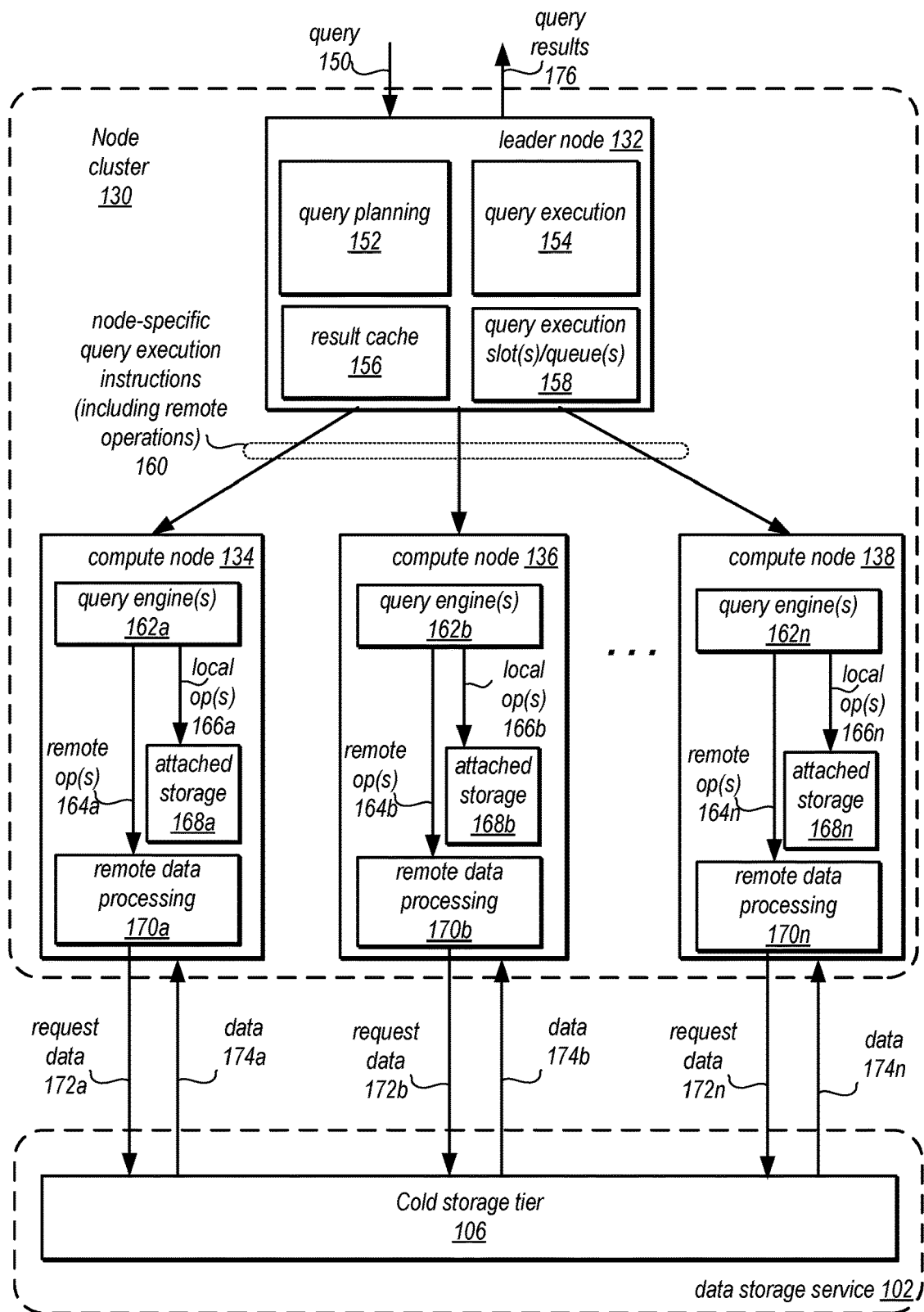
FIG. 1B illustrates an example of a node cluster performing queries to database data stored locally in a warm tier or remotely in a cold tier, according to some embodiments.

FIG. 1B is a logical block diagram illustrating an example of a processing cluster performing queries to database data, according to some embodiments. As illustrated in this example, a processing node cluster 130 may include a leader node 132 and compute nodes 134, 136, 138, etc., which may communicate with each other over an interconnect (not illustrated). Leader node 132 may implement query planning 152 to generate query plan(s), query execution 154 for executing queries on processing node cluster 130 that perform data processing that can utilize remote query processing resources for remotely stored data (e.g., by utilizing one or more query execution slot(s)/queue(s) 158). As described herein, each node in a primary processing cluster 130 may include attached storage, such as attached storage 168a, 168b, and 168n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 130 is a leader node as illustrated in FIG. 1B, but rather different nodes of the nodes in processing cluster 130 may act as a leader node or otherwise direct processing of queries to data stored in processing cluster 130. While nodes of processing cluster may be implemented on separate systems or devices, in at least some embodiments, some or all of processing cluster may be implemented as separate virtual nodes or instance on the same underlying hardware system (e.g., on a same server).

Leader node 132 may manage communications with clients, such as clients 110, 112, and 114 discussed above with regard to FIG. 1B. Leader node 132 may receive query 150 and return query results 176 to clients 110, 112, 114, etc. or to a proxy service (instead of communicating directly with a client application).

Leader node 132 may be a node that receives a query 150 from various client programs (e.g., applications) and/or subscribers (users) (either directly or routed to leader node 132 from a proxy service), then parses them and develops an execution plan (e.g., query plan(s)) to carry out the associated database operation(s)). More specifically, leader node 132 may develop the series of steps necessary to obtain results for the query. Query 150 may be directed to data that is stored both locally within a warm tier implementing using local storage of processing cluster 130 (e.g., at one or more of compute nodes 134, 136, or 138) and data stored remotely, such as in cold storage tier 106 of data storage service 102. Leader node 132 may also manage the communications among compute nodes 134, 136, and 138 instructed to carry out database operations for data stored in the processing cluster 130. For example, node-specific query instructions 160 may be generated or compiled code by query execution 154 that is distributed by leader node 132 to various ones of the compute nodes 134, 136, and 138 to carry out the steps needed to perform query 150, including executing the code to generate intermediate results of query 150 at individual compute nodes may be sent back to the leader node 132. Leader node 132 may receive data and query responses or results from compute nodes 134, 136, and 138 in order to determine a final result 176 for query 150.

A database schema, data format and/or other metadata information for the data stored among the compute nodes, such as the data tables stored in the cluster, may be managed and stored by leader node 132. Query planning 152 may account for remotely stored data by generating node-specific query instructions that include remote operations to be directed by individual compute node(s). Although not illustrated, in some embodiments, a leader node may implement burst manager to send a query plan generated by query planning 152 to be performed at another attached processing cluster and return results received from the burst processing cluster to a client as part of results 176.

In at least some embodiments, a result cache 156 may be implemented as part of leader node 132. For example, as query results are generated, the results may also be stored in result cache 156 (or pointers to storage locations that store the results either in primary processing cluster 130 or in external storage locations), in some embodiments. Result cache 156 may be used instead of other processing cluster capacity, in some embodiments, by recognizing queries which would otherwise be sent to another attached processing cluster to be performed that have results stored in result cache 156. Various caching strategies (e.g., LRU, FIFO, etc.) for result cache 156 may be implemented, in some embodiments. Although not illustrated in FIG. 1B, result cache 156 could be stored in other storage systems (e.g., other storage services, such as a NoSQL database) and/or could store sub-query results.

Processing node cluster 130 may also include compute nodes, such as compute nodes 134, 136, and 138. Compute nodes, may for example, be implemented on servers or other computing devices, such as those described below with regard to computer system 2400 in FIG. 24, and each may include individual query processing "slices" defined, for example, for each core of a server's multi-core processor, one or more query processing engine(s), such as query engine(s) 162a, 162b, and 164n, to execute the instructions 160 or otherwise perform the portions of the query plan assigned to the compute node. Query engine(s) 162 may access a certain memory and disk space in order to process a portion of the workload for a query (or other database operation) that is sent to one or more of the compute nodes 134, 136, or 138. Query engine 162 may access attached storage, such as 168a, 168b, and 168n, to perform local operation(s), such as local operations 166a, 166b, and 166n. For example, query engine 162 may scan data in attached storage 168, access indexes, perform joins, semi joins, aggregations, or any other processing operation assigned to the compute node 134, 136, or 138.

Query engine 162a may also direct the execution of remote data processing operations, by providing remote operation(s), such as remote operations 164a, 164b, and 164n, to remote data processing clients, such as remote data processing client 170a, 170b, and 170n. Remote data processing clients 170 may be implemented by a client library, plugin, driver or other component that sends request subqueries to be performed by data storage service 102 or requests to for data, 172a, 172b, and 172n. As noted above, in some embodiments, Remote data processing clients 170 may read, process, or otherwise obtain data 174a, 174b, and 174n, in response from cold storage tier 106 in data storage service 102, which may further process, combine, and or include them with results of location operations 166.

Compute nodes 134, 136, and 138 may send intermediate results from queries back to leader node 132 for final result generation (e.g., combining, aggregating, modifying, joining, etc.). Remote data processing clients 170 may retry data requests 172 that do not return within a retry threshold.

Attached storage 168 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column-oriented data formats or other data formats).

Although FIGS. 1A and 1B have been described and illustrated in the context of a provider network implementing a database service, like a data warehousing service, the various components illustrated and described in FIGS. 1A and 1B may be easily applied to other database services that can utilize query hit rate prediction for up-sized or down-sized node clusters and/or techniques as described herein for detection of thrashing and avoidance of caching blocks that are only used once and then evicted. As such, FIGS. 1A and 1B are not intended to be limiting as to other embodiments of up-sizing or down-sizing prediction and/or thrashing detection or avoidance for managed databases.

Figure 2:
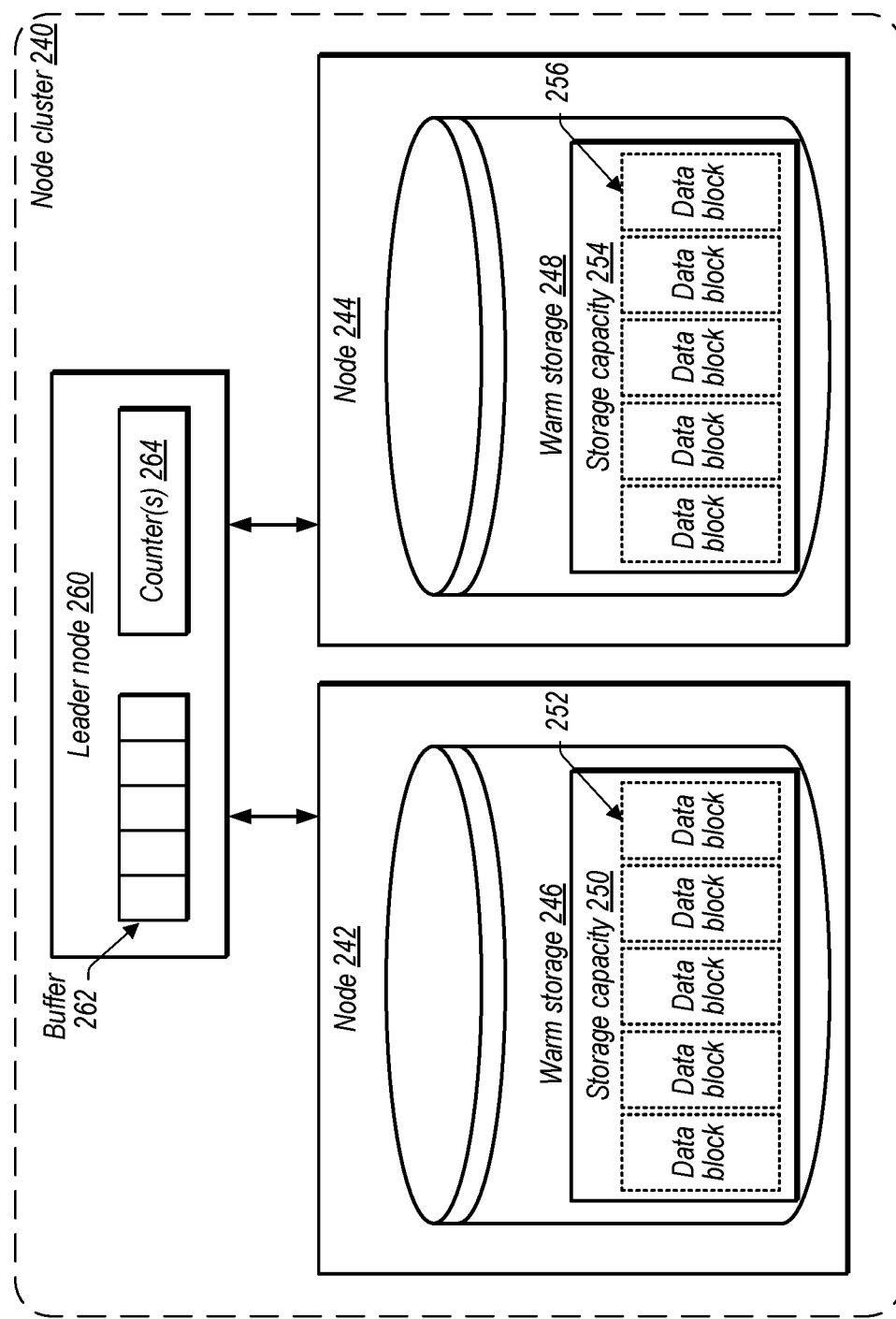
FIG. 2 illustrates two nodes of a given node cluster of the warm storage tier, wherein a buffer associated to a node cluster re-size is located in a leader node of the node cluster, according to some embodiments.

FIG. 2 illustrates two nodes of a given node cluster of the warm storage tier, wherein a buffer associated to a node cluster re-size is located in a leader node of the node cluster, according to some embodiments.

In some embodiments, a node cluster such as node cluster 240 may comprise a leader node, such as leader node 260, and one or more nodes of the node cluster, such as node 242 and node 244. Node cluster 240 may resemble node clusters 120, 130, and 140 and the functionalities of node clusters described for FIGS. 1A and 1B herein. For example, leader node 260 may comprise some or all of the elements and functionalities described herein for leader node 132, in addition to a buffer, such as buffer 262, and one or more counters, such as counter(s) 264, according to some embodiments. Nodes of the cluster, such as node 242 and node 244 may be configured with warm storage 246 and warm storage 248, respectively, that each have the potential capacity to store a given number of data blocks, as seen by storage capacity 250 and storage capacity 254, respectively. In some embodiments, warm storage 246 and 248 is implemented using attached storage of the nodes 242 and 244, such as attached storage 168 as shown in FIG. 1B. In some embodiments, the attached storage may include a hard disk drive, solid-state drive, or other storage device that is locally attached to a computing portion of the node. For example, in some embodiments, a node may include processors, memory, and one or more storage devices mounted together in a same chassis or in adjacent chassis. Labels 252 and 256 mark example potential storage locations, denoted by dotted lines, which may be used to store a data block at a given point or moment, according to some embodiments.

Buffer 262 has a capacity to store a given number of data block identifiers that correspond to an additional set of data blocks with regard to the data blocks that may already be stored in storage capacity 250 and storage capacity 254. In some embodiments, buffer 262 is located in the leader node of the given node cluster. Additional detail on buffers such as buffer 262 may be found in the description for FIG. 4, herein.

Counter(s) 264 may comprise one or more counters associated to tracking the number of times a query and/or request comprises a data block currently located in storage capacity 250 or storage capacity 254, tracking the number of times a query comprises a data block identifier currently located in buffer 262, or some combination of such counters. Examples of counters that may be comprised within counter(s) 264 may be found in the descriptions for at least FIGS. 4, 17A, 17B, and 17C.

Figure 3:
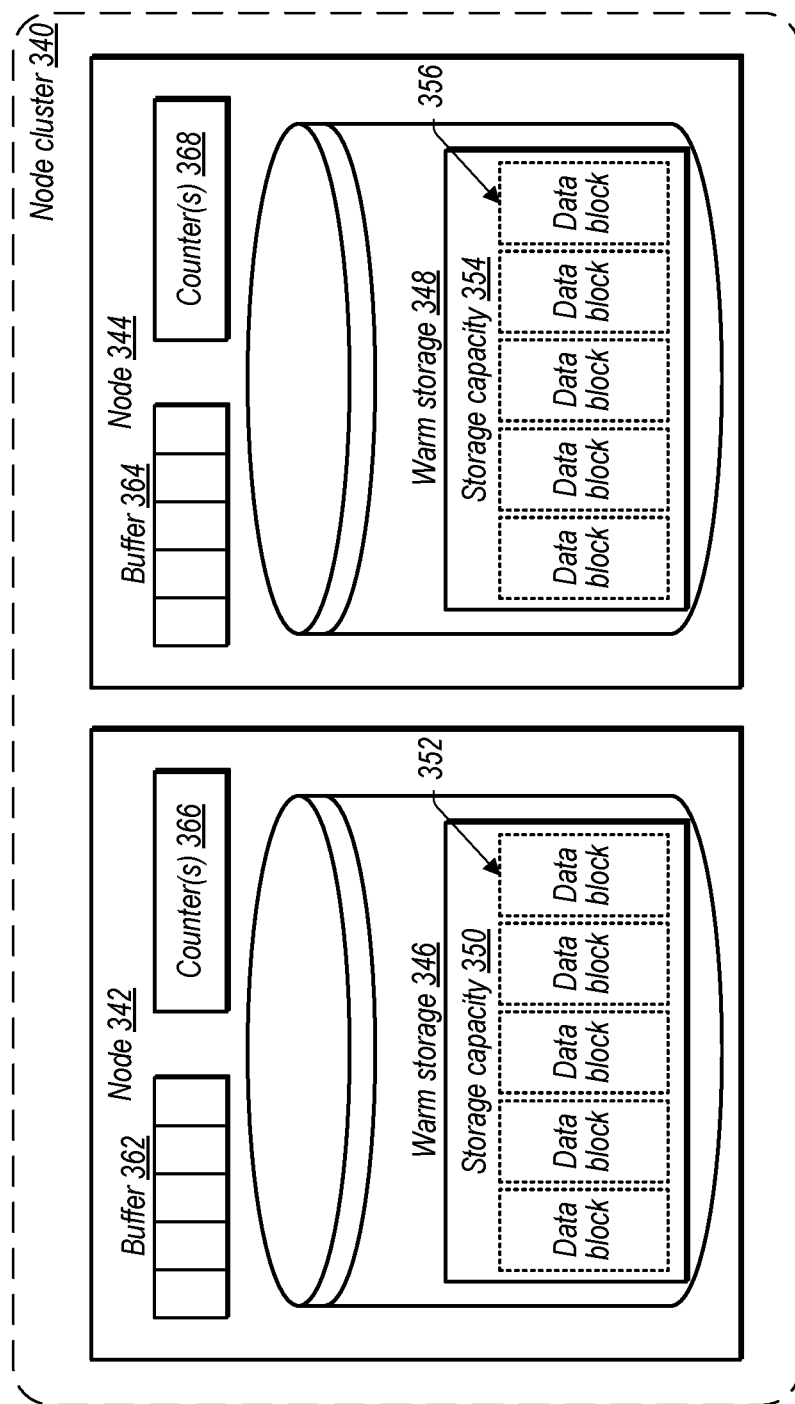
FIG. 3 illustrates two nodes of a given node cluster of the warm storage tier, wherein buffers associated to a node cluster re-size are located in the respective nodes of the node cluster, according to some embodiments.

FIG. 3 illustrates two nodes of a given node cluster of the warm storage tier, wherein buffers associated to a node cluster re-size are located in the respective nodes of the node cluster, according to some embodiments.

In some embodiments, one or more buffers and one or more counters of a given node cluster, such as buffers 362 and 364 and counter(s) 364 and 368 of node cluster 340, may be located in nodes of the node cluster, or otherwise outside of a leader node of a node cluster. In the embodiments shown in FIG. 3, buffer 362 and counter(s) 366 are located in node 342, and buffer 364 and counter(s) 368 are located in node 344. Such embodiments may include configurations in which no leader node of a given node cluster is present, or in which a leader node does not store buffer or counters.

In FIG. 3, warm storage 346 and warm storage 348 may be implemented according to the embodiments described herein for warm storage 246 and warm storage 248. Warm storage 346 may have a given storage capacity, such as storage capacity 350, to store one or more data blocks, and warm storage 348 may similarly have a given storage capacity, such as storage capacity 356, to store one or more data blocks. Examples of potential locations for storage of data blocks within warm storage 346 and 348 are shown with labels 352 and 356, respectively.

Figure 4:
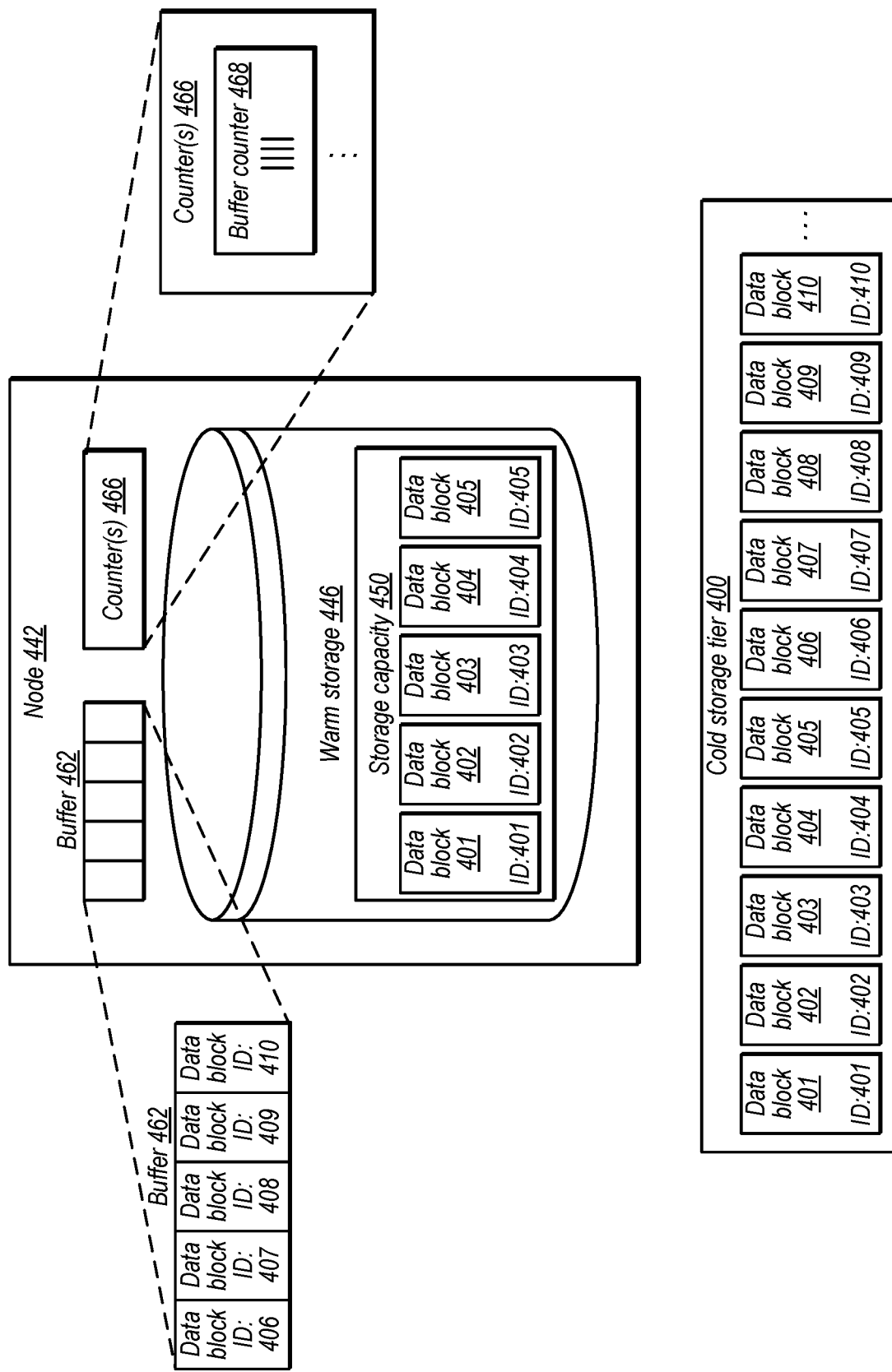
FIG. 4 illustrates a given node of a node cluster of the warm storage tier, wherein a buffer is configured to store additional data block identifiers for a re-sized node cluster configuration, and a buffer counter counts the number of times the additional data block identifiers are referenced in one or more queries to the data processing service, according to some embodiments.

FIG. 4 illustrates a given node of a node cluster of the warm storage tier, wherein a buffer is configured to store additional data block identifiers for a re-sized node cluster configuration, and a buffer counter counts the number of times the additional data block identifiers are referenced in one or more queries to the data processing service, according to some embodiments.

In some embodiments, a given node of a node cluster, such as node 442, may comprise a buffer, such as buffer 462, one or more counters, such as counter(s) 466, and warm storage, such as warm storage 446. Warm storage 446 may comprise a given storage capacity, such as storage capacity 450, which may be configured to store a given number of data blocks. Cold storage tier 400 is also configured to store at least data blocks 401, 402, 403, 404, 405, 406, 407, 408, 409, and 410, in addition to other data blocks that may be associated with the given client associated to node 442, according to some embodiments. For example, client 110, 112, or 114 may use the data processing service to store their data in cold storage tier 400, and the given client may additionally have a node cluster that comprises node 442, according to some embodiments. In at least some embodiments, the data blocks stored in cold storage tier 400 may be treated as the authoritative version of data, and the corresponding data blocks stored in storage capacity 450 may be treated for local processing as the cached version of said data blocks.

In the embodiments shown in FIG. 4, warm storage 446 is currently storing data blocks 401, 402, 403, 404, and 405, and buffer 462 is currently storing data block identifiers of five additional data blocks that correspond to data blocks currently stored in cold storage tier 400, namely data block IDs 406, 407, 408, 409, and 410.

In some embodiments, counter(s) 466 comprises at least buffer counter 468. Buffer counter 468 may be incremented when a query comprises at least a data block with the corresponding data block ID in buffer 462. In the example shown in FIG. 4, buffer counter 468 has been incremented four times, which corresponds to at least four times that one or more data block IDs stored in buffer 462 have been referenced in one or more queries.

Figure 5:
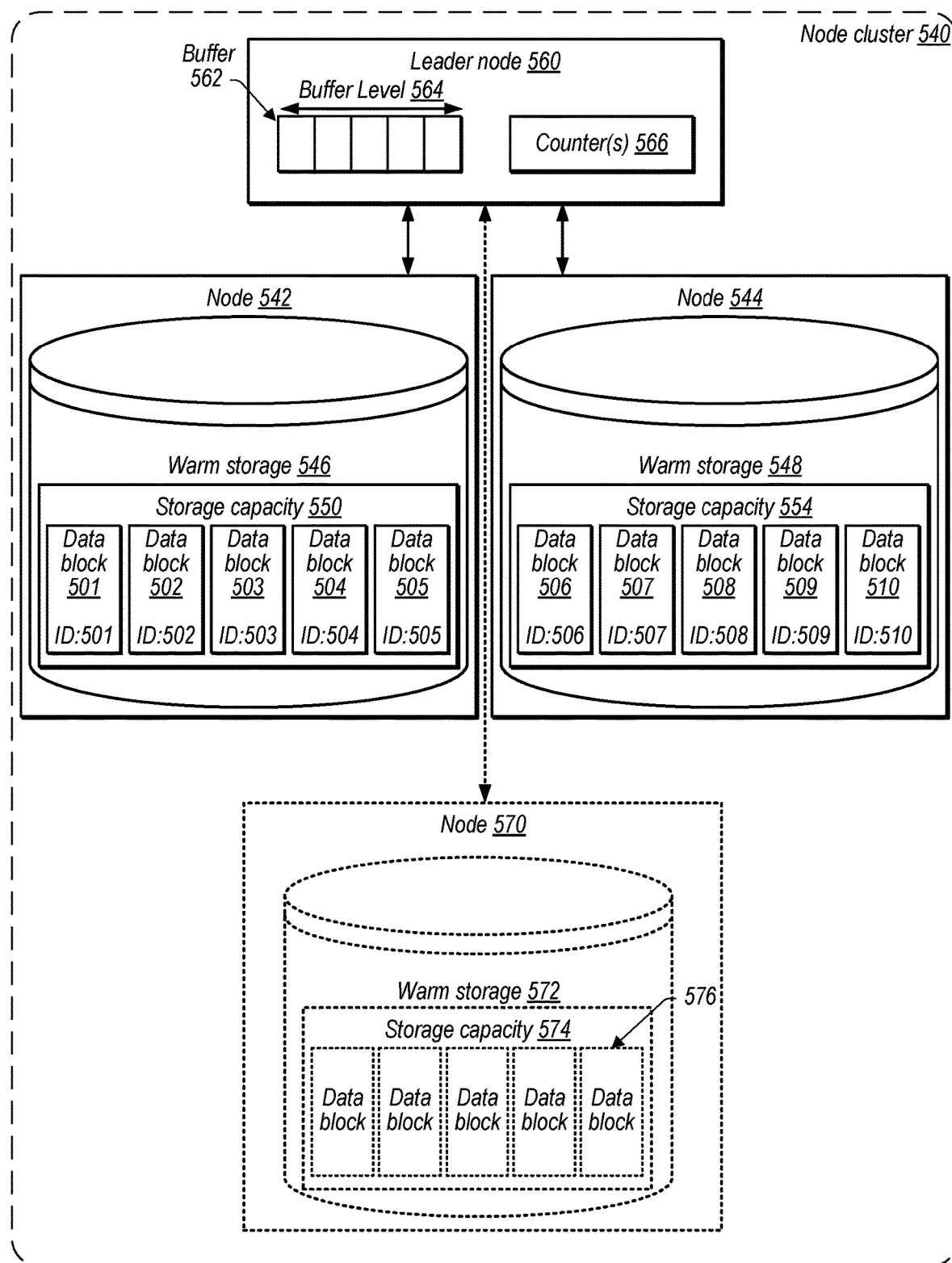
FIG. 5 illustrates a correlation between the number of additional data block identifiers that a buffer may store and the projected storage capacity of a given node cluster re-size configuration, according to some embodiments.

Examples of Using Buffers to Track Performance of a Node Cluster Given a Node Cluster Re-Size that Increases the Storage Capacity of the Given Node Cluster FIG. 5 illustrates a correlation between the number of additional data block identifiers that a buffer may store and the projected storage capacity of a given node cluster re-size configuration, according to some embodiments.

FIG. 5 depicts embodiments of a given node cluster 540 that currently comprises two nodes: node 542 and node 544. In the given embodiments shown in FIG. 5, buffer 562 and counter(s) 566 are located in leader node 560. However, as described above with regard to FIG. 2 and FIG. 3, these components may be located in a given leader node or in respective nodes of the node cluster, according to some embodiments. Node 542 may have warm storage, such as warm storage 546, with a given storage capacity 550. Node 544 may also have warm storage, such as warm storage 548, with a given storage capacity 554. In the embodiments shown in FIG. 5, storage capacity 550 comprises data blocks 501, 502, 503, 504, and 505, and storage capacity 554 comprises data clocks 506, 507, 508, 509, and 510.

In the embodiments shown in FIG. 5, warm storage 546 and warm storage 568 have the combined potential to store (and are currently storing, in the example shown in FIG. 5) ten data blocks. Buffer 562 comprises five locations to store a maximum of five additional data block identifiers, besides those already stored in warm storage 546 and warm storage 568. In such embodiments, the size of buffer 562 corresponds to a hypothetical situation in which node cluster 540 comprised a third node of the same node type as node 542 and node 544, with the same storage capacity as either storage capacity 550 or 554, in addition to the already existing nodes 542 and 544. In such a situation, given node cluster 540 would have the potential to store fifteen data blocks instead of the current ten, as shown by storage capacity 574 in warm storage 572 of a potential third node 570 in which label 576 points to five additional locations for data block storage.

In the methods and techniques described herein, buffers, such as buffer 562, may be used make such a correlation with respective node clusters described in the figures herein. A buffer may represent a new maximum storage capacity of a respective node cluster, given a node cluster re-size that corresponds to the number of potential data block identifiers (e.g., given that a two-node node cluster may store five total data blocks in each of the two nodes, a buffer with five potential data block identifier locations may be used to consider the hypothetical situation in which the two-node node cluster was re-sized to a three-node node cluster). In some embodiments, the use of a buffer to understand the potential usefulness of a node cluster re-size may be advantageous to clients of the data processing service, as described herein.

In the embodiments shown in FIG. 5, buffer 562 has buffer level 564, which indicates that the five locations for potential data block identifier storage in buffer 562 may correspond to additional storage in the given node cluster re-size that is the same size as storage capacity 574, given that node cluster 540 were re-sized to a three-node node cluster that incorporates node 570. An example of the use of two buffer levels to track two potential node cluster re-sizes is described in FIG. 7. This may be referred to as a multilevel buffer, according to some embodiment.

Figure 6:
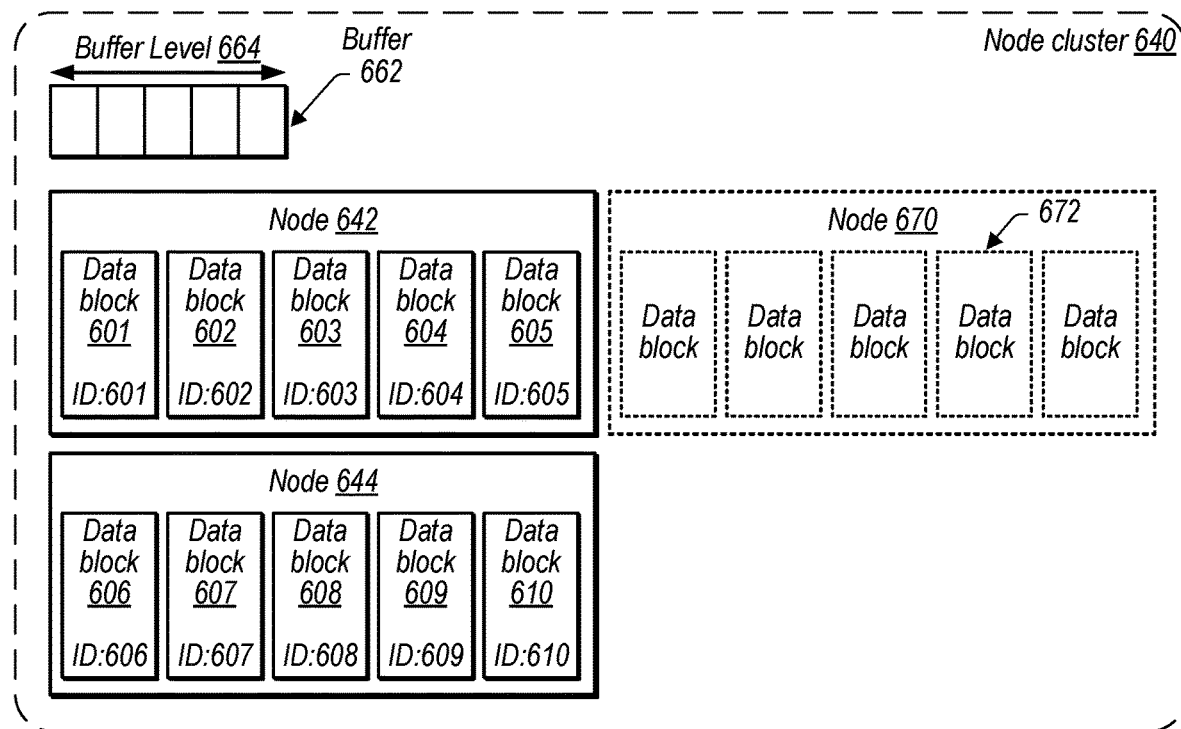
FIG. 6 illustrates that the given number of additional data block identifiers that the buffer in the figure may store corresponds to a given node cluster re-size to a three-node cluster instead of the current two-node cluster, according to some embodiments.

FIG. 6 illustrates that the given number of additional data block identifiers that the buffer in the figure may store corresponds to a given node cluster re-size to a three-node cluster instead of the current two-node cluster, according to some embodiments.

FIG. 6 further clarifies the correlation described in FIG. 5, in which node cluster 640, currently comprising node 642 and node 644, may additionally comprise node 670 if node cluster 640 were to be re-sized from a two-node node cluster to a three-node node cluster, as denoted by the dotted lines for node 670. In the embodiments shown in FIG. 6, node 642 is currently storing five data blocks, namely data blocks 601, 602, 603, 604, and 605, and node 644 is currently storing five data blocks, namely data blocks 606, 607, 608, 609, and 610. If node cluster 640 were to be re-sized to incorporate node 670, five additional data block storage locations could be used in the node cluster in the scenario of FIG. 6, as shown by label 672. Buffer 662, therefore, comprises five data block identifier storage locations, corresponding to the potential extra storage capacity that would be made available to node cluster 640 via node 670 if the node cluster were to be re-sized. Buffer 662 has one level, such as buffer level 664, to represent that the five data block identifier storage locations of buffer 662 correspond to a potential node cluster re-size from a two-node node cluster to a three-node node cluster.

Figure 7:
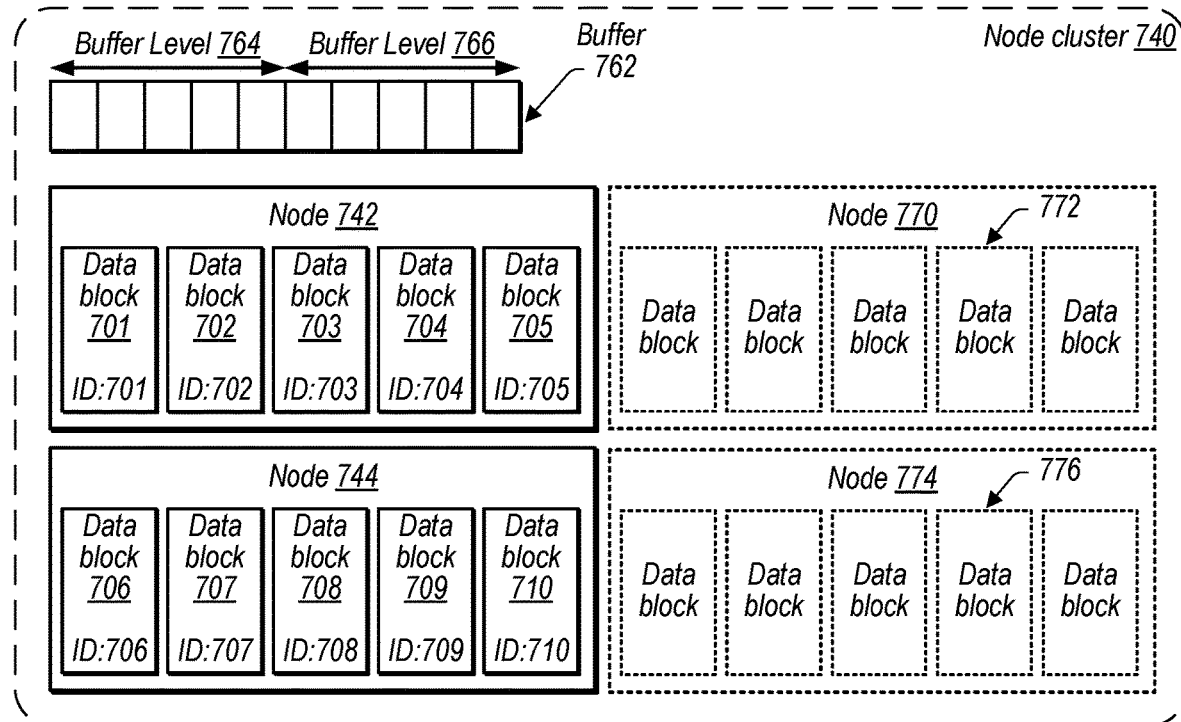
FIG. 7 illustrates that the given number of additional data block identifiers that the buffer in the figure may store corresponds to a given node cluster re-size to a four-node cluster instead of the current two-node cluster, according to some embodiments.

FIG. 7 illustrates that the given number of additional data block identifiers that the buffer in the figure may store corresponds to a given node cluster re-size to a four-node cluster instead of the current two-node cluster, according to some embodiments.

FIG. 7 provides another example of the correlation between the number of data block identifiers may have the capacity to store and number of nodes that could potentially be added in the event of a node cluster re-size. As shown in FIG. 7, node cluster 740 currently comprises node 742 and node 744, which both have capacities to store five data blocks, namely data blocks 701, 702, 703, 704, and 705, and data blocks 706, 707, 708, 709, and 710, respectively. As described for FIG. 6, it may be advantageous for the data processing service to track the potential performance of node cluster 740 given an increase in storage capacity. Buffer level 764 of buffer 762 corresponds to a potential node cluster re-size from the current two-node node cluster to a three-node node cluster, as shown by node 770 in dotted lines, which has the potential to store five additional data blocks, as shown by label 772. Buffer level 764 correspondingly has five data block identifier storage locations.

In some embodiments, it may be advantageous to track potential performance of more than one node cluster re-size simultaneously (note that someone having ordinary skill in the art should understand that simultaneously may be interchanged with in conjunction with one another, in addition to, or other phrases that refer to the tracking of multiple performances). Buffer level 766 of buffer 762, when used in conjunction with buffer level 764, corresponds to a potential node cluster re-size from the current two-node node cluster to a four-node node cluster. In the embodiments shown in FIG. 7, node 774 has the potential to store five additional data blocks, as shown by label 776, meaning that node 770 and node 774 together have the potential to store ten data blocks in addition to those that may already be stored in node 742 and node 744. Buffer level 766 correspondingly has five data block identifier storage locations, and, when used in conjunction with buffer level 764, has the potential to store a total of ten data block identifiers. Buffer 762 may be referred to as a multilevel buffer, according to some embodiments.

Someone having ordinary skill in the art should understand that FIGS. 6 and 7 are meant to be example embodiments of node cluster re-sizes that refer to increasing the current storage capacity of a given node cluster. A given buffer, such as buffer 762, may comprise additional buffer levels besides buffer level 764 and buffer level 766 that may correspond to additional or different node cluster re-sizes, and such types of additional example embodiments are encompassed by the invention described herein. Furthermore, buffer levels may refer to partitions of a given buffer, such as buffer level 764 and buffer level 766, which are both located on buffer 762, according to some embodiments. In other embodiments, however, buffer levels may refer to different buffers within a given node cluster. For example, buffer level 764 may be located on buffer 362, and buffer level 766 may be located on buffer 364, according to some embodiments.

In addition, example embodiments shown in FIGS. 2, 3, 4, 5, 6 and 7 show nodes with storage capacities in increments of five data block storage locations, and buffers with corresponding increments of five data block identifier storage locations. However, these are meant to be example embodiments of the invention described herein, and the reader should understand that the methods and techniques described herein may apply to nodes, buffers, and storage capacities of larger or smaller sizes as well.

Figure 8A:
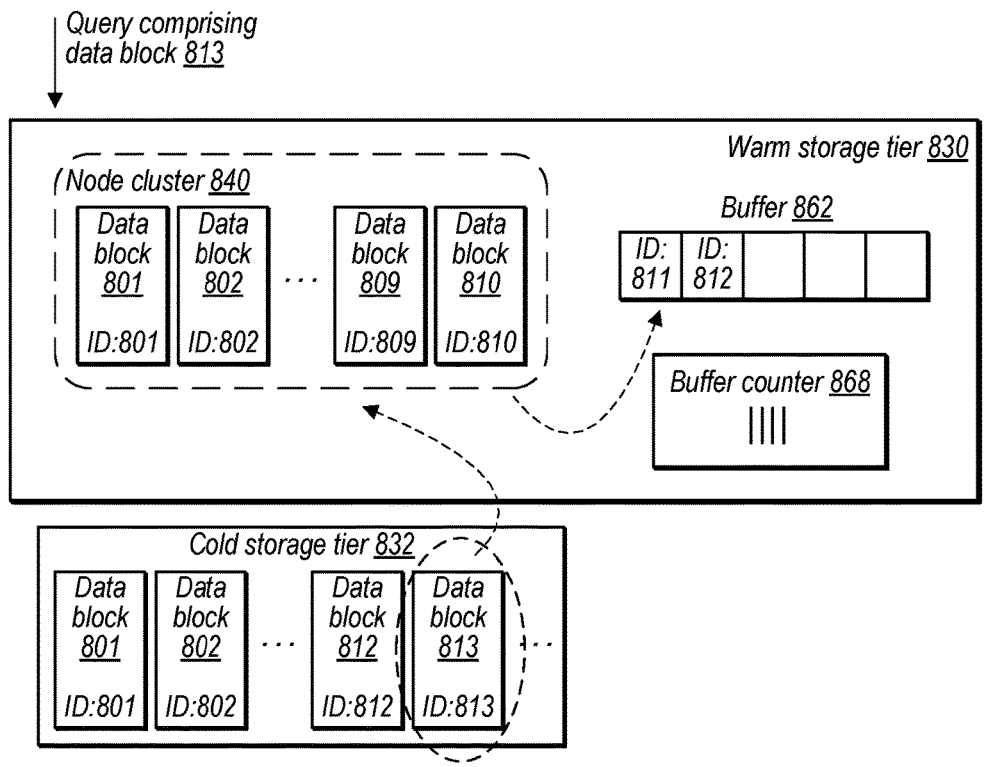
FIG. 8A illustrates an example of an incoming query to the data processing service, according to some embodiments.
Figure 8B:
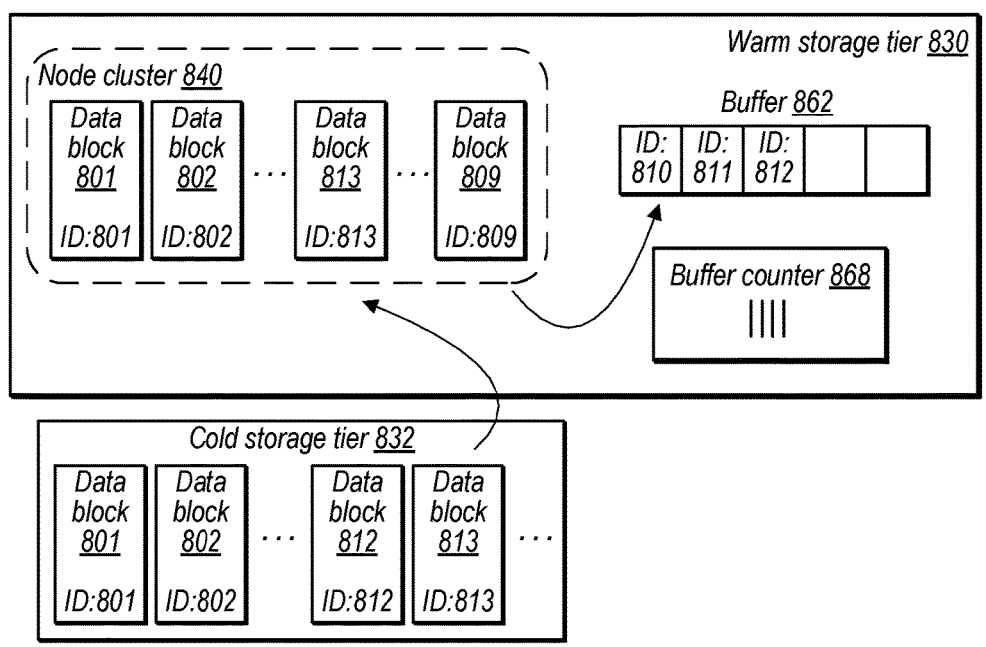
FIG. 8B illustrates an example of the utilization of the buffer in response to the query of FIG. 8A, according to some embodiments.

FIG. 8A illustrates an example of an incoming query to the data processing service, and FIG. 8B illustrates an example of the utilization of the buffer in response to the query of FIG. 8A, according to some embodiments.

FIG. 8A depicts a data processing service comprising warm storage tier 830 and cold storage tier 832 at a moment in which an incoming query comprising data block 813 begins processing in the data processing service. In some embodiments, the query comprising data block 813 may resemble query 150, and the functionalities associated to query 150 described herein, such as query planning 152, query execution 154, and query execution slot(s)/queue(s) 158, which may also be applied to the query comprising data block 813.

Warm storage tier 830 comprises node cluster 840, buffer 862, and buffer counter 868. Cold storage tier 832 comprises at least the storage of data blocks 801, 802, 803, 804, 805, 806, 807, 808, 809, 810, 811, 812, and 813, according to some embodiments. As described above, data blocks stored in cold storage tier may be considered as the authoritative or definitive version of the data, while data blocks stored in node cluster 840 may represent a cached version of the data. According to the embodiments shown in FIG. 8A, node cluster 840 has the capacity to store ten data blocks, such as data blocks 801, 802, 803, 804, 805, 806, 807, 808, 809, and 810, and is at full capacity for data block storage at the given moment depicted in FIG. 8A. In addition, two data block identifiers, data block ID 811 and data block ID 812, are currently stored in buffer 862, and buffer counter 868 has a value of four. In some embodiments, FIGS. 8A and 8B may resemble node cluster 540 and node cluster 640, in which there are two current nodes of the respective node clusters, and buffers 562 and 662, respectively, have the potential to store five additional data block identifiers in order to track potential performance of increasing the respective node clusters from two-node node clusters to three-node node clusters.

As shown in FIG. 8A, data block 813 is currently stored in cold storage tier 832, and is not currently one of the ten data blocks stored in node cluster 840, nor is data block ID 813 currently located in buffer 862 at the moment of the incoming query comprising data block 813. The dashed arrows shown in FIG. 8A represent steps that may occur in response to a query comprising data block 813, and the solid arrows shown in FIG. 8B represent the effect of having completed the query comprising data block 813. As shown by the arrows, data block 813 may be placed in node cluster 840 in response to the query comprising data block 813. As node cluster 840 shown in FIG. 8A was already at full capacity, one of the ten data blocks stored in node cluster 840 is evicted from the node cluster. In the embodiments shown in FIGS. 8A and 8B, data block 810 is evicted from node cluster 840. In some embodiments, in response to this eviction, the data block identifier corresponding to data block 810 may be stored in buffer 862. Someone having ordinary skill in the art should understand that "eviction" may be replaced with removal from, deletion of, erasure from, or other words/phrases used to describe the result of no longer storing the respective data block (or data block identifier) in the given storage location.

As shown in FIG. 8B, a prioritization of data block IDs occurs in buffer 862 according to the data block identifier that corresponds to the most recently evicted data block from node cluster 840. In the embodiments shown in FIGS. 8A and 8B, buffer counter 868 is not incremented as a result of the query comprising data block 813, since data block 813 did not have the corresponding data block identifier in buffer 862 at the moment data block 813 was called by said query.

In some embodiments, data blocks stored in node cluster 840 may also have a prioritization according to data blocks that are called most frequently by incoming queries. This may also be referred to as "warmer" blocks, which are called more frequently by incoming queries in comparison with "colder" blocks, which are called less frequently. In such embodiments, a new data block that is placed in node cluster 840, such as data block 813, may be placed into such a type of prioritization. As shown in FIG. 8B, data block 813 is placed somewhere in the middle of the warm-to-cold block spectrum which represents data block 813's recent use by a query, but also data block 813's relatively low frequency of being called by queries at the given point in time depicted in FIGS. 8A and 8B. Furthermore, data block 810 may be chosen for eviction in the embodiments shown in FIG. 8A due to data block 810 being the "coldest" data block in warm storage tier 830 at the time of the query comprising data block 813, according to some embodiments. In some embodiments, after the steps shown by the arrows in FIGS. 8A and 8B are complete, the query comprising data block 813 may prepare the one or more results of said query, such as those described herein for result cache 156, and the results may then be returned via query results 176.

Figure 9A:
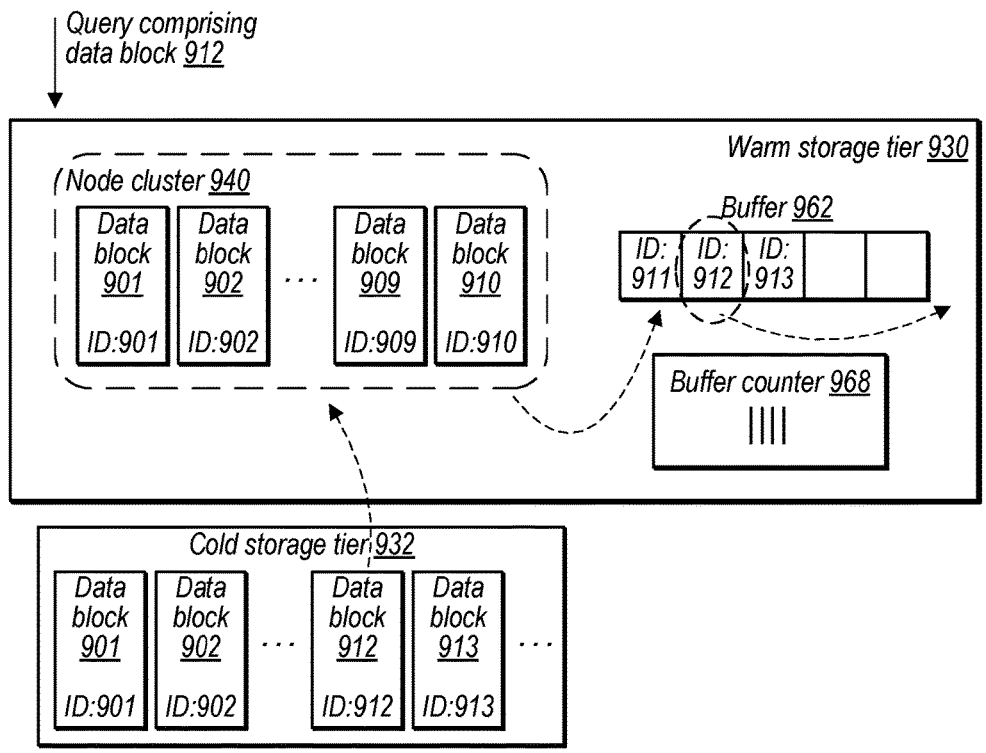
FIG. 9A illustrates a second example of an incoming query to the data processing service, according to some embodiments.
Figure 9B:
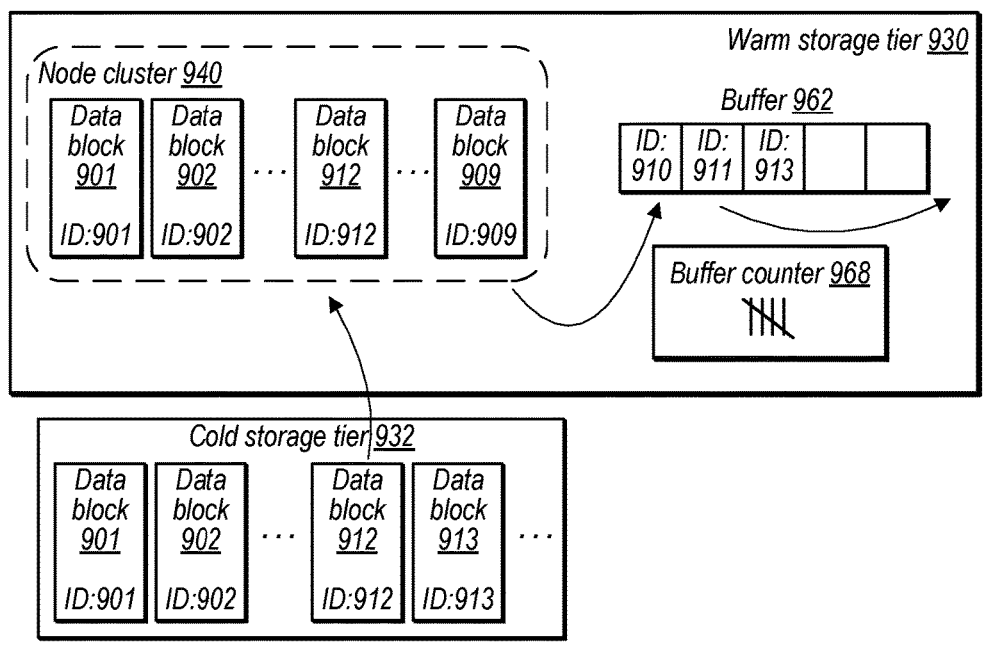
FIG. 9B illustrates an example of the utilization of the buffer in response to the query of FIG. 9A, according to some embodiments.

FIG. 9A illustrates a second example of an incoming query to the data processing service, and FIG. 9B illustrates an example of the utilization of the buffer in response to the query of FIG. 9A, according to some embodiments.

FIG. 9A depicts a data processing service comprising warm storage tier 930 and cold storage tier 932 at a moment in which an incoming query comprising data block 912 begins processing in the data processing service. Warm storage tier 930 comprises node cluster 940, buffer 962, and buffer counter 968. Cold storage tier 932 comprises at least the storage of data blocks 901, 902, 903, 904, 905, 906, 907, 908, 909, 910, 911, 912, and 913, according to some embodiments. According to the embodiments shown in FIG. 9A, node cluster 940 has the capacity to store ten data blocks, such as data blocks 901, 902, 903, 904, 905, 906, 907, 908, 909 and 910, and is at full capacity for data block storage at the given moment depicted in FIG. 9A. In addition, three data block identifiers, data block IDs 911, 912, and 913, are currently stored in buffer 962, and buffer counter 968 has a value of four.

As shown in FIG. 9A, data block 912 is currently stored in cold storage tier 932, and is not currently one of the ten data blocks stored in node cluster 940. Data block identifier 912 is, however, currently stored in buffer 962. The dashed arrows shown in FIG. 9A represent steps that may occur in response to a query comprising data block 912, and the solid arrows shown in FIG. 9B represent the effect of having completed the query comprising data block 912. As shown by the arrows, data block 912 may be placed in node cluster 840 in response to said query, and the data block identifier for data block 912 is then removed from buffer 962. As node cluster 940 shown in FIG. 9A was already at full capacity, one of the ten data blocks stored in node cluster 940 is evicted from the node cluster. In the embodiments shown in FIGS. 9A and 9B, data block 910 is evicted from node cluster 940, and data block 910 may be chosen for eviction according to the prioritization scheme discussed for FIGS. 8A and 8B herein. In some embodiments, in response to this eviction, the data block identifier corresponding to data block 910 may be stored in buffer 962. As shown in FIG. 9B, a prioritization of data block IDs occurs in buffer 962, such as the prioritization described herein for buffer 862. Furthermore, buffer counter 968 is incremented (e.g. from 4 to 5) as a result of the query comprising data block 912, since data block 912 had a corresponding data block identifier in buffer 962 at the moment data block 912 was called by said query.

Figure 10A:
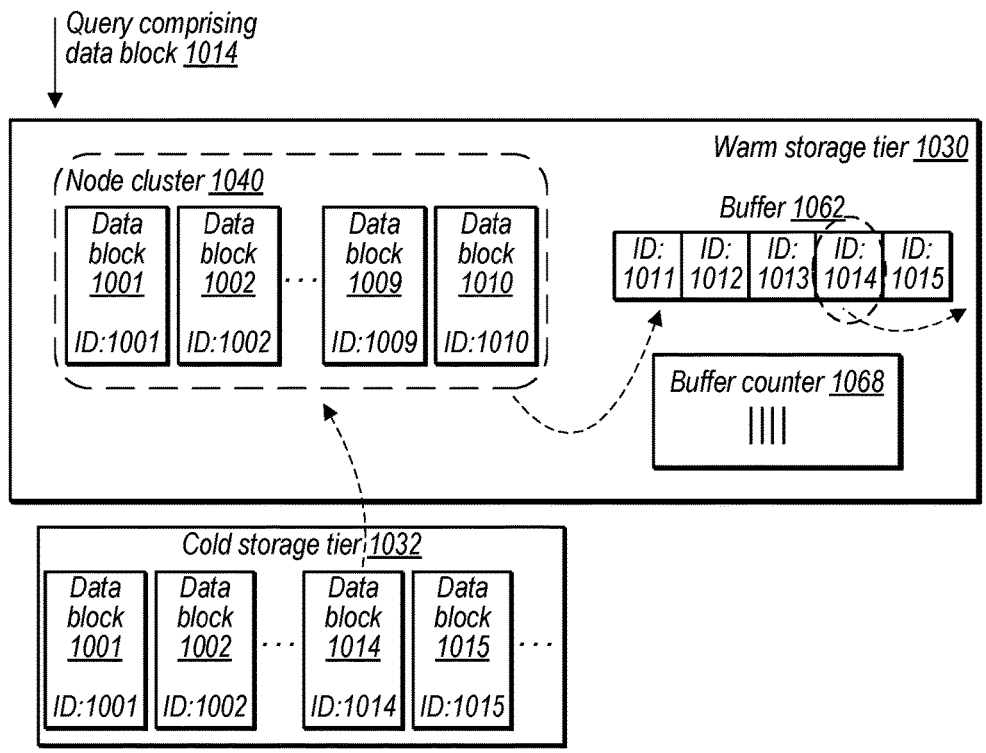
FIG. 10A illustrates a third example of an incoming query to the data processing service, according to some embodiments.
Figure 10B:
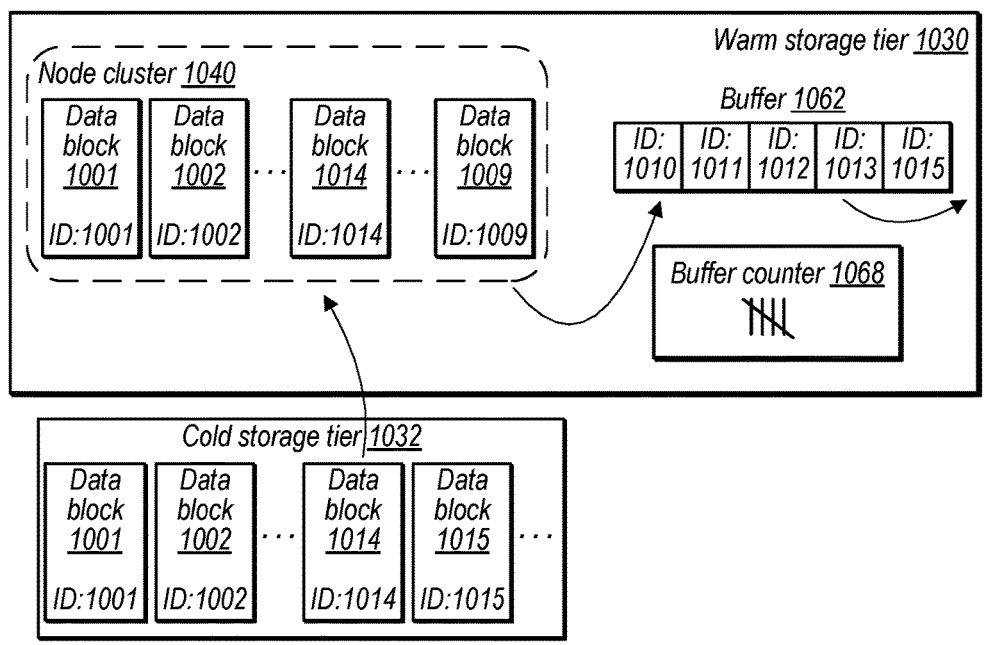
FIG. 10B illustrates an example of the utilization of the buffer in response to the query of FIG. 10A, according to some embodiments.

FIG. 10A illustrates a third example of an incoming query to the data processing service, and FIG. 10B illustrates an example of the utilization of the buffer in response to the query of FIG. 10A, according to some embodiments.

FIG. 10A depicts a data processing service comprising warm storage tier 1030 and cold storage tier 1032 at a moment in which an incoming query comprising data block 1014 begins processing in the data processing service. Warm storage tier 1030 comprises node cluster 1040, buffer 1062, and buffer counter 1068. Cold storage tier 1032 comprises at least the storage of data blocks 1001, 1002, 1003, 1004, 1005, 1006, 1007, 1008, 1009, 1010, 1011, 1012, 1013, 1014, and 1015, according to some embodiments. According to the embodiments shown in FIG. 10A, node cluster 1040 has the capacity to store ten data blocks, such as data blocks 1001, 1002, 1003, 1004, 1005, 1006, 1007, 1008, 1009, and 1010, and is at full capacity for data block storage at the given moment depicted in FIG. 10A. In addition, buffer 1062 has a capacity to store five data block identifiers, and, according to the embodiments shown in FIG. 10A, buffer 1062 is at full capacity, storing data block IDs 1011, 1012, 1013, 1014, and 1015. Furthermore, buffer counter 1068 has a value of four at the given moment depicted in FIG. 10A.

As shown in FIG. 10A, data block 1014 is currently stored in cold storage tier 1032, and is not currently one of the ten data blocks stored in node cluster 1040. Data block identifier 1014 is, however, currently stored in buffer 1062. The dashed arrows shown in FIG. 10A represent steps that may occur in response to a query comprising data block 1014, and the solid arrows shown in FIG. 10B represent the effect of having completed the query comprising data block 1014. As shown by the arrows, data block 1014 may be placed in node cluster 1040 in response to said query, and the data block identifier for data block 1014 is then removed from buffer 1062. As node cluster 1040 shown in FIG. 10A was already at full capacity, one of the ten data blocks stored in node cluster 1040 is evicted from the node cluster. In the embodiments shown in FIGS. 10A and 10B, data block 1010 is evicted from node cluster 1040, and data block 1010 may be chosen for eviction according to the prioritization scheme discussed for FIGS. 8A and 8B herein. In some embodiments, in response to this eviction, the data block identifier corresponding to data block 1010 may be stored in buffer 1062. As shown in FIG. 10B, a prioritization of data block IDs occurs in buffer 1062, such as the prioritization described herein for buffer 862. With the removal of data block ID 1014 and the addition of data block ID 1010, buffer 1062 remains at full capacity, according to the embodiments shown in FIGS. 10A and 10B. Furthermore, buffer counter 1068 is incremented (e.g. from 4 to 5) as a result of the query comprising data block 1014, since data block 1014 had a corresponding data block identifier in buffer 1062 at the moment data block 1014 was called by said query.

Figure 11A:
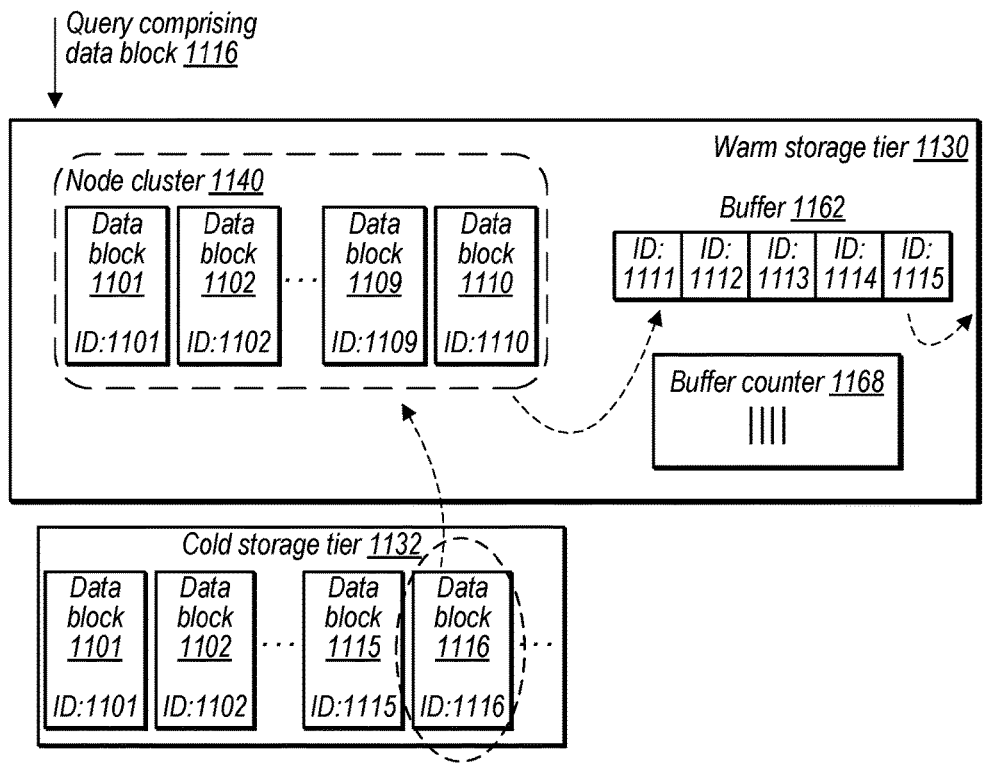
FIG. 11A illustrates a fourth example of an incoming query to the data processing service, according to some embodiments.
Figure 11B:
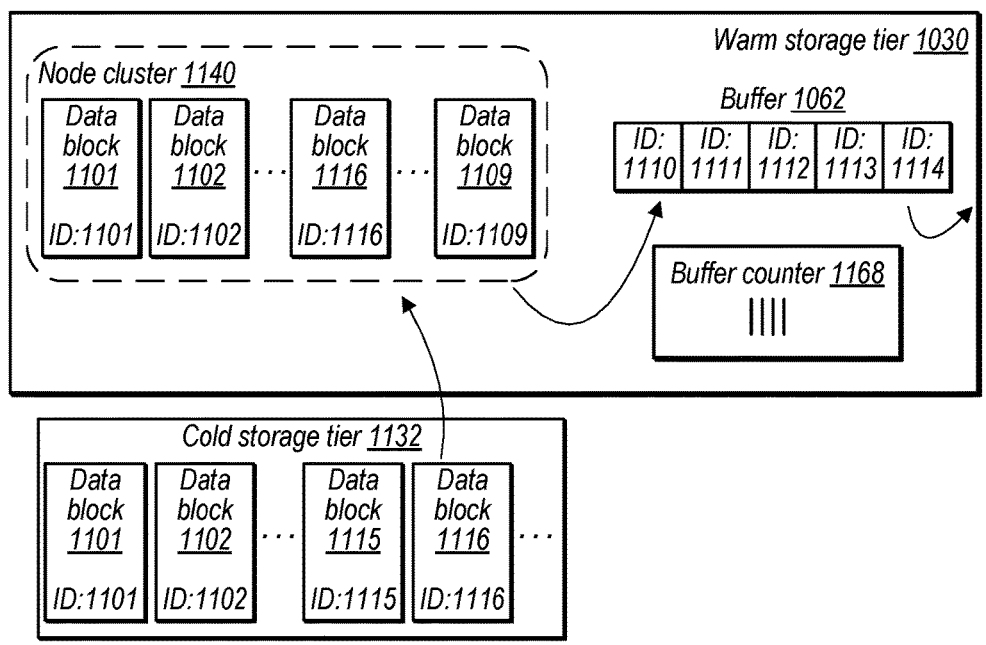
FIG. 11B illustrates an example of the utilization of the buffer in response to the query of FIG. 11A, according to some embodiments.

FIG. 11A illustrates a fourth example of an incoming query to the data processing service, and FIG. 11B illustrates an example of the utilization of the buffer in response to the query of FIG. 11A, according to some embodiments.

FIG. 11A depicts a data processing service comprising warm storage tier 1130 and cold storage tier 1132 at a moment in which an incoming query comprising data block 1116 begins processing in the data processing service. Warm storage tier 1130 comprises node cluster 1140, buffer 1162, and buffer counter 1168. Cold storage tier 1132 comprises at least the storage of data blocks 1101, 1102, 1103, 1104, 1105, 1106, 1107, 1108, 1109, 1110, 1111, 1112, 1113, 1114, 1115, and 1116, according to some embodiments. According to the embodiments shown in FIG. 11A, node cluster 1140 has the capacity to store ten data blocks, such as data blocks 1101, 1102, 1103, 1104, 1105, 1106, 1107, 1108, 1109, and 1110, and is at full capacity for data block storage at the given moment depicted in FIG. 11A. In addition, buffer 1162 has a capacity to store five data block identifiers, and, according to the embodiments shown in FIG. 11A, buffer 1162 is at full capacity, storing data block IDs 1111, 1112, 1113, 1114, and 1115. Furthermore, buffer counter 1168 has a value of four at the given moment depicted in FIG. 11A.

As shown in FIG. 11A, data block 1116 is currently stored in cold storage tier 1132, and is not currently one of the ten data blocks stored in node cluster 1140, nor is the data block identifier for data block 1116 currently stored in buffer 1162. The dashed arrows shown in FIG. 11A represent steps that may occur in response to a query comprising data block 1116, and the solid arrows shown in FIG. 11B represent the effect of having completed the query comprising data block 1116. As shown by the arrows, data block 1116 may be placed in node cluster 1140 in response to said query. As node cluster 1140 shown in FIG. 11A was already at full capacity, one of the ten data blocks stored in node cluster 1140 is evicted from the node cluster. In the embodiments shown in FIGS. 11A and 11B, data block 1110 is evicted from node cluster 1140, and data block 1110 may be chosen for eviction according to the prioritization scheme discussed for FIGS. 8A and 8B herein. In some embodiments, in response to this eviction, the data block identifier corresponding to data block 1110 may be stored in buffer 1162. As shown in FIG. 11B, a prioritization of data block IDs occurs in buffer 1162, such as the prioritization described herein for buffer 862.

In some embodiments, the addition of data block ID 1110 to buffer 1162 may cause one of the five data block IDs currently stored in buffer 1162 to be evicted, since buffer 1162 was at full capacity at the moment that the query comprising data block 1116 occurred. This may also be referred to as cascading evictions to represent the "domino effect" nature of such scenarios, according to the embodiments. As the name suggests, cascading evictions may refer to one or more additional evictions of data blocks and/or data block IDs that are caused at least in part by an eviction of one or more data blocks from the given node cluster.

In the embodiments shown in FIGS. 11A and 11B, data block ID 1115 is removed from buffer 1162 in order to add data block ID 1110 to buffer 1162. In some embodiments, data block ID 1110 may be given a higher prioritization than data block IDs 1111, 1112, 1113, 1114, or 1115, causing data block IDs 1111, 1112, 1113, 1114, and 1115 to be incrementally de-prioritized. In such embodiments in which data block ID 1115, for example, has the lowest prioritization out of data block IDs 1110, 1111, 1112, 1113, 1114, and 1115, data block ID 1115 will be removed from buffer 1162. This may also be referred to as a process of "aging out" data block IDs, and may describe a process of removing data block IDs from the given buffer that are the coldest with respect to a warm-to-cold spectrum. Another example of cascading evictions and aging out may be found in FIGS. 12A and 12B and their explanations herein. Furthermore, buffer counter 1168 is not incremented as a result of the query comprising data block 1116, since data block 1116 did not have a corresponding data block identifier in buffer 1162 at the moment data block 1114 was called by said query.

Figure 12A:
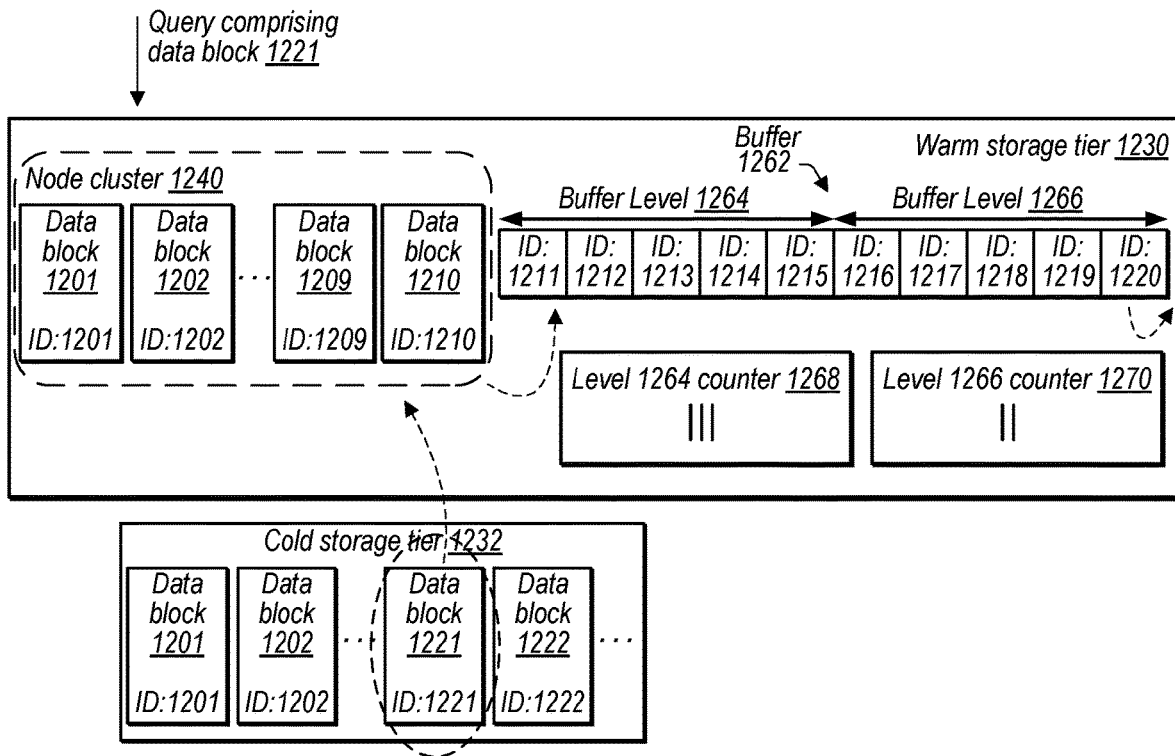
FIG. 12A illustrate a fifth example of an incoming query to the data processing service, according to some embodiments.
Figure 12B:
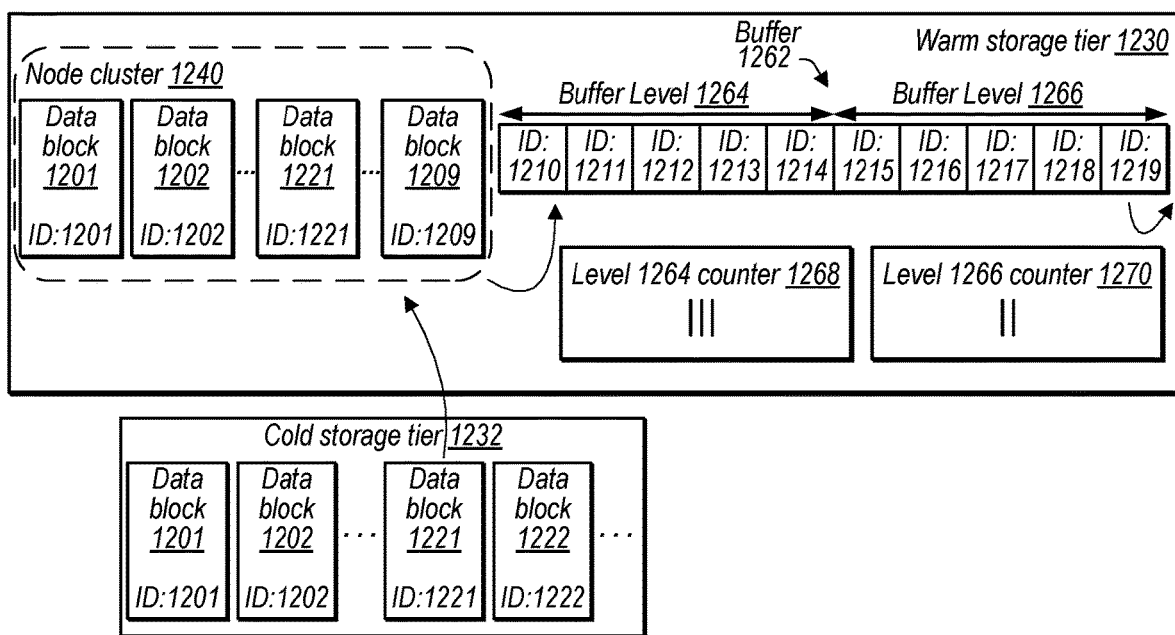
FIG. 12B illustrates an example of the utilization of the buffer in response to the query of FIG. 12A, according to some embodiments.

FIG. 12A illustrate a fifth example of an incoming query to the data processing service, and FIG. 12B illustrates an example of the utilization of the buffer in response to the query of FIG. 12A, according to some embodiments.

In some embodiments, FIGS. 12A and 12B may resemble node cluster 740, in which there are two current nodes in the node cluster, and buffer 762, with buffer levels 764 and 766, has the potential to store ten additional data block identifiers in order to track potential performance of increasing node cluster 740 from a two-node node cluster to a three-node node cluster, and track potential performance of increasing node cluster 740 from a two-node node cluster to a four-node node cluster.

FIG. 12A depicts a data processing service comprising warm storage tier 1230 and cold storage tier 1232 at a moment in which an incoming query comprising data block 1221 begins processing in the data processing service. Warm storage tier 1230 comprises node cluster 1240, buffer 1262 with buffer level 1264 and buffer level 1266, and buffer counters corresponding said buffer levels, namely level 1264 counter 1268 and level 1266 counter 1270. In some embodiments, buffer levels 1264 and 1266 may resemble buffer levels 764 and 766, wherein buffer level 1264 corresponds to a re-size of node cluster 1230 from a two-node node cluster to a three-node node cluster, and buffer level 1266, when used in conjunction with buffer level 1264, corresponds to a re-size of node cluster 1230 from a two-node node cluster to a four-node node cluster.

Cold storage tier 1232 comprises at least the storage of data blocks 1201, 1202, 1203, 1204, 1205, 1206, 1207, 1208, 1209, 1210, 1211, 1212, 1213, 1214, 1215, 1216, 1217, 1218, 1219, 1220, and 1221, according to some embodiments. According to the embodiments shown in FIG. 12A, node cluster 1240 has the capacity to store ten data blocks, such as data blocks 1201, 1202, 1203, 1204, 1205, 1206, 1207, 1208, 1209, and 1210, and is at full capacity for data block storage at the given moment depicted in FIG. 12A. In addition, buffer 1262 has a capacity to store ten data block identifiers, and, according to the embodiments shown in FIG. 12A, buffer 1262 is at full capacity, storing data block IDs 1211, 1212, 1213, 1214, 1215, 1216, 1217, 1218, 1219, and 1220. Furthermore, level 1264 counter 1268 has a value of three and level 1266 counter 1270 has a value of two at the given moment depicted in FIG. 12A.

As shown in FIG. 12A, data block 1221 is currently stored in cold storage tier 1232, and is not currently one of the ten data blocks stored in node cluster 1240, nor is the data block identifier for data block 1221 currently stored in either level of buffer 1262. The dashed arrows shown in FIG. 12A represent steps that may occur in response to a query comprising data block 1221, and the solid arrows shown in FIG. 12B represent the effect of having completed the query comprising data block 1221. As shown by the arrows, data block 1221 may be placed in node cluster 1240 in response to said query. As node cluster 1240 shown in FIG. 12A was already at full capacity, one of the ten data blocks stored in node cluster 1240 is evicted from the node cluster. In the embodiments shown in FIGS. 12A and 12B, data block 1210 is evicted from node cluster 1240, and data block 1210 may be chosen for eviction according to the prioritization scheme discussed for FIGS. 8A and 8B herein.

In some embodiments, in response to this eviction, the data block identifier corresponding to data block 1210 may be stored in buffer 1262. As shown in FIG. 12B, a prioritization of data block IDs occurs in buffer 1262, such as the prioritization described herein for buffer 862. This method of prioritization of data block IDs may also be applied to a buffer with multiple buffer levels, such as buffer 1262. In embodiments in which data block ID 1210 is added to a data block identifier storage location within buffer level 1264, data block identifier 1220 is aged out of buffer 1262 (see the description for FIGS. 11A and 11B for more detail on the process of aging out). In addition, data block ID 1215 is moved from being stored within buffer level 1264 to buffer level 1266. Furthermore, neither level 1264 counter 1268 nor level 1266 counter 1270 are incremented as a result of the query comprising data block 1221, since data block 1221 was not stored in node cluster 1240 nor was the corresponding data block identifier stored in buffer 1262 at the moment that the query comprising data block 1221 began processing.

FIG. 13A illustrates a sixth example of an incoming query to the data processing service, and FIG. 13B illustrates an example of the utilization of the buffer in response to the query of FIG. 13A, according to some embodiments.

FIG. 13A depicts a data processing service comprising warm storage tier 1330 and cold storage tier 1332 at a moment in which an incoming query comprising data block 1319 begins processing in the data processing service. Warm storage tier 1330 comprises node cluster 1340, buffer 1362 with buffer level 1364 and buffer level 1366, and buffer counters corresponding said buffer levels, namely level 1364 counter 1368 and level 1366 counter 1370. In some embodiments, FIGS. 13A and 13B may resemble FIGS. 12A and 12B and node cluster 740, in which there are two current nodes in node cluster 1330 and two buffer levels, namely buffer levels 1364 and 1366, in order to track potential performance of increasing node cluster 1340 from a two-node node cluster to a three-node node cluster, and from a two-node node cluster to a four-node node cluster.

Cold storage tier 1332 comprises at least the storage of data blocks 1301, 1302, 1303, 1304, 1305, 1306, 1307, 1308, 1309, 1310, 1311, 1312, 1313, 1314, 1315, 1316, 1317, 1318, 1319, and 1320, according to some embodiments. According to the embodiments shown in FIG. 13A, node cluster 1340 has the capacity to store ten data blocks, such as data blocks 1301, 1302, 1303, 1304, 1305, 1306, 1307, 1308, 1309, and 1310, and is at full capacity for data block storage at the given moment depicted in FIG. 13A. In addition, buffer 1362 has a capacity to store ten data block identifiers, and, according to the embodiments shown in FIG. 13A, buffer 1362 is at full capacity, storing data block IDs 1311, 1312, 1313, 1314, 1315, 1316, 1317, 1318, 1319, and 1320. Furthermore, level 1364 counter 1368 has a value of three and level 1366 counter 1370 has a value of two at the given moment depicted in FIG. 13A.

As shown in FIG. 13A, data block 1319 is currently stored in cold storage tier 1332, and is not currently one of the ten data blocks stored in node cluster 1340. The data block identifier corresponding to data block 1319 is, however, currently stored in buffer level 1366 of buffer 1362 at the moment that the query comprising data block 1319 begins processing. The dashed arrows shown in FIG. 13A represent steps that may occur in response to a query comprising data block 1319, and the solid arrows shown in FIG. 13B represent the effect of having completed the query comprising data block 1319. As shown by the arrows, data block 1319 may be placed in node cluster 1340 in response to said query and data block ID 1319 may be removed from buffer level 1366 of buffer 1362. As node cluster 1340 shown in FIG. 13A was already at full capacity, one of the ten data blocks stored in node cluster 1340 is evicted from the node cluster, namely data block 1310 in the embodiments shown in FIGS. 13A and 13B.

In some embodiments, in response to this eviction of data block 1310, the data block identifier corresponding to data block 1310 may be stored in buffer level 1364 of buffer 1362. Following a similar procedure for aging out as that given in the description for FIGS. 11A and 11B, data block ID 1315 is moved from being stored within buffer level 1364 to buffer level 1366. As data block identifier 1319 was stored in buffer level 1366 at the moment that the query comprising data block 1319 began processing, level 1366 counter 1370 is incremented from two to three.

Figure 14:
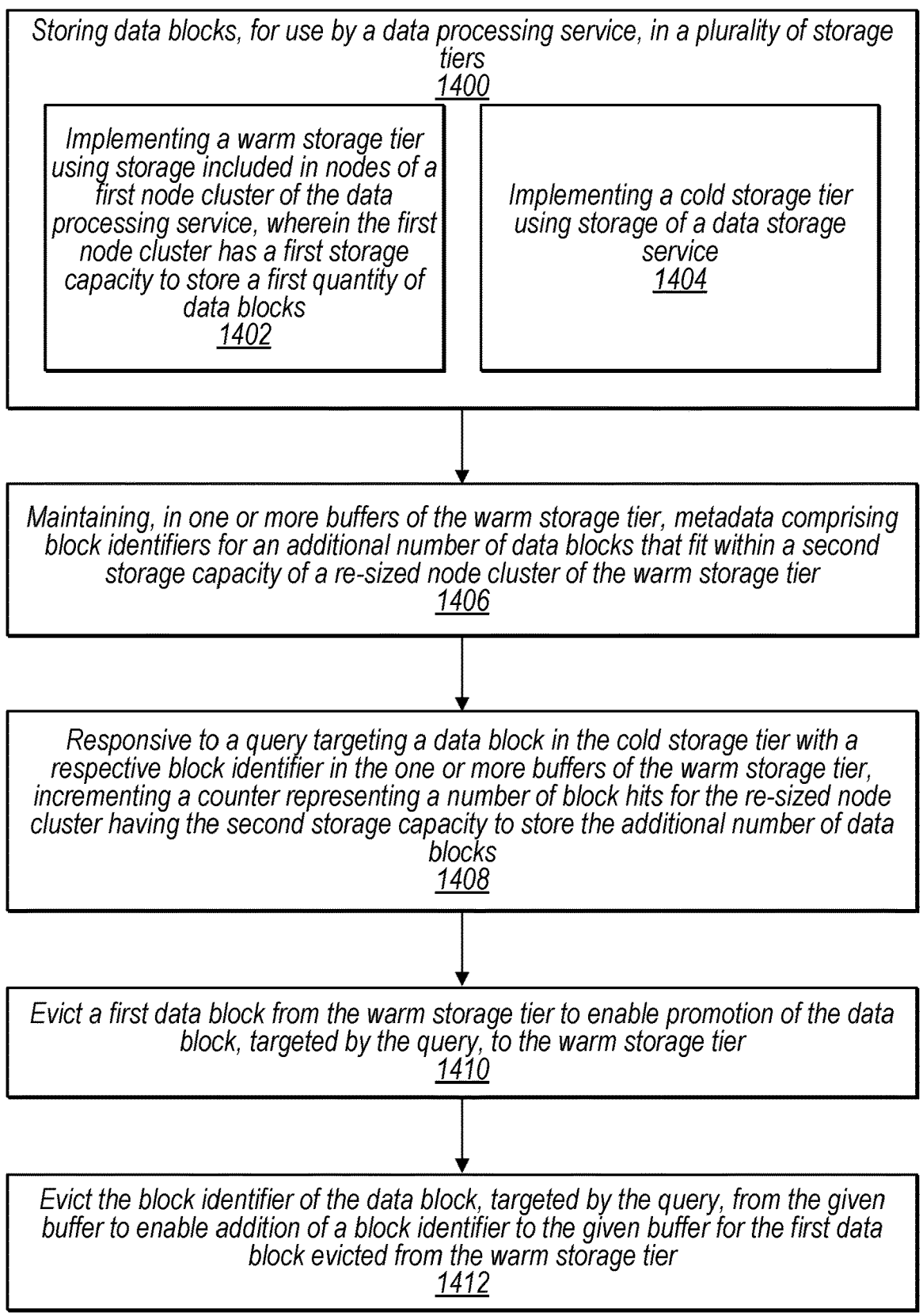
FIG. 14 is a flow diagram illustrating a process of implementing a data processing service to use warm and cold storage tiers to store data blocks for clients of the data processing service, and responding to a query to the data processing service comprising a data block with the corresponding data block identifier in the buffer, according to some embodiments.

FIG. 14 is a flow diagram illustrating a process of implementing a data processing service to use warm and cold storage tiers to store data blocks for clients of the data processing service, and responding to a query to the data processing service comprising a data block with the corresponding data block identifier in the buffer, according to some embodiments.

In block 1400, data blocks may be stored in a plurality of storage tiers comprising at least a warm storage tier and a cold storage tier described in blocks 1402 and 1404, respectively, for use by a data processing service. In block 1402, a warm storage tier is implemented using storage included in nodes of a first node cluster of the data processing service. In some embodiments, the warm storage tier may resemble warm storage tier 104, and the first node cluster of the data processing service may resemble node cluster 120, with respective nodes 122, 124, and 126, or node cluster 130, with respective nodes 132, 134, 136, and 138, or node cluster 140, with respective nodes 142 and 144. In some embodiments, one of the nodes of the first node cluster may be a leader node, such as leader node 132. In block 1404, a cold storage tier is implemented using storage of a data storage service. In some embodiments, the cold storage tier may resemble cold storage tier 106, and may be implemented using data storage service 102.

In block 1406, metadata comprising block identifiers for an additional number of data blocks that fit within a second storage capacity of a re-sized node cluster of the warm storage tier may be maintained in one or more buffers. The second storage capacity of a re-sized node cluster may refer to the explanations given for FIGS. 5,6, and 7, in which a buffer corresponds to re-sizing a given node cluster from a two-node node cluster to a three-node node cluster or four-node node cluster. The one or more buffers may be located in a given leader node of the first data cluster, or in respective nodes of the first node cluster, as shown in FIGS. 2 and 3, respectively. The metadata may be maintained via at least the methods and example embodiments shown in FIGS. 8A, 8B, 9A, 9B, 10A, 10B, 11A, 11B, 12A, 12B, 13A, and 13B, in which the data processing service treats incoming queries and tracks performance of the given node cluster via buffers and counters.

In block 1408, a query is processed in the data processing service, wherein the query targets a data block in the cold storage tier with a respective data block identifier in the one or more buffers of the warm storage tier. In response to the query, a counter, which represents a number of block hits for the re-sized node cluster having the second storage capacity to store the additional number of data blocks, is incremented. The query in block 1408 may resemble query 150, which may be processed in the data processing service using query planning 152, query execution 154, result cache 156, and/or query execution slot(s)/queue(s) 158. Additionally, example embodiments of the data processing service processing a query that targets a data block in the cold storage tier with a respective data block identifier in a buffer of the warm storage tier have been described for at least FIGS. 9A, 9B, 10A, 10B, 13A, and 13B.

In block 1410, a first data block from the warm storage tier is evicted in order to enable the promotion of the data block that was targeted by the query described in block 1408 to the warm storage tier. For example, data block 1010 was evicted from node cluster 1040 in order to enable promotion of data block 1014, which was targeted by the query comprising data block 1014 in FIGS. 10A and 10B.

In block 1412, the block identifier of the data block that was targeted by the query is evicted from the given buffer to enable addition of a block identifier to the given buffer for the first data block evicted from the warm storage tier. Once again using the example embodiments found in FIGS. 10A and 10B, data block identifier 1014 was evicted from buffer 1062 in order to enable addition of data block identifier 1010 to buffer 1062.

Figure 15:
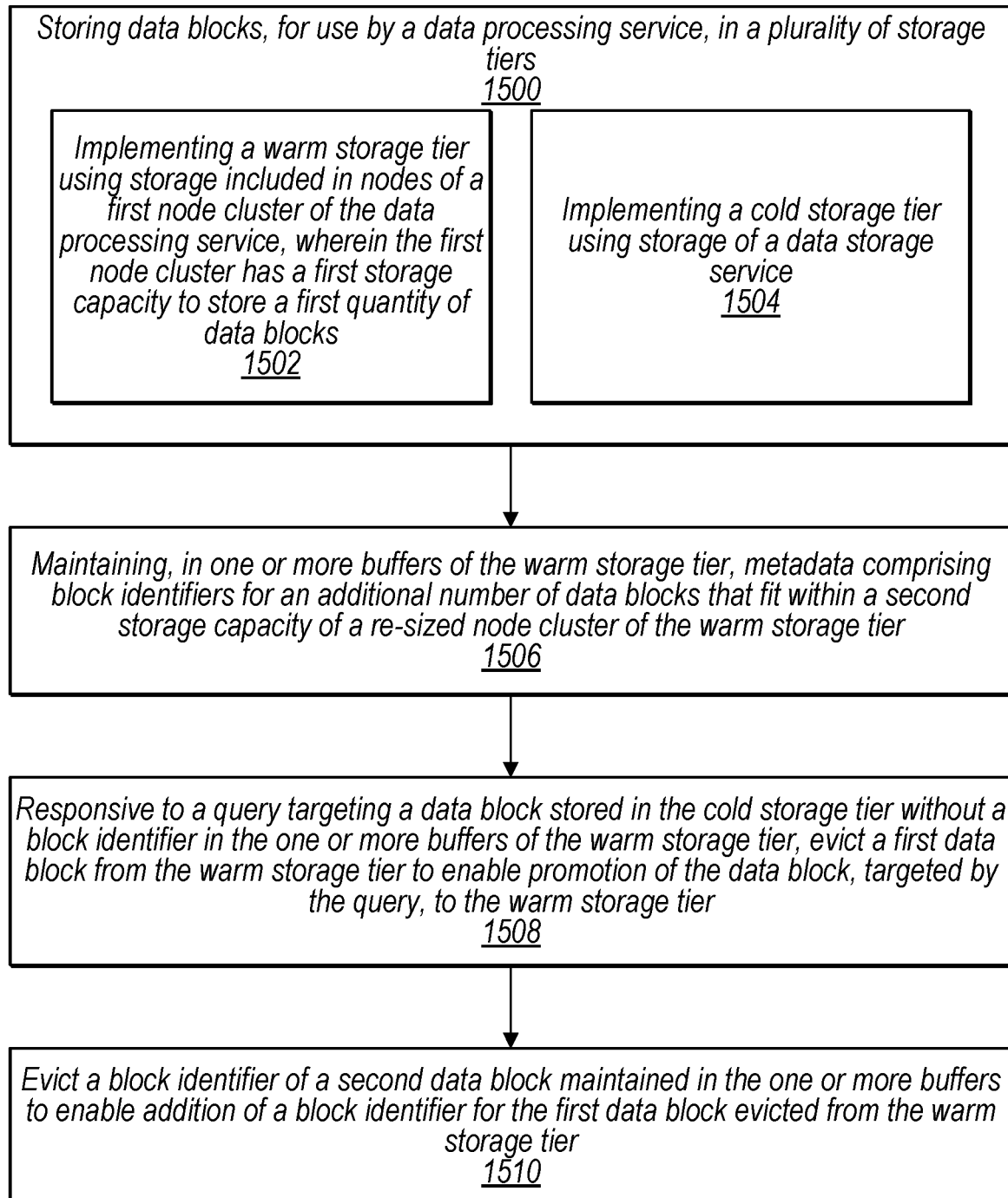
FIG. 15 is a flow diagram illustrating a process of implementing a data processing service to use warm and cold storage tiers to store data blocks for clients of the data processing service, and responding to another query to the data processing service comprising a data block stored in the cold storage tier (without the corresponding block identifier stored in the buffer), according to some embodiments.

FIG. 15 is a flow diagram illustrating a process of implementing a data processing service to use warm and cold storage tiers to store data blocks for clients of the data processing service, and responding to another query to the data processing service comprising a data block stored in the cold storage tier (without the corresponding block identifier stored in the buffer), according to some embodiments.

In block 1500, a data processing service uses a plurality of storage tiers to store data blocks, according to some embodiments. The plurality of storage tiers may comprise at least a warm storage tier and a cold storage tier. In block 1502, the warm storage tier is implemented using storage included in nodes of a first node cluster of the data processing service, wherein the first node cluster has a first storage capacity to store a first quantity of data blocks. In block 1504, the cold storage tier is implemented using storage of a data storage service. In some embodiments, blocks 1500, 1502, and 1504 may resemble blocks 1400, 1402, and 1404, and their respective descriptions herein. In block 1506, metadata comprising block identifiers for an additional number of data blocks that fit within a second storage capacity of a re-sized node cluster of the warm storage tier is maintained in one or more buffers of the warm storage tier. In some embodiments, block 1506 may resemble block 1406 and its respective descriptions herein.

In block 1508, a query is processed in the data processing service, wherein the query targets a data block in the cold storage tier that does not have the corresponding data block identifier in the one or more buffers, nor is the targeted data block already stored in a node of the first node cluster. In response to the query, a first data block is evicted from the warm storage tier in order to enable the promotion of the data block that was targeted by said query to the warm storage tier. The query in block 1508 may resemble query 150, which may be processed in the data processing service using query planning 152, query execution 154, result cache 156, and/or query execution slot(s)/queue(s) 158. Additionally, example embodiments of the data processing service processing a query that targets a data block in the cold storage tier without a respective data block identifier in a buffer of the warm storage tier have been described for at least FIGS. 8A, 8B, 11A, 11B, 12A, and 12B. Using the example embodiments shown in FIGS. 11A and 11B, data block 1110 is evicted from node cluster 1140 in order to enable the promotion of data block 1116, which was targeted by the query comprising data block 1116, to node cluster 1140.

In block 1510, a block identifier of a second data block maintained in the one or more buffers is evicted in order to enable the addition of a block identifier for the first data block which was evicted from the warm storage tier. Continuing with the embodiments shown in FIGS. 11A and 11B, data block identifier 1115 is evicted from buffer 1162 in order to add data block identifier 1110 to buffer 1162.

Examples of Using Metadata of a Node Cluster to Track Performance of the Node Cluster Given a Node Cluster Re-Size that Decreases the Storage Capacity of the Current Node Cluster In some embodiments of the methods and techniques described herein, it may be advantageous to track the projected performance of a given node cluster given a node cluster re-size that would decrease the storage capacity of the given node cluster, as described herein. Referring briefly back to FIG. 5, in which buffer 562 was used to correspond to potential additional storage capacity if node cluster 540 were to incorporate node 570, there may be other embodiments in which storage capacity of a given cluster is not used to full capacity, and it might be therefore advantageous to downsize the storage capacity of a given node cluster. In some embodiments, downsizing the storage capacity of a given node cluster may be part of a recommendation for improving performance of the given node cluster that is provided to a client of the data processing service.

Figure 16:
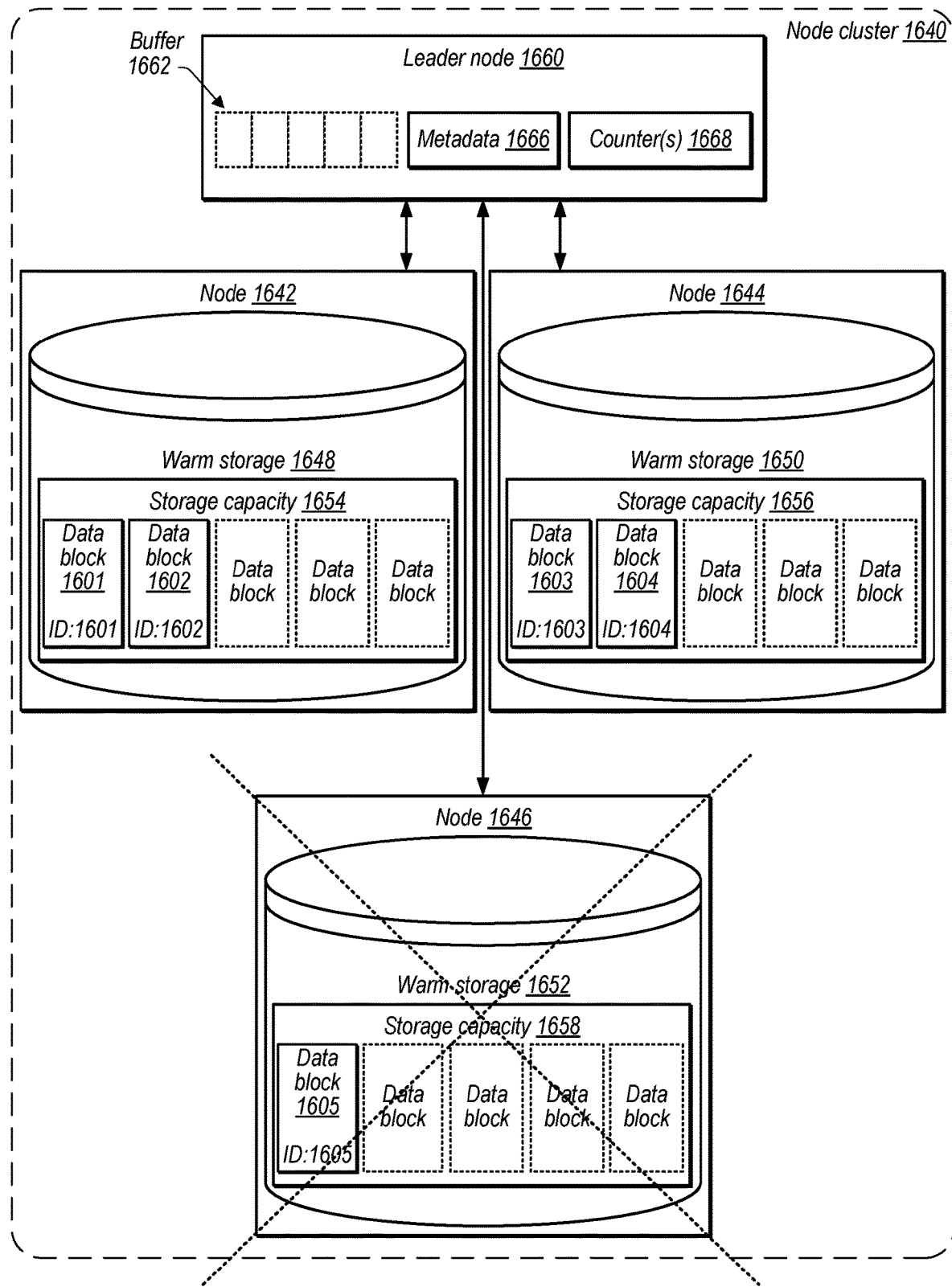
FIG. 16 illustrates an example of the revised storage capacity of a given node cluster if said node cluster were to be re-sized from a three-node cluster to a two-node cluster, according to some embodiments.

FIG. 16 illustrates an example of the revised storage capacity of a given node cluster if said node cluster were to be re-sized from a three-node cluster to a two-node cluster, according to some embodiments.

In FIG. 16, node cluster 1640 currently comprises a leader node, such as leader node 1660, and three storage nodes, namely node 1642, node 1644, and node 1646, that each have respective storage capacities 1654, 1656, and 1658, with the potential to store five data blocks each within warm storage 1648, 1650, and 1652, respectively. As shown in FIG. 16, warm storage 1648 currently stores data block 1601 and 1602, warm storage 1650 currently stores data block 1603 and 1604, and warm storage 1652 currently stores data block 1605. In embodiments in which the storage capacity of the node cluster may be underutilized, such as in FIG. 16, it may be advantageous to consider downsizing the storage capacity of the node cluster.

In such embodiments, downsizing the storage capacity of the node cluster may comprise removing one or more storage nodes from the node cluster. This is shown in FIG. 16 with the dotted "X" over node 1646. In such an example resizing, the storage capacity of node cluster 1640 would decrease from a storage capacity for storing fifteen potential data blocks to storing ten potential data blocks. Furthermore, if a given node cluster is trending towards underutilizing the storage capacity, a buffer used for measuring potential performance of the node cluster given an upsizing in storage capacity, such as buffer 1662, may be optionally removed from node cluster. If buffer 1662 is indeed removed from node cluster 1640, then the corresponding buffer counter may be removed from counter(s) 1668.

In order to track help evaluate the usefulness, or not, of downsizing the storage capacity of a given node cluster, metadata, such as metadata 1666, may be used to track data block identifiers that correspond to data blocks stored in the warm storage. For example, metadata 1666 may comprise data block identifiers 1601, 1602, 1603, 1604, and 1605, since these data block IDs correspond to data blocks that are currently stored in node cluster 1640. Such metadata is further detailed in the descriptions for FIGS. 17A, 17B, and 17C herein. In addition, counter(s) 1668 may comprise one or more counters that correspond to block hit counts on one or more partitions of metadata 1666. Similarly to the methods and techniques described herein for a multilevel buffer that is able to track multiple potential increases to the storage capacity of a given node cluster, multiple potential decreases to the storage capacity of a given node cluster may be tracked via one or more partitions of metadata 1666. Such partitions are further detailed in the descriptions for FIGS. 17A, 17B, and 17C herein. It should also be noted that metadata, such as metadata 1666, and counters that correspond to block hit counts on one or more partitions of the metadata may also be components and functionalities that are present and occur in the embodiments described in FIGS. 2-15. In such embodiments, it may be advantageous to track one or more upsizing storage capacity scenarios and one or more downsizing storage capacity scenarios for the same given node cluster.

Figure 17A:
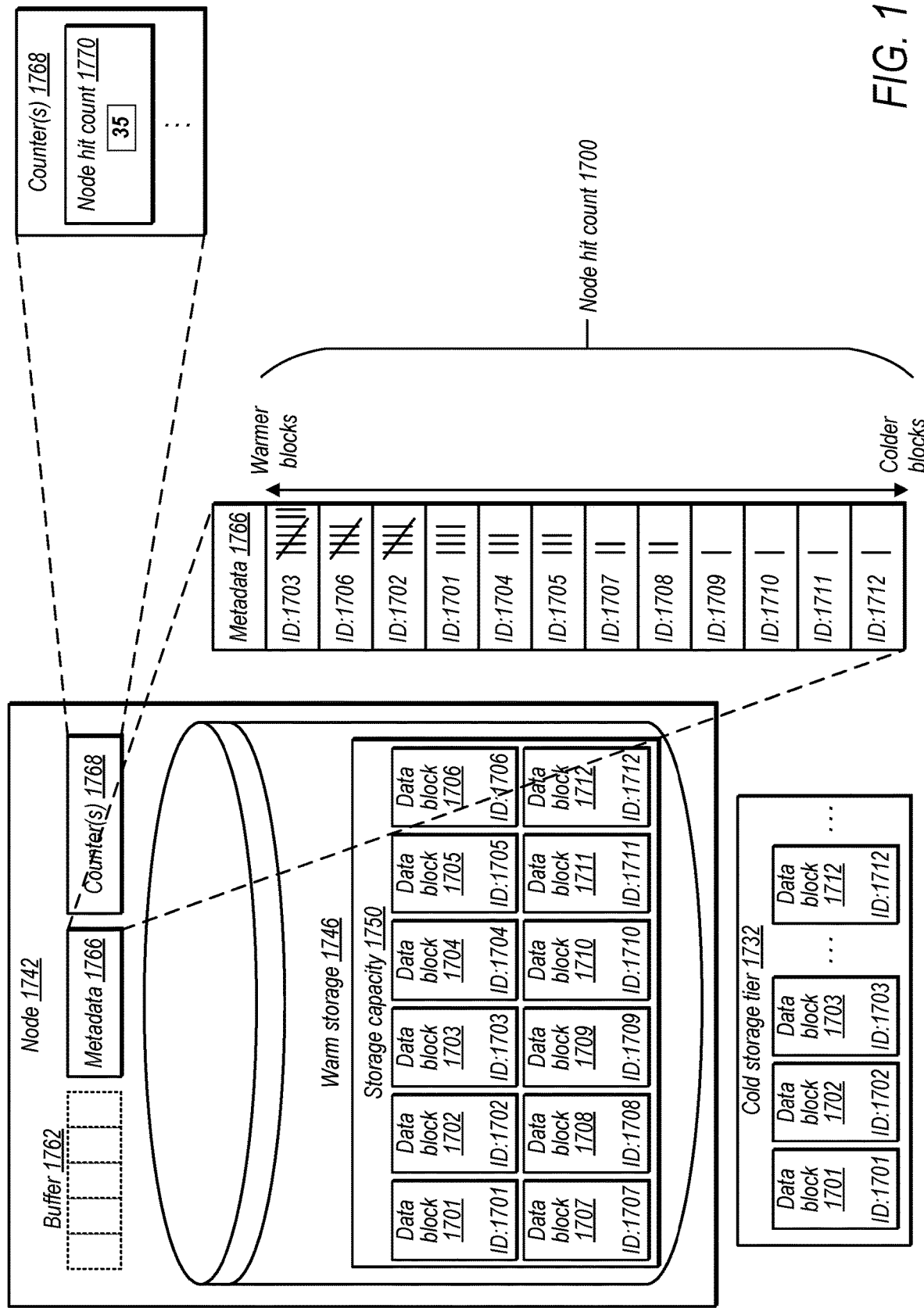
FIG. 17A illustrates a given node of a node cluster of the warm storage tier, wherein the given node stores metadata that prioritizes data blocks stored in the warm storage tier by frequency of use by incoming queries; counters, each corresponding to a respective data block stored in the warm storage tier, that increment each time an incoming query comprises the respective data block; and a counter that increments each time an incoming query comprises a data block stored in the given node, according to some embodiments.

FIG. 17A illustrates a given node of a node cluster of the warm storage tier, wherein the given node stores metadata that prioritizes data blocks stored in the warm storage tier by frequency of use by incoming queries; counters, each corresponding to a respective data block stored in the warm storage tier, that increment each time an incoming query comprises the respective data block; and a counter that increments each time an incoming query comprises a data block stored in the given node, according to some embodiments.

FIG. 17A depicts node 1742 of a given node cluster of the data processing service which comprises an optional buffer 1762, metadata 1766, counter(s) 1768, and warm storage 1746. Warm storage 1746 has a potential storage capacity to store twelve data blocks, as shown by storage capacity 1750, and is currently storing data blocks 1701, 1702, 1703, 1704, 1705, 1706, 1707, 1708, 1709, 1710, 1711, and 1712. The data processing service also utilizes cold storage tier 1732 to store at least data blocks 1701, 1702, 1703, 1704, 1705, 1706, 1707, 1708, 1709, 1710, 1711, and 1712. As described above with regard to FIG. 16, buffer 1762 may be optionally removed in embodiments where downsizing the storage capacity of a given node cluster is of higher concern than upsizing the storage capacity, according to some embodiments.

Metadata 1766 comprises a list of data block identifiers that correspond to data blocks that are currently stored in warm storage 1746, according to some embodiments. A person having ordinary skill in the art should understand that such a list refers to a type of organization of the metadata, and does not necessarily refer to a "list" in a handwritten sense of the word. In some embodiments, data block identifiers in metadata 1766 may be organized by the frequency at which the given data block it corresponds to is called or referenced by a query to the data processing service. This may also be referred to a warm-to-cold block spectrum, as shown by the arrow in FIG. 17A. For example, at the given moment or "screenshot" depicted in FIG. 17A, data block 1703 has been referenced seven times by recent queries, and therefore data block ID 1703 may be considered as the "warmest" data block identifier of metadata 1766, while data block 1712 has been referenced one time by recent queries, and therefore data block ID 1712 may be considered as the "coldest" data block identifier of metadata 1766.

The counters associated to the respective data block identifiers in metadata 1766 may be incremented when a future query references the respective data block it pertains to, and therefore the list in metadata 1766 may be dynamic according to the changing values of the counters. In addition, if a given data block currently stored in warm storage 1746 is evicted or aged out from warm storage 1746, the corresponding data block identifier is removed from metadata 1766, according to some embodiments. Similarly, if a given data block not currently stored in warm storage 1746 is added to warm storage 1746 due to the given data block being referenced by a query, the corresponding data block identifier is added to metadata 1766 and the respective counter is incremented by one.

In addition, counter(s) 1768 may comprise one or more counters associated to the tracking of one or more partitions of metadata 1766. For instance, node hit count 1700 may track the number of times a query comprises a data block currently being stored in node 1742, and may be considered as a "partition" comprising all data block identifiers stored in metadata 1766. In the embodiments shown in FIG. 17A, node hit count 1700 shows that 35 references by queries have been made to data blocks stored in warm storage 1746. Node hit count 1700 may be used as counter for the number of hits to the current storage capacity of node 1742. A person having ordinary skill in the art should understand that node hit count 1700 may be incremented according to data blocks stored in warm storage 1746 that are referenced by queries, however it is not reliant on which data blocks are stored in warm storage 1746. If, for example, data block 1712 is aged out of warm storage 1746, and a data block 1713 (not shown in the figure) is added to warm storage 1746 due to a query comprising data block 1713, node hit counter 1770 would be incremented by one due to the query comprising data block 1713.

Figure 17B:
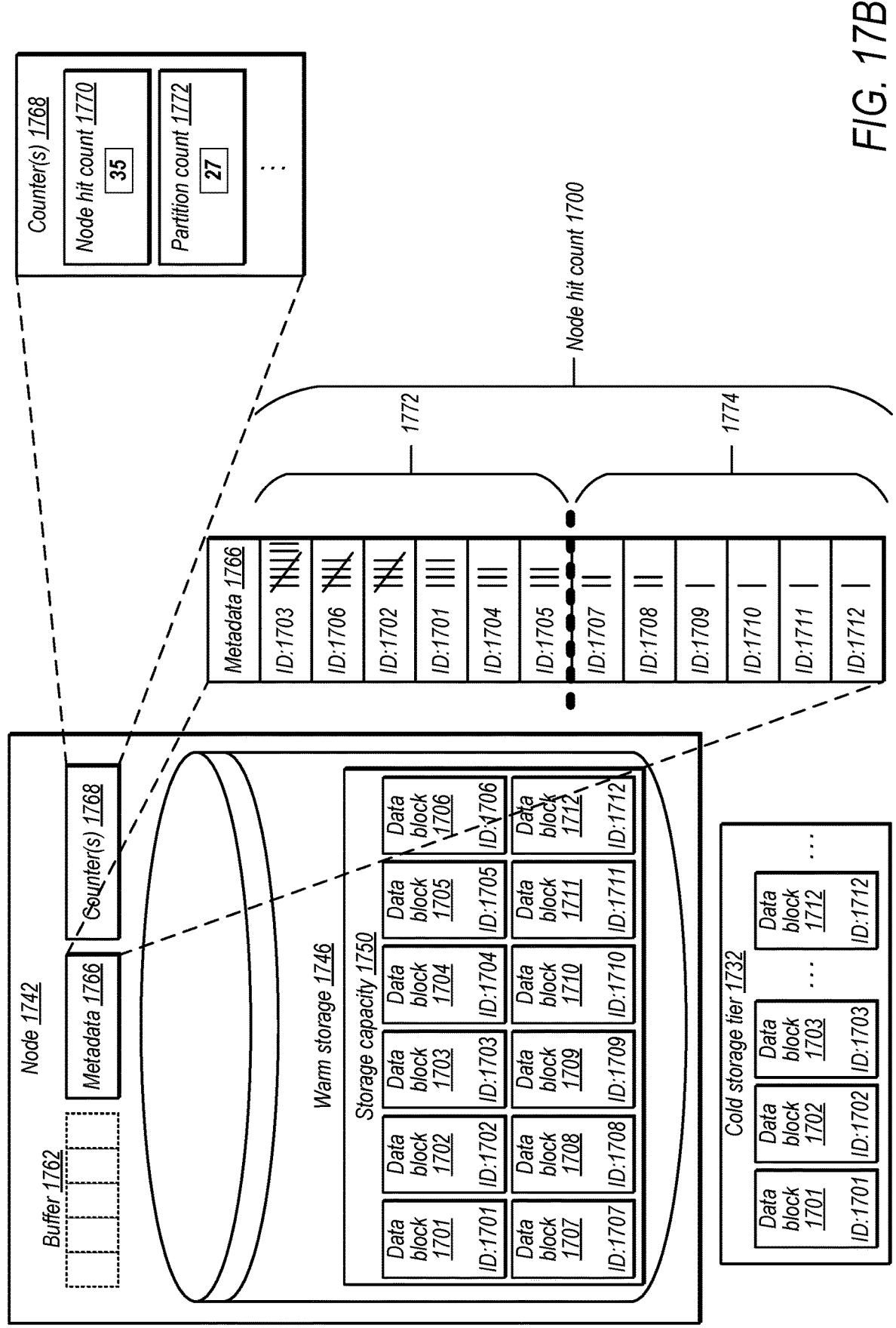
FIG. 17B illustrates the metadata and counters described in FIG. 17A, in addition to at least a counter that increments each time an incoming query comprises a data block in the first half of the data blocks in the prioritized metadata, according to some embodiments.
Figure 17C:
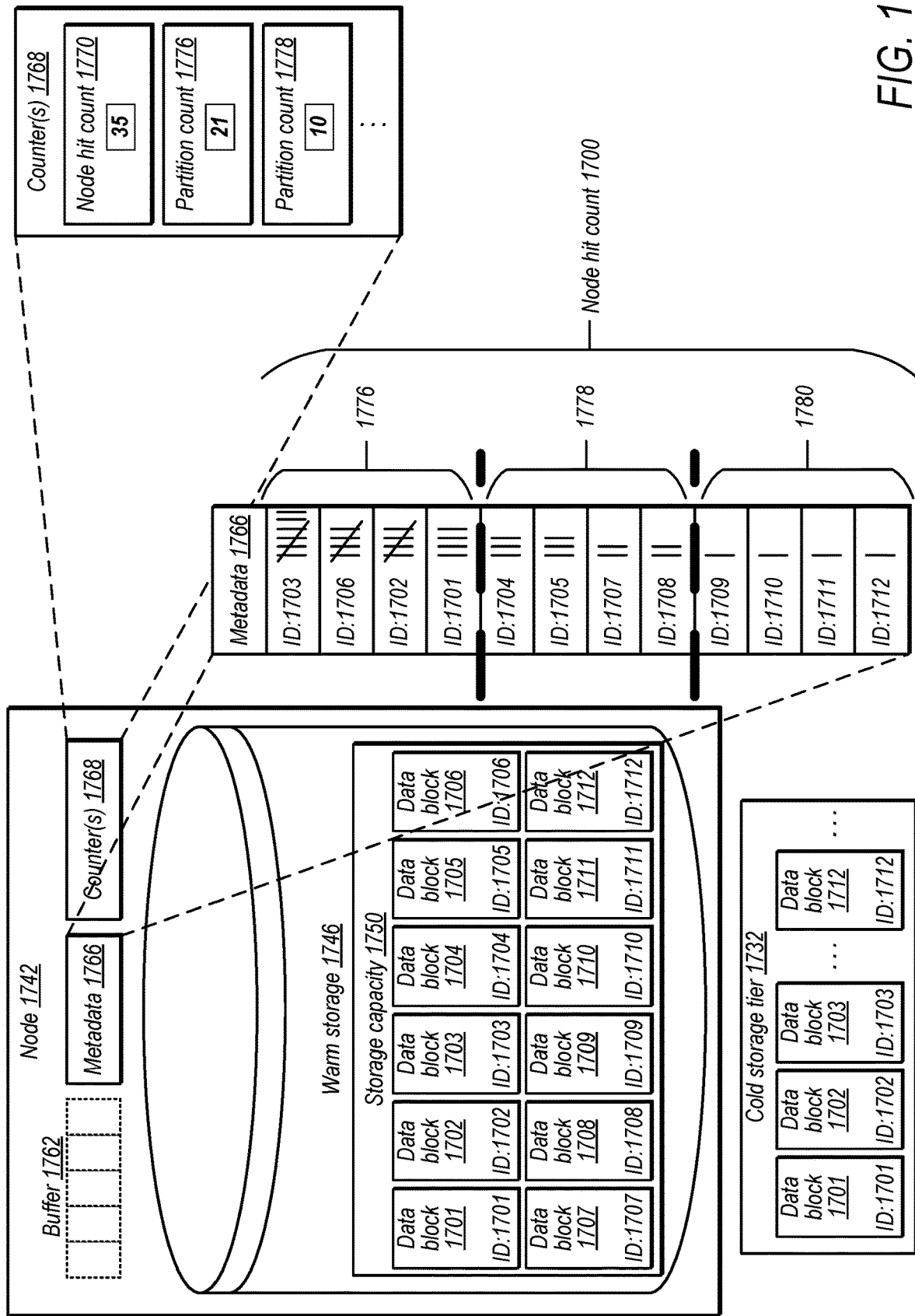
FIG. 17C illustrates the metadata and counters described in FIGS. 17A-B, in addition to at least counters that increment each time an incoming query comprises a data block in the first third and second third of the data blocks in the prioritized metadata, according to some embodiments.

As described in FIGS. 17B and 17C, the value in node hit count 1700 may be used to compare to values in counters corresponding to other partitions of metadata 1766 (see descriptions for 1772, 1774, 1776, 1778, and 1780 herein) in order to form a recommendation, or not, to downsize the storage capacity of node 1742.

FIG. 17B illustrates the metadata and counters described in FIG. 17A, in addition to at least a counter that increments each time an incoming query comprises a data block in the first half of the data blocks in the prioritized metadata, according to some embodiments.

FIG. 17B depicts two additional partitions, 1772 and 1774, of metadata 1766, which correspond to the first half and second half of data block identifiers stored in metadata 1766, respectively. In some embodiments, node 1742 may be used as one node in a four-node node cluster, such as node cluster 130. In such embodiments, partitions 1772 and 1774 may be used to track hits on the "warmer" half and "colder" half of the data block identifiers stored in metadata 1766, and similar partitions may be used in the other three nodes of the current four-node node cluster. In the event of considering downsizing from a four-node node cluster to a two-node node cluster, this would reduce the potential storage capacity of the current four-node node cluster by half. In such embodiments, partition count 1772, which has a value of 27 in the embodiments shown in FIG. 17B, may be compared to the value in node hit count 1770, which is 35, to help understand if it would be advantageous to recommend said downsizing of the storage capacity or not.

In the embodiments shown in FIG. 17B, counter(s) 1768 comprises node hit count 1770 and partition count 1772, and therefore a "partition count 1774" may not be required since the value in partition count 1772 may be subtracted from the value in node hit count 1770 in order to obtain the value that would correspond to a partition count 1774. However, in other embodiments, counter(s) 1768 would additionally comprise a partition count 1774, or comprise a partition count 1774 but not partition count 1772.

FIG. 17C illustrates the metadata and counters described in FIGS. 17A-B, in addition to at least counters that increment each time an incoming query comprises a data block in the first third and second third of the data blocks in the prioritized metadata, according to some embodiments.

FIG. 17C depicts three other partitions, 1776, 1778, and 1780, of metadata 1766, which correspond to the first third, second third, and last third of data block identifiers stored in metadata 1766, respectively. In some embodiments, node 1742 may be used as one node in a three-node node cluster, such as node cluster 120. In such embodiments, partitions 1776, 1778, and 1780 may be used to track hits respective thirds of the data block identifiers stored in metadata 1766, and similar partitions may be used in the other two nodes of the current three-node node cluster. In the event of considering downsizing from a three-node node cluster to a two-node node cluster, this would reduce the potential storage capacity of the current three-node node cluster by a third. In such embodiments, partition counts 1776 and 1778, which have values of 21 and 10 in the embodiments shown in FIG. 17C, may be compared to the value in node hit count 1770, which is 35, to help understand if it would be advantageous to recommend said downsizing of the storage capacity or not.

Similarly to what was described above with regard to FIG. 17B, a "partition count 1780" may not be required since the values in partition counts 1776 and 1778 may be subtracted from the value in node hit count 1770 in order to obtain the value that would correspond to a partition count 1780. However, in other embodiments, counter(s) 1768 would additionally comprise a partition count 1780, or comprise partition counts 1778 and 1780 but not partition count 1776, etc.

In some embodiments, partition count 1776 may additionally be used in the event of considering downsizing from a three-node node cluster to a one-node node cluster, which would reduce the potential storage capacity of the current three-node node cluster by two-thirds. A person having ordinary skill in the art should understand that FIGS. 17B and 17C are meant to exhibit example embodiments of the methods and techniques described herein, and other combinations of partitions may be used for other potential downsizing situations for a given node cluster, and that different partitions may be defined for the same given node cluster in order to track two or more potential downsizing situations.

Figure 18:
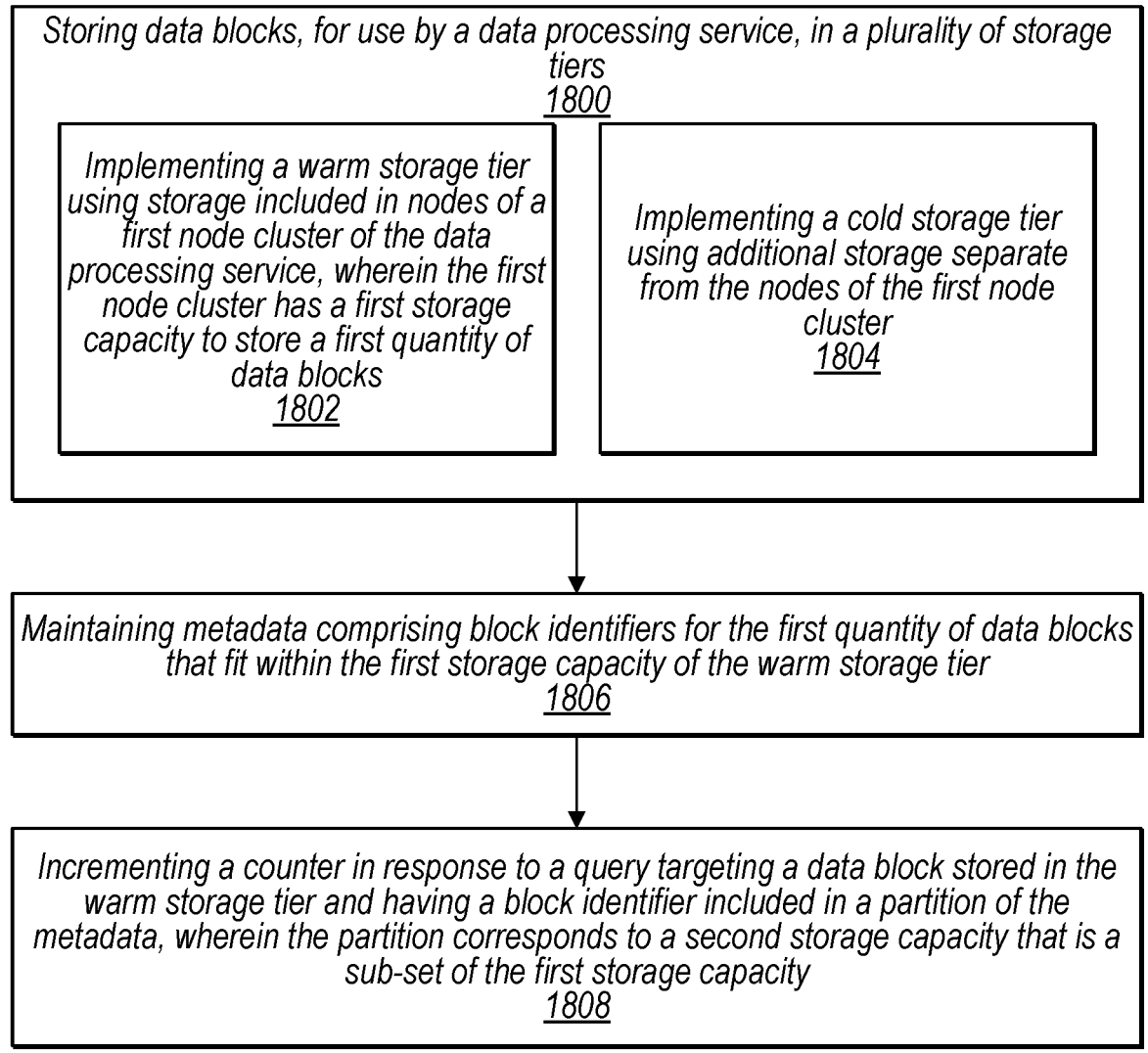
FIG. 18 is a flow diagram illustrating a process of implementing a data processing service to use warm and cold storage tiers to store data blocks for clients of the data processing service, and responding to a query to the data processing service comprising a data block with the corresponding data block identifier in metadata for the first storage capacity of the warm storage tier, according to some embodiments.

FIG. 18 is a flow diagram illustrating a process of implementing a data processing service to use warm and cold storage tiers to store data blocks for clients of the data processing service, and responding to a query to the data processing service comprising a data block with the corresponding data block identifier in metadata for the first storage capacity of the warm storage tier, according to some embodiments.

In block 1800, a data processing service uses a plurality of storage tiers, comprising at least a warm storage tier and a cold storage tier, to store data blocks. In block 1802, the warm storage tier is implemented using storage included in nodes of a first node cluster of the data processing service, wherein the first node cluster has a first storage capacity to store a first quantity of data blocks. In some embodiments, the warm storage tier may resemble warm storage tier 104, and the first node cluster of the data processing service may resemble node cluster 120, with respective nodes 122, 124, and 126, or node cluster 130, with respective nodes 132, 134, 136, and 138, or node cluster 140, with respective nodes 142 and 144. In some embodiments, one of the nodes of the first node cluster may be a leader node, such as leader node 132. In block 1804, the cold storage tier is implemented using additional storage that is separate from the nodes fo the first node cluster. In some embodiments, the cold storage tier uses storage of a data storage service, such as cold storage tier 106 which uses storage of data storage service 102.

In block 1806, metadata comprising data block identifiers for the first quantity of data blocks that fit within the first storage capacity of the warm storage tier is maintained, according to some embodiments. For example, metadata 1766 comprises data block identifiers 1701, 1702, 1703, 1704, 1705, 1706, 1707, 1708, 1709, 1710, 1711, and 1712, which correspond to the respective data blocks that are stored in warm storage 1746. Metadata 1766 may be maintained by dynamically changing the prioritization of respective data block identifiers in response to the number of times their corresponding data blocks are referenced by incoming queries to the data processing service, according to some embodiments.

In block 1808, an incoming query targets a data block that is stored in the warm storage tier that has a corresponding data block identifier included in a given partition of the metadata, wherein the partition corresponds to a second storage capacity that is a sub-set of the first storage capacity, according to some embodiments. In such embodiments, a counter corresponding to the given partition is incremented in response to the query. For example, partition 1772 describes a second storage capacity that is a sub-set of the first storage capacity, wherein partition 1772 corresponds to a sub-set that is half of the first storage capacity, according to some embodiments. Continuing with the example embodiments shown in FIG. 17B, in the event that an incoming query comprised at least one of data blocks that have corresponding data block identifiers stored within partition 1772, e.g. data blocks 1703, 1706, 1702, 1701, 1704, or 1705, partition count 1772 would be incremented from 27 to 28, according to some embodiments. Someone having ordinary skill in the art should understand that block 1808 applies to additional or different partitions as well, such as partitions 1776, 1778, and 1780 described in FIG. 17C, and are encompassed by the methods and techniques described herein.

Examples of Thrashing Detection and Avoidance

In some embodiments, it may be advantageous to track, via counters, the number of times that a data block that has a corresponding data block identifier in a buffer is referenced by incoming queries. In such embodiments, said counters may be used to set a threshold that the counter may reach before the referenced data block is added to the warm storage tier. It may be additionally advantageous to track the elapsed time that a given data block identifier has resided in a given buffer before being accessed by a query. For example, having the functionality of a threshold that sets a number of times that a data block may be referenced before being added to warm storage may be turned on or off depending on information collected from timers that track the elapsed time that given data block identifiers have been stored in a buffer before being referenced by a query. In some embodiments in which one or more of the elapsed times are lower than a given amount of time, this may be used to indicate thrashing of one or more data blocks between the warm and cold storage tiers. In other embodiments in which one or more of the elapsed times are higher than a given amount of time, this may similarly be used to indicate that no thrashing is detected. Correspondingly, the threshold that sets a number of times that a data block may be referenced before being added to warm storage may be considered as a value that may evolve or be adjusted according to a given scenario. It may be set to a higher or lower value, or turned on or off, according to one or more performance needs of a given node cluster.

Figure 19:
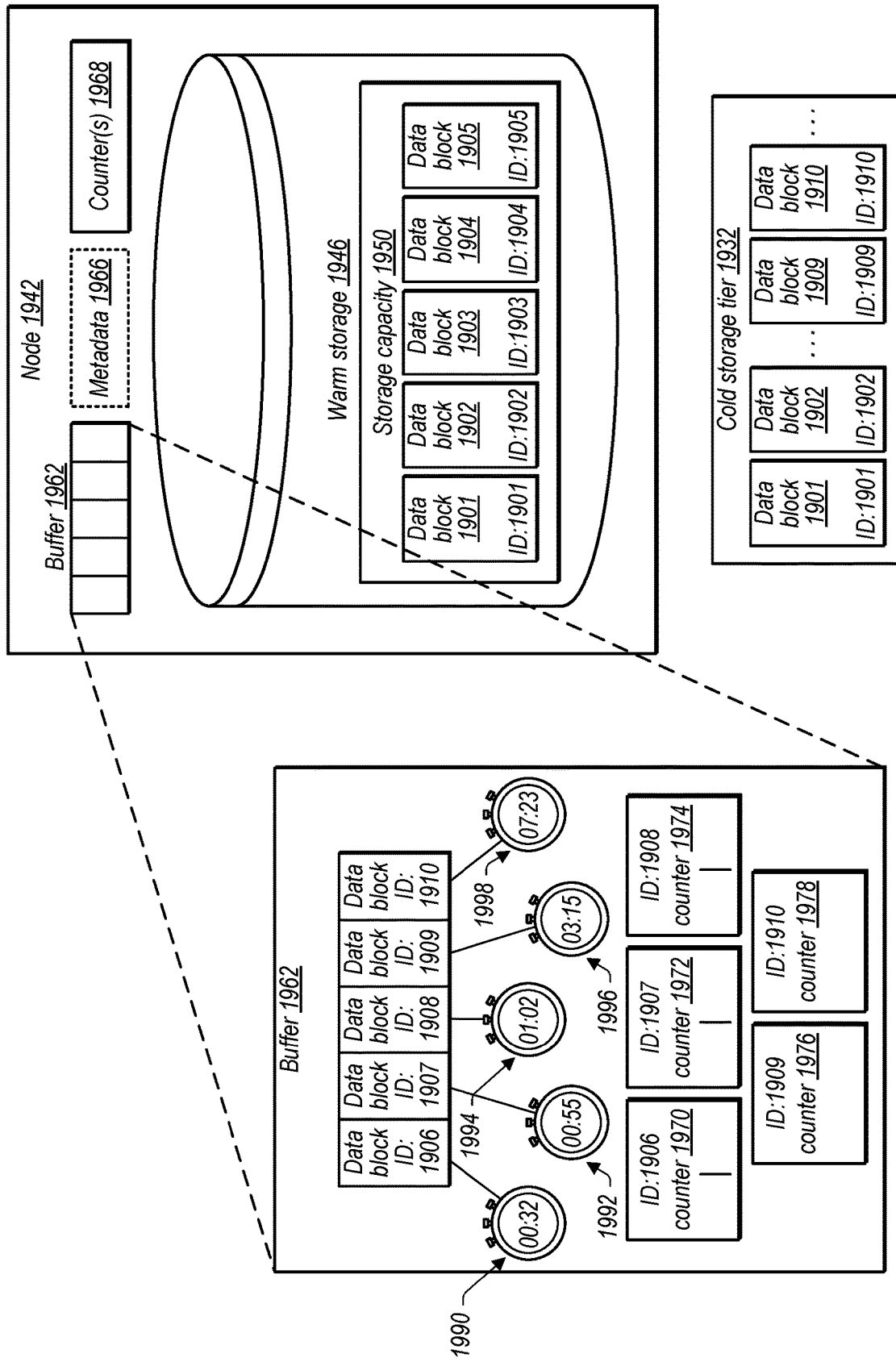
FIG. 19 illustrates a given node of a node cluster of the warm storage tier, wherein a buffer is configured to store additional data block identifiers for a re-sized node cluster configuration, and counters, each corresponding to a respective data block identifier stored in the buffer, that increment each time an incoming query comprises the respective data block, according to some embodiments.

FIG. 19 illustrates a given node of a node cluster of the warm storage tier, wherein a buffer is configured to store additional data block identifiers for a re-sized node cluster configuration, and counters, each corresponding to a respective data block identifier stored in the buffer, that increment each time an incoming query comprises the respective data block, according to some embodiments.

FIG. 19 depicts a given node within a given warm storage tier, node 1942, which comprises buffer 1962, metadata 1966, counter(s) 1968, and warm storage 1946. Warm storage 1946 is configured to have storage capacity 1950, which has the potential to store up to five data blocks. As shown in the example embodiments of FIG. 19, warm storage 1946 is currently storing data blocks 1901, 1902, 1903, 1904, and 1905, and cold storage tier 1932 comprises at least data blocks 1901, 1902, 1903, 1904, 1905, 1906, 1907, 1908, 1909, and 1910. As shown by the dotted line, metadata 1966 may optionally be incorporated within node 1942 or not. Metadata 1966 may resemble metadata 1666 and metadata 1766 and may have the respective functionalities of metadata 1666 and metadata 1766 described in FIGS. 16, 17A, 17B, and 17C, according to some embodiments.

As shown in the example embodiments of FIG. 19, buffer 1962 is configured to store up to five data block identifiers that correspond to additional data blocks that are not currently being stored in warm storage 1946, e.g. data block IDs 1906, 1907, 1909, 1909, and 1910. Buffer 1962 additionally comprises respective counters for the data block identifiers currently being stored in buffer 1962, such as ID:1906 counter 1970, ID:1907 counter 1972, ID:1908 counter 1974, ID:1909 counter 1976, and ID:1910 counter 1978. In some embodiments, counters such as ID:1906 counter 1970, ID:1907 counter 1972, ID:1908 counter 1974, ID:1909 counter 1976, and ID:1910 counter 1978 may be located in buffer 1962. In other embodiments, such counters may be located in counter(s) 1968, or another location local to warm storage 1946. In addition, respective counters for data blocks 1901, 1902, 1903, 1904, and 1905, or other data blocks stored in warm storage 1946, may also exist that track the number of times the respective data block has been referenced by one or more incoming queries, according to some embodiments.

At the given moment depicted in FIG. 19, ID:1906 counter 1970, ID:1907 counter 1972, and ID:1908 counter 1974 have values of one, while ID:1909 counter 1976 and ID:1910 counter 1978 have values of zero. These values may refer to the number of times a data block corresponding to the given data block ID has been referenced by one or more incoming queries. In addition, timers 1990, 1992, 1994, 1996, and 1998 may track the time that has elapsed since the last time that data blocks 1906, 1907, 1908, 1909, and 1910, respectively, have been referenced by a query. Information gathered by timers 1990, 1992, 1994, 1996, and 1998 may be used to determine if a threshold should be set, and what value the threshold should be, according to some embodiments. In some embodiments, a given timer may be reset back to zero when a respective data block with a corresponding data block identifier in buffer 1962 is referenced by an incoming query to the data processing service.

Figure 20A:
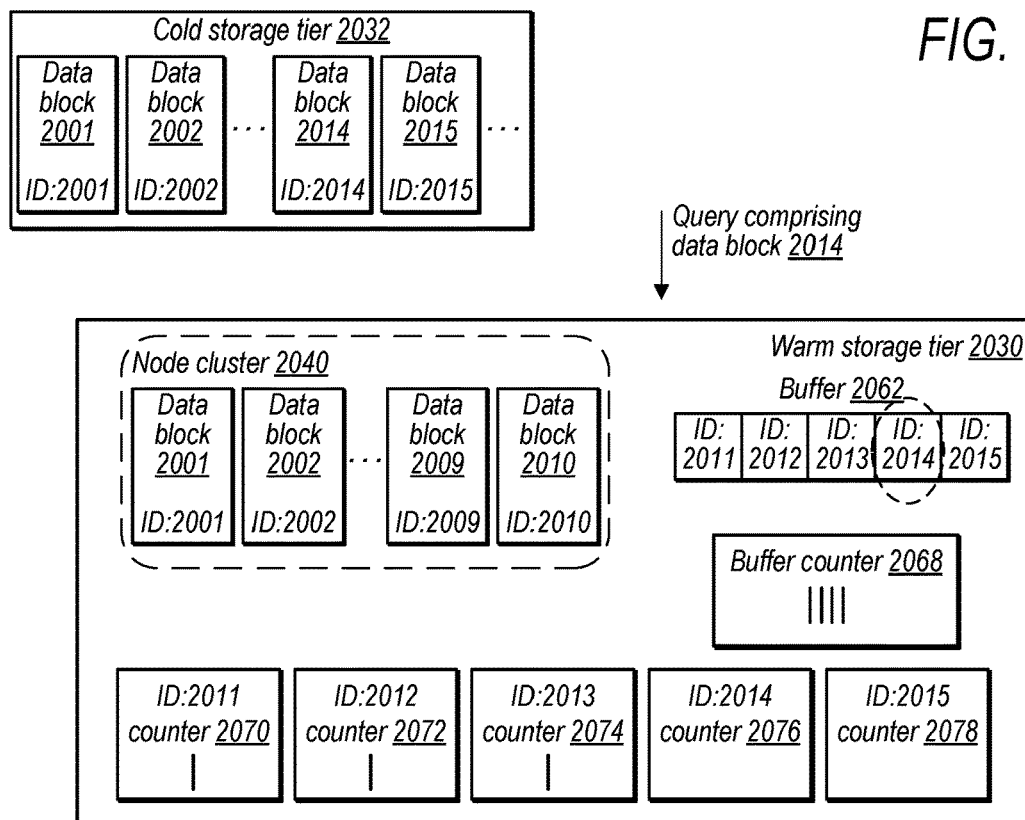
FIG. 20A illustrates a seventh example of an incoming query to the data processing service, according to some embodiments.
Figure 20B:
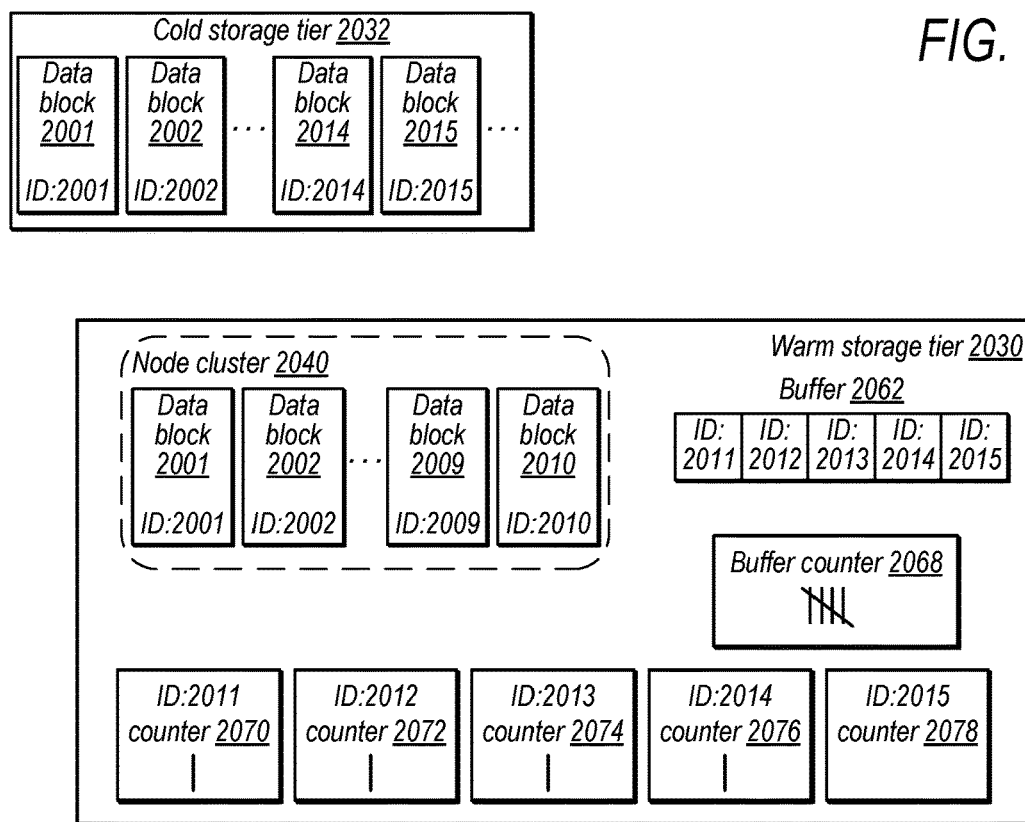
FIG. 20B illustrates an example of the utilization of the buffer and counters of the buffer in response to the query of FIG. 20A, according to some embodiments.

FIG. 20A illustrates a seventh example of an incoming query to the data processing service, and FIG. 20B illustrates an example of the utilization of the buffer and counters of the buffer in response to the query of FIG. 20A, according to some embodiments.

FIG. 20A depicts a data processing service comprising warm storage tier 2030 and cold storage tier 2032 at a moment in which an incoming query comprising data block 2014 begins processing in the data processing service. In some embodiments, the query comprising data block 2014 may resemble query 150, and the functionalities associated to query 150 described herein. Warm storage tier 2030 comprises node cluster 2040, buffer 2062, and buffer counter 2068. In some embodiments, buffer 2062 and buffer counter 2068 may resemble buffers and buffer counters described in FIGS. 2, 3, 4, 5, 6, 7, 8A, 8B, 9A, 9B, 10A, 10B, 11A, 11B, 12A, 12B, 13A, 13B, 14A, 14B, and 15.

Cold storage tier 2032 comprises at least the storage of data blocks 2001, 2002, 2003, 2004, 2005, 2006, 2007, 2008, 2009, 2010, 2011, 2012, 2013, 2014, and 2015, according to some embodiments. As described above, data blocks stored in cold storage tier may be considered as the authoritative or definitive version of the data, while data blocks stored in node cluster 2040 may represent a cached version of the data. According to the embodiments shown in FIG. 20A, node cluster 2040 has the capacity to store ten data blocks, such as data blocks 2001, 2002, 2003, 2004, 2005, 2006, 2007, 2008, 2009, and 2010, and is at full capacity for data block storage at the given moment depicted in FIG. 20A. In addition, five data block identifiers, data block IDs 2011, 2012, 2013, 2014, and 2015, are currently stored in buffer 2062, and buffer counter 2068 has a value of four.

Warm storage tier 2030 additionally comprises ID:2011 counter 2070, ID:2012 counter 2072, ID:2013 counter 2074, ID:2014 counter 2076, and ID:2015 counter 2078, and such counters may resemble the counters within buffer 1962 described herein. In some embodiments, ID:2011 counter 2070, ID:2012 counter 2072, ID:2013 counter 2074, ID:2014 counter 2076, and ID:2015 counter 2078 may be located within buffer 2062. However, said counters may be located in other locations within a given warm storage tier, such as within counter(s) 1968, according to other embodiments. According to the example embodiments shown in FIG. 20A, ID:2011 counter 2070, ID:2012 counter 2072, and ID:2013 counter 2074 have values of one, and ID:2014 counter 2076 and ID:2015 counter 2078 have values of zero. In some embodiments, these values may refer to the number of times that a given corresponding data block has been referenced by a query but not added to warm storage tier 2030 in response to said query. In embodiments where a threshold is set at two query references, the given corresponding data block may be referenced up to two times before being added to warm storage tier 2030. Another example of these types of scenarios is described in FIGS. 21A and 21B, herein.

As shown in FIG. 20A, at the moment that the query comprising data block 2014 is being processed by the data processing service, data block 2014 is currently stored in cold storage tier 2032, and is not currently one of the ten data blocks stored in node cluster 2040. However, it is one of the five data block identifiers currently being stored in buffer 2062. In the embodiments shown in FIG. 20A in which the threshold is set at two query references, and where ID:2014 counter 2076 currently has a value of zero, data block 2014 may not be promoted (or added) to warm storage tier 2030 in response to the query comprising data block 2014. In some embodiments, however, buffer counter 2068 may be incremented (e.g. from four to five) and ID:2014 counter 2076 may be incremented (e.g. from zero to one) in response to the query comprising data block 2014.

Figure 21A:
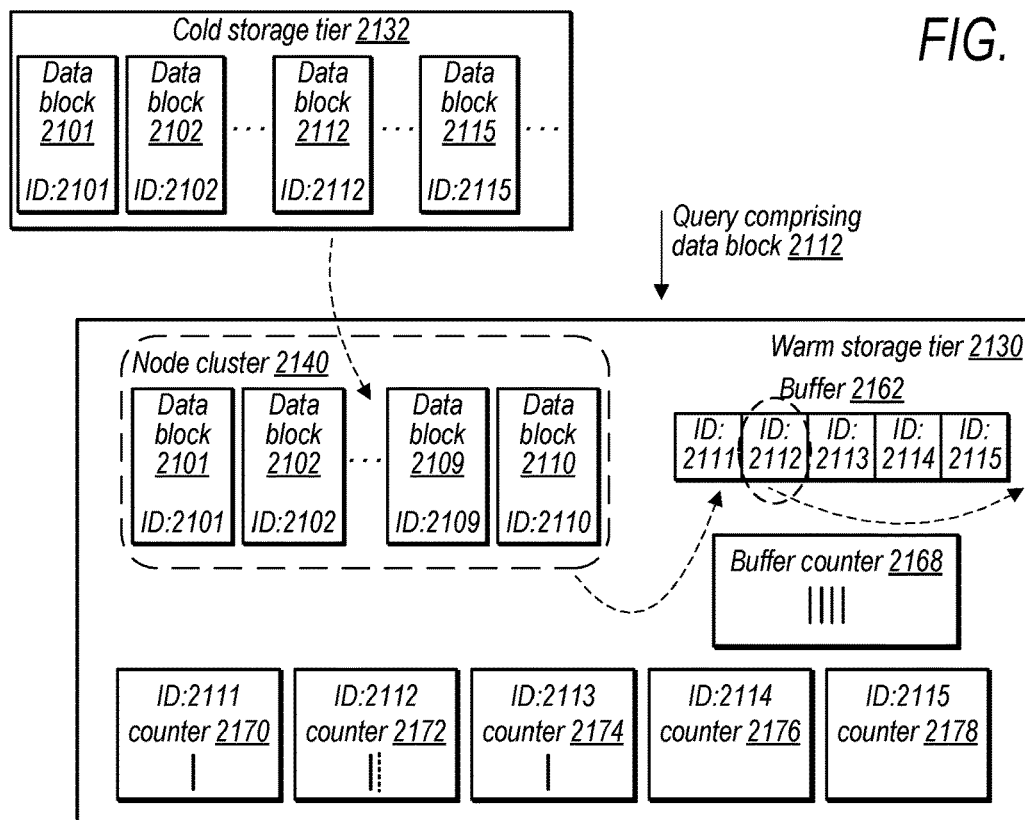
FIG. 21A illustrates an eighth example of an incoming query to the data processing service, according to some embodiments.
Figure 21B:
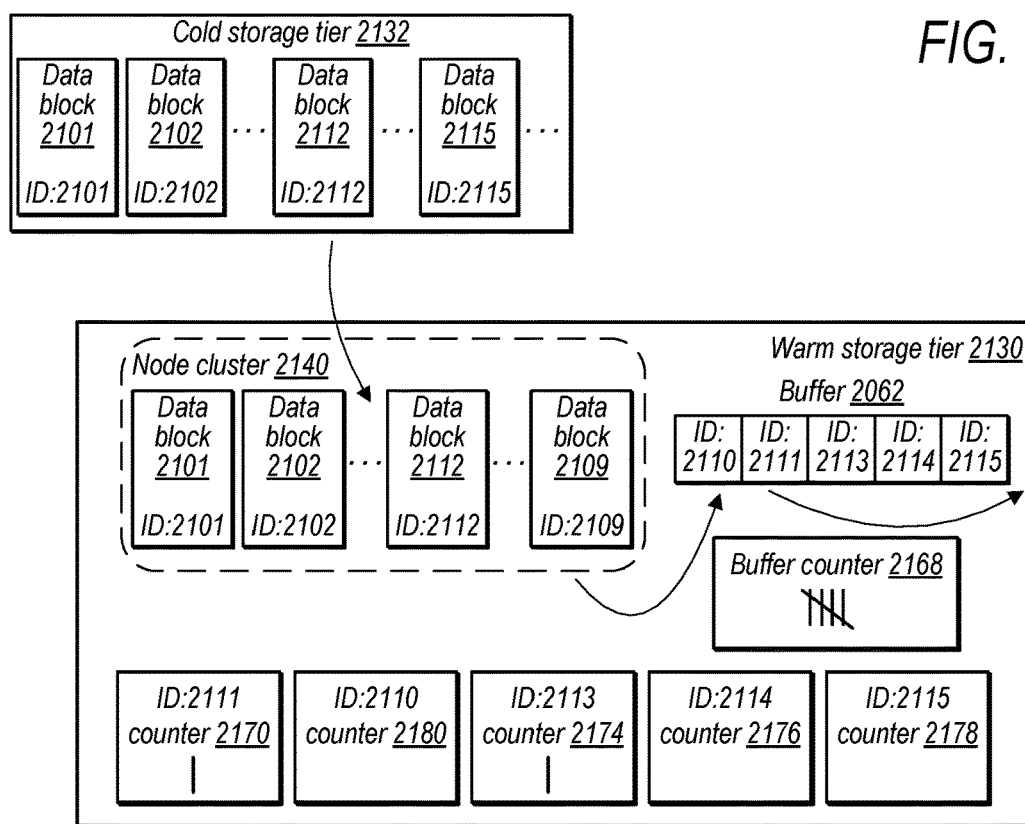
FIG. 21B illustrates an example of the utilization of the buffer and counters of the buffer in response to the query of FIG. 21A, according to some embodiments.

FIG. 21A illustrates an eighth example of an incoming query to the data processing service, and FIG. 21B illustrates an example of the utilization of the buffer and counters of the buffer in response to the query of FIG. 21A, according to some embodiments.

FIG. 21A depicts a data processing service comprising warm storage tier 2130 and cold storage tier 2132 at a moment in which an incoming query comprising data block 2112 begins processing in the data processing service. Warm storage tier 2130 comprises node cluster 2140, buffer 2162, and buffer counter 2168. In some embodiments, buffer 2162 and buffer counter 2168 may resemble buffers and buffer counters described in FIGS. 20A and 20B. Cold storage tier 2132 comprises at least the storage of data blocks 2101, 2102, 2103, 2104, 2105, 2106, 2107, 2108, 2109, 2110, 2111, 2112, 2113, 2114, and 2115, according to some embodiments. According to the embodiments shown in FIG. 21A, node cluster 2140 has the capacity to store ten data blocks, such as data blocks 2101, 2102, 2103, 2104, 2105, 2106, 2107, 2108, 2109, and 2110, and is at full capacity for data block storage at the given moment depicted in FIG. 21A. In addition, five data block identifiers, data block IDs 2111, 2112, 2113, 2114, and 2115, are currently stored in buffer 2162, and buffer counter 2168 has a value of four.

Warm storage tier 2130 additionally comprises ID:2111 counter 2170, ID:2112 counter 2172, ID:2113 counter 2174, ID:2114 counter 2176, and ID:2115 counter 2178. According to the example embodiments shown in FIG. 21A, ID:2111 counter 2170, ID:2112 counter 2172, and ID:2113 counter 2174 have values of one, and ID:2114 counter 2176 and ID:2115 counter 2178 have values of zero. In some embodiments in which the threshold is set at two query references, the given corresponding data block may be referenced up to two times before being added to warm storage tier 2130.

As shown in FIG. 21A, at the moment that the query comprising data block 2112 is being processed by the data processing service, data block 2112 is currently stored in cold storage tier 2132, and is not currently one of the ten data blocks stored in node cluster 2140. However, it is one of the five data block identifiers currently being stored in buffer 2162. In the embodiments shown in FIG. 21A in which the threshold is set at two query references, and where ID:2112 counter 2172 currently has a value of one, ID:2112 counter 2172 may be incremented (from one to two, as shown by the dotted line in ID:2112 counter 2172) and data block 2112 may then be promoted to warm storage tier 2130 in response to the query comprising data block 2112. In some embodiments, buffer counter 2168 may also be incremented (e.g. from four to five).

In some embodiments, also in response to the query comprising data block 2112, data block 2112 may be placed in node cluster 2140 in response to the query comprising data block 2112, as shown by the arrows, and data block identifier 2112 is removed from buffer 2162. As node cluster 2140 shown in FIG. 21A was already at full capacity, one of the ten data blocks stored in node cluster 2140 is evicted from the node cluster. In the embodiments shown in FIGS. 21A and 21B, data block 2110 is evicted from node cluster 2140. In some embodiments, in response to this eviction, the data block identifier corresponding to data block 2110 may be stored in buffer 2162. As shown in the example embodiments of FIG. 21B, ID:2112 counter 2172 is removed from warm storage tier 2130 in response to data block identifier 2112 no longer being stored in buffer 2162, and ID:2110 counter 2180 is added to warm storage tier 2130 in response to data block identifier 2110 being added to buffer 2162.

Figure 22:
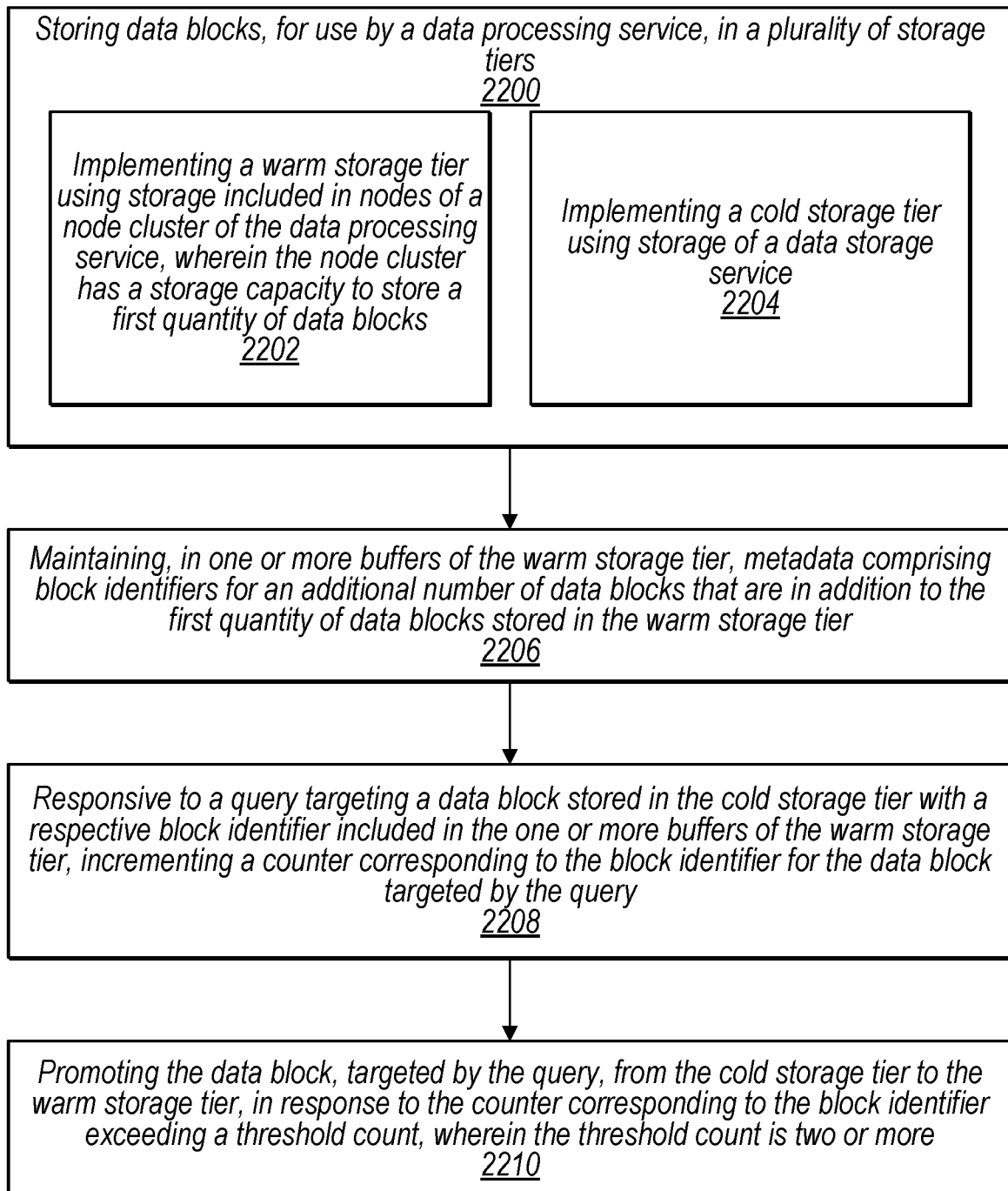
FIG. 22 is a flow diagram illustrating a process of implementing a data processing service to use warm and cold storage tiers to store data blocks for clients of the data processing service, and promoting a data block to the warm storage tier in response to a counter associated to the given data block reaching a given threshold, according to some embodiments.

FIG. 22 is a flow diagram illustrating a process of implementing a data processing service to use warm and cold storage tiers to store data blocks for clients of the data processing service, and promoting a data block to the warm storage tier in response to a counter associated to the given data block reaching a given threshold, according to some embodiments.

In block 2200, a plurality of storage tiers, comprising at least a warm storage tier and a cold storage tier, are used by a data processing service to store data blocks. In block 2202, the warm storage tier is implemented using storage included in nodes of a node cluster of the data processing service, wherein the node cluster has a storage capacity to store a first quantity of data blocks. In some embodiments, the warm storage tier may resemble warm storage tier 104, and the node cluster of the data processing service may resemble node cluster 120, with respective nodes 122, 124, and 126, or node cluster 130, with respective nodes 132, 134, 136, and 138, or node cluster 140, with respective nodes 142 and 144. In block 2204, the cold storage tier is implemented using storage of a data storage service. In some embodiments, the cold storage tier may resemble cold storage tier 106, and may be implemented using data storage service 102.

In block 2206, metadata comprising data block identifiers for an additional number of data blocks that are in addition to the first quantify of data block stored in the warm storage tier are maintained. In some embodiments, the data block identifiers for an additional number of data blocks may refer to data block identifiers stored in a buffer, such as data block IDs 1906, 1907, 1909, 1909, and 1910 stored in buffer 1962. The metadata may be maintained via at least the methods and example embodiments shown in FIGS. 19, 20A, 20B, 21A, and 21B, in which the data processing service treats incoming queries and tracks performance of the given node cluster via buffers, counters and/or timers, according to some embodiments.

In block 2208, an incoming query targets a data block stored in the cold storage tier with a respective data block identifier included in the one or more buffers of the warm storage tier, and, in response to the incoming query, a counter corresponding to the data block identifier for the data block targeted by the incoming query is incremented. For example, as shown in FIGS. 21A, a query comprising data block 2112 targets data block 2112, which is stored in cold storage tier 2132, but is not currently stored in node cluster 2140. Data block ID 2112 is, however, currently stored in buffer 2162. In response to the query comprising data block 2112, ID:2112 counter 2172 is incremented (e.g. from one to two, as shown in FIG. 21A).

In block 2210, incrementing the counter in block 2208 causes the counter to exceed a threshold count, wherein the threshold count is two or more, and, in response, the data block that was targeted by the incoming query is promoted from the cold storage tier to the warm storage tier. Continuing with the example embodiments shown in FIGS. 21A and 21B, ID:2112 counter 2172 was incremented to two according to block 2208, and, given that the threshold count is two or more, data block 2112 is promoted to node cluster 2140. In some embodiments, this may further cause cascading evictions, which are described by at embodiments shown in at least FIGS. 21A and 21B.

Figure 23:
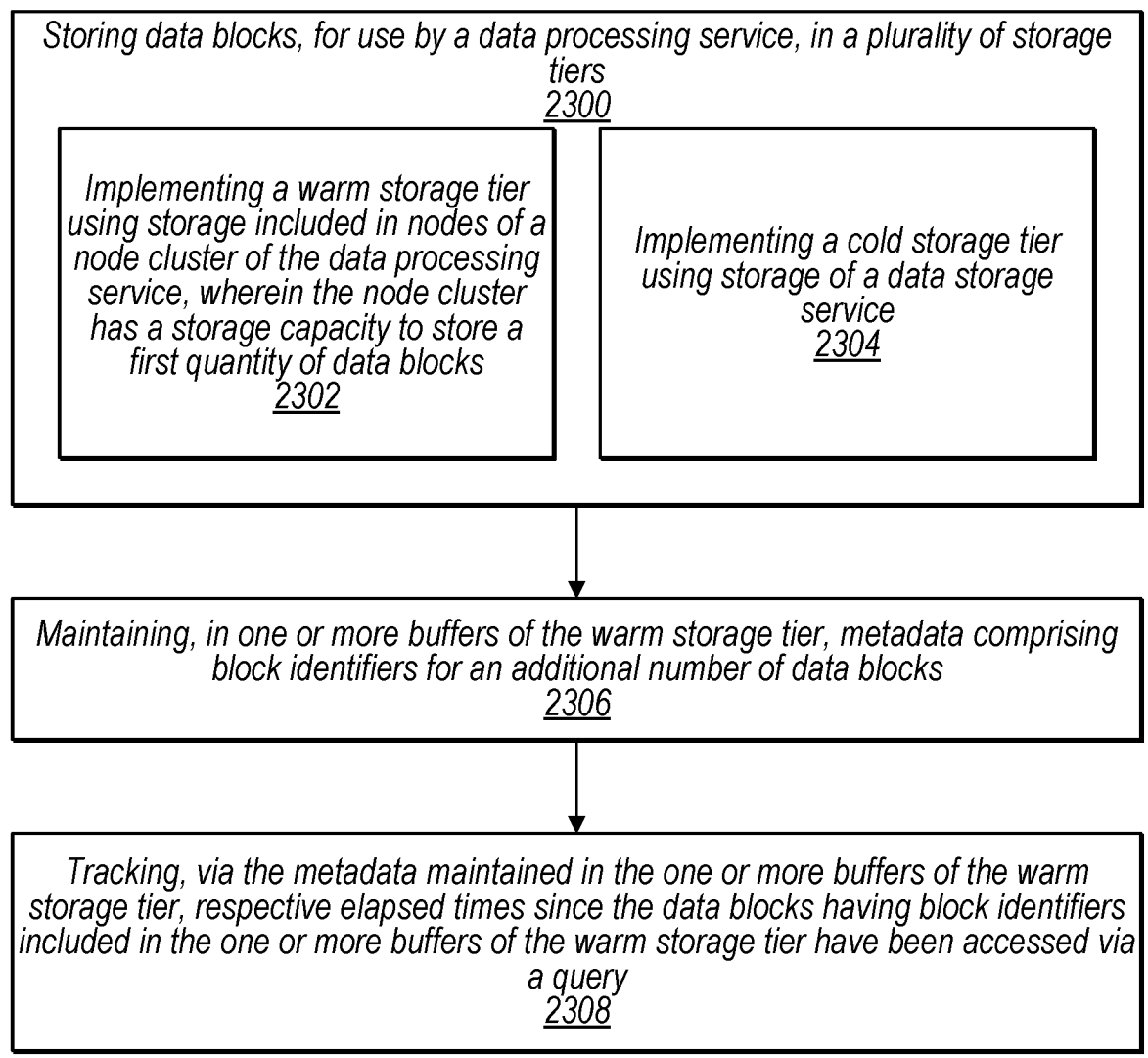
FIG. 23 is a flow diagram illustrating a process of implementing a data processing service to use warm and cold storage tiers to store data blocks for clients of the data processing service, and tracking elapsed time between accessing data blocks with corresponding data block identifiers in the buffer, according to some embodiments.

FIG. 23 is a flow diagram illustrating a process of implementing a data processing service to use warm and cold storage tiers to store data blocks for clients of the data processing service, and tracking elapsed time between accessing data blocks with corresponding data block identifiers in the buffer, according to some embodiments.

In block 2300, a data processing service uses a plurality of storage tiers to store data blocks. In some embodiments, the plurality of storage tiers comprises at least warm storage tier and a cold storage tier. In block 2302, the warm storage tier is implemented using storage included in nodes of a node cluster of the data processing service, wherein the node cluster has a storage capacity to store a first quantity of data blocks. In block 2304, the cold storage tier is implemented using storage of a data storage service. In some embodiments, blocks 2300, 2302, and 2304 may resemble the embodiments described for blocks 2200, 2202, and 2204 herein. In block 2306, metadata comprising block identifiers for an additional number of data blocks are maintained in one or more buffers of the warm storage tier. In some embodiments, block 2306 may resemble the embodiments described for block 2206 herein.

In block 2308, the metadata maintained in the one or more buffers of the warm storage tier are used to track respective elapsed times since the data blocks having block identifiers included in the one or more buffers of the warm storage tier have been accessed via an incoming query. In some embodiments, block 2308 may resemble the methods described for FIG. 19, in which timers 1990, 1992, 1994, 1996, and 1998 are used to track elapsed times since data blocks corresponding to data block IDs 1906, 1907, 1908, 1909, and 1910 have been accessed via an incoming query. In some embodiments, the respective elapsed times may be used to provide a recommendation to re-configure the node cluster for improved performance.

In some embodiments, the methods and techniques described in FIGS. 22 and 23 may be used in conjunction with one another. In such embodiments, elapsed times that are less than a given amount of time may indicate thrashing of one or more data blocks between the warm and cold storage tiers. In embodiments in which thrashing is not detected, the threshold described for FIG. 22 may be set to a lower value (e.g. one query reference instead of two query references), or the threshold may even be turned off. In embodiments in which thrashing is detected, the threshold described for FIG. 22 may be turned on, or, in embodiments in which the threshold is already turned on, it may be set to a higher value (e.g. three query references instead of two query references).

The methods described herein may in various embodiments be implemented by any combination of hardware and software. For example, in one embodiment, the methods may be implemented by a computer system (e.g., a computer system as in FIG. 24) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of the present disclosure may be described in view of the following clauses:

Clause 1. A system, comprising:
one or more computing devices configured to implement a data processing service, wherein the data processing service uses a plurality of storage tiers to store data blocks, the plurality of storage tiers comprising at least:
a warm storage tier implemented using storage included in nodes of a first node cluster of the data processing service, wherein the first node cluster has a first storage capacity to store a first quantity of data blocks; and
a cold storage tier implemented using storage of a data storage service; and
wherein the data processing service is further configured to:
maintain metadata comprising block identifiers for the first quantity of data blocks that fit within the first storage capacity of the warm storage tier;
maintain a counter for a partition of the metadata, wherein the partition comprises a sub-set of the block identifiers for a sub-set of the first quantity of data blocks that would fit within a second storage capacity of a down-sized version of the warm storage tier; and
increment the counter, responsive to a query targeting a data block stored in the warm storage tier and having a block identifier included in the partition.

Clause 2. The system of clause 1, wherein the data processing service is further configured to:
maintain one or more additional counters for one or more additional partitions of the metadata, wherein the one or more additional partitions of the metadata comprise additional respective sub-sets of the block identifiers corresponding to one or more additional down-sized versions of the warm storage tier; and
increment a corresponding counter of the one or more additional counters, responsive to a query targeting a data block stored in the warm storage tier and having a block identifier included in a corresponding one of the one or more additional partitions.

Clause 3. The system of clause 2, wherein:
the second storage capacity corresponds to a storage capacity of a second node cluster comprising fewer nodes than the first node cluster; and
the one or more additional down-sized versions of the warm storage tier correspond to respective other storage capacities of other node clusters comprising other quantities of nodes less than a quantity of nodes of the second node cluster.

Clause 4. The system of clause 1, wherein the data processing service is further configured to:
determine a representative working set size based on a set of queries processed by the data processing service, wherein a working set comprises a set of data blocks used by the data processing service to process a given query of the set of queries; and
determine, based on the representative working set size, a size of the partition.

Clause 5. The system of clause 1, wherein the data storage service stores a data lake for a customer of the data processing service, and wherein the storage of the data storage service used to implement the cold storage tier comprises at least a portion of the data lake stored for the customer.

Clause 6. The system of clause 1, wherein the data processing service is further configured to:
maintain a second counter for a remainder of the metadata or for an un-partitioned version of the metadata; and
increment the second counter, responsive to a query targeting a data block stored in the warm storage tier and having a block identifier included in the remainder of the metadata or the un-partitioned version of the metadata,
wherein:
the first counter represents a hit count of the down-sized version of the warm storage tier, and
the second counter is used to determine a hit count for a current version of the warm storage tier without down-sizing.

Clause 7. The system of clause 6, wherein the data processing service is further configured to:
maintain, in one or more buffers of the warm storage tier, metadata comprising block identifiers for an additional number of data blocks that fit within an up-sized storage capacity of an up-sized version of the warm storage tier; and
responsive to a query targeting a data block stored in the cold storage tier with a respective block identifier in the one or more buffers of the warm storage tier, increment a third counter representing a number of block hits for the up-sized version of the warm storage tier.

Clause 8. A method, comprising:
storing data blocks, for use by a data processing service, in a plurality of storage tiers, wherein the plurality of storage tiers comprise at least:

a warm storage tier implemented using storage included in nodes of a first node cluster of the data processing service, wherein the first node cluster has a first storage capacity to store a first quantity of data blocks; and a cold storage tier implemented using additional storage separate from the nodes of the first node cluster;

maintaining metadata comprising block identifiers for the first quantity of data blocks that fit within the first storage capacity of the warm storage tier; and incrementing a counter, responsive to a query targeting a data block stored in the warm storage tier and having a block identifier included in a partition of the metadata, wherein the partition corresponds to a second storage capacity that is a sub-set of the first storage capacity.

Clause 9. The method of clause 8, further comprising:

determining a recommendation for projected performance of a re-sized node cluster having the second storage capacity, wherein the recommendation is based at least in part on a value of the counter.

Clause 10. The method of clause 8, further comprising:

maintaining one or more additional counters for one or more additional partitions of the metadata, wherein the one or more additional partitions comprise additional respective sub-sets of the block identifiers; and incrementing a corresponding counter of the one or more additional counters, responsive to a query targeting a data block stored in the warm storage tier and having a block identifier included in a corresponding one of the one or more additional partitions.

Clause 11. The method of clause 8, wherein maintaining the metadata comprising the block identifiers comprises:

ordering the block identifiers in the metadata based on:

respective quantities of queries received by the data processing service targeting blocks having the block identifiers; and elapsed amounts of time since a query targeting respective ones of the blocks having the block identifiers was received by the data processing service.

Clause 12. The method of clause 11, further comprising:

responsive to another query targeting a cold data block stored in the cold storage tier, evicting a warm data block from the warm storage tier to enable promotion of the cold data block, targeted by the query, to the warm storage tier;

evicting a block identifier of the warm data block from the metadata;

adding the cold data block, targeted by the query, to the warm storage tier as a promoted warm data block; and updating the metadata to include the block identifier for the cold data block that has been promoted to be a warm data block.

Clause 13. The method of clause 12, wherein the block identifier for the cold data block that is being promoted to be a warm data block is added to the metadata for the warm storage tier at a position behind one or more other block identifiers for one or more other blocks currently stored in the warm storage tier and having respective warm storage tier query hit counts greater than a hit count of the cold data block being promoted to be a warm data block.

Clause 14. The method of clause 13, wherein the block identifier for the cold data block that is being promoted to be a warm data block is added to the metadata for the warm storage tier at a position preceding the partition, and wherein updating the metadata to include the block identifier for the cold data block that has been promoted to be a warm data block, comprises:

changing at least one position of at least one existing block identifier in the metadata preceding the partition such that the at least one existing block identifier in the metadata is moved from not being included in the partition to being included in the partition.

Clause 15. The method of clause 13, wherein the block identifier for the cold data block that is being promoted to be a warm data block is added to the metadata for the warm storage tier at a position in the partition, and wherein updating the metadata to include the block identifier for the cold data block that has been promoted to be a warm data block, comprises:

evicting one other block identifier from the partition.

Clause 16. One or more non-transitory, computer-readable storage media storing program instructions that when executed on or across one or more processors, cause the one or more processors to:

cause data blocks to be stored in a plurality of storage tiers, wherein the plurality of storage tiers comprise at least:

a warm storage tier implemented using storage included in nodes of a first node cluster of a data processing service, wherein the first node cluster has a first storage capacity to store a first quantity of data blocks; and a cold storage tier implemented using storage of a data storage service;

maintain metadata comprising block identifiers for the first quantity of data blocks that fit within the first storage capacity of the warm storage tier; and increment a counter, responsive to a query targeting a data block stored in the warm storage tier and having a block identifier included in a partition of the metadata, wherein the partition corresponds to a second storage capacity that is a sub-set of the first storage capacity.

Clause 17. The one or more non-transitory, computer-readable media of clause 16, wherein the program instructions, when executed on or across the one or more processors, further cause the one or more processors to:

maintain a second counter for a remainder of the metadata or for an un-partitioned version of the metadata; and increment the second counter, responsive to a query targeting a data block stored in the warm storage tier and having a block identifier included in the remainder of the metadata or the un-partitioned version of the metadata, wherein:

the first counter represents a hit count of the down-sized version of the warm storage tier, and the second counter is used to determine a hit count for a current version of the warm storage tier without down-sizing.

Clause 18. The one or more non-transitory, computer-readable media of clause 17, wherein the program instructions, when executed on or across the one or more processors, further cause the one or more processors to:

maintain one or more additional counters for one or more additional partitions of the metadata, wherein the one or more additional partitions comprise additional respective sub-sets of the block identifiers; and increment a corresponding counter of the one or more additional counters, responsive to a query targeting a data block stored in the warm storage tier and having a block identifier included in a corresponding one of the one or more additional partitions.

Clause 19. The one or more non-transitory, computer-readable media of clause 18, wherein the program instructions, when executed on or across the one or more processors, further cause the one or more processors to:
provide a recommendation for a number of nodes to be included in a node cluster used to implement the warm storage tier based on respective counts of the first counter, the second counter, and the one or more additional counters.

Clause 20. The one or more non-transitory, computer-readable media of clause 19, wherein the recommendation is additionally based on computing capacity of the nodes to be included in the first node cluster and communication bandwidth of the nodes to be included in the first node cluster.

Clause 21. A system, comprising:
one or more computing devices configured to implement a data processing service, wherein the data processing service uses a plurality of storage tiers to store data blocks, the plurality of storage tiers comprising at least:
a warm storage tier implemented using storage included in nodes of a node cluster of the data processing service, wherein the node cluster has a first storage capacity to store a first quantity of data blocks; and
a cold storage tier implemented using storage of a data storage service; and
wherein the data processing service is further configured to:
maintain, in one or more buffers of the warm storage tier, metadata comprising block identifiers for an additional number of data blocks that are in addition to the first quantity of data blocks stored in the warm storage tier;
responsive to a query targeting a data block stored in the cold storage tier with a respective block identifier included in the one or more buffers of the warm storage tier, increment a counter corresponding to the block identifier for the data block targeted by the query; and
promote the data block, targeted by the query, from the cold storage tier to the warm storage tier, in response to the counter corresponding to the block identifier exceeding a threshold count, wherein the threshold count is two or more.

Clause 22. The system of clause 21, wherein the data processing service is further configured to:
maintain additional metadata for the first quantity of data blocks stored in the warm storage tier, wherein the additional metadata comprises block identifiers and corresponding block query hit counters for the respective ones of the first quantity of data blocks stored in the warm storage tier; and
flag, upon eviction from the warm storage tier, respective ones of the data block identifiers with associated counters that indicate a single query hit for a corresponding data block while the corresponding data block was stored in the warm storage tier,
wherein the metadata maintained in the one or more buffers indicates respective ones of the data block identifiers that have been flagged as only receiving a single query hit while stored in the warm storage tier,
wherein the metadata stored in the one or more buffers comprises respective counters for the flagged data blocks, wherein the respective counters indicate respective quantities of query hits for the flagged data blocks while the block identifiers for the flagged data blocks are included in the metadata of the one or more buffers, and
wherein the data block that is promoted in response to the counter corresponding to the block identifier for the data block exceeding the threshold count is a flagged data block.

Clause 23. The system of clause 21, wherein the data processing service is further configured to:
track, via the metadata maintained in the one or more buffers of the warm storage tier, respective elapsed times since the data blocks having block identifiers included in the one or more buffers of the warm storage tier have been accessed via the query or another given query.

Clause 24. The system of clause 23, wherein data processing service is configured to:
turn off, in response to not detecting thrashing, a requirement for promotion to the warm storage tier that data blocks be targeted by queries at least a number of times exceeding the threshold count while stored in the cold storage tier and while having corresponding block identifiers included in the metadata stored in the one or more buffers of the warm storage tier; and
turn on, in response to detecting thrashing, the requirement that the data blocks be targeted by queries at least the number of times exceeding the threshold count while stored in the cold storage tier and while having corresponding block identifiers included in the metadata stored in the one or more buffers of the warm storage tier
wherein, elapsed times less than a time threshold indicates thrashing of one or more data blocks of the first quantity of data blocks between the warm storage tier and the cold storage tier.

Clause 25. The system of clause 21, wherein the data processing service is further configured to:
provide a recommendation to re-configure the node cluster having the first storage capacity based on the respective elapsed times tracked via the metadata, wherein a given elapsed time less than a time threshold indicates thrashing of one or more data blocks of the first quantity of data blocks between the warm storage tier and the cold storage tier.

Clause 26. The system of clause 25, wherein the data processing service is further configured to:
adjust the threshold count for promotion from the cold storage tier to the warm storage tier for data blocks having block identifiers included in the metadata stored in the one or more buffers based on detection of thrashing.

Clause 27. The system of clause 21, wherein the data processing service is further configured to:
provide an application programmatic interface (API) configured to:
receive a customer indication to turn on or off a requirement that data blocks be targeted by a query at least a number of times exceeding the threshold count while stored in the cold storage tier and while having corresponding block identifiers stored included in the metadata stored in the one or more buffers of the warm storage tier.

Clause 28. The system of clause 27, wherein the data processing service is further configured to:
provide an application programmatic interface (API) configured to:

receive a customer-defined configuration for the threshold count used to determine whether a data block stored in the cold storage tier and having a data block identifier included in the metadata stored in the one or more buffers of the warm storage tier is to be promoted to the warm storage tier.

Clause 29. The system of clause 21, wherein the additional number of data blocks represent a number of data blocks that would fit within a second storage capacity of a re-sized node cluster of the warm storage tier.

Clause 30. The system of clause 29, wherein the data processing service is further configured to: responsive to the query targeting the data block stored in the cold storage tier with the respective block identifier in the one or more buffers of the warm storage tier, increment another counter representing a number of block hits for the re-sized node cluster.

Clause 31. A method comprising:
storing data blocks, for use by a data processing service, in a plurality of storage tiers, wherein the plurality of storage tiers comprise at least:
  a warm storage tier implemented using storage included in nodes of a node cluster of the data processing service, wherein the node cluster has a storage capacity to store a first quantity of data blocks; and
  a cold storage tier implemented using storage of a data storage service;
maintaining, in one or more buffers of the warm storage tier, metadata comprising block identifiers for an additional number of data blocks; and
tracking, via the metadata maintained in the one or more buffers of the warm storage tier, respective elapsed times since the data blocks having block identifiers included in the one or more buffers of the warm storage tier have been accessed via a query.

Clause 32. The method of clause 31, further comprising:
providing a recommendation to re-configure the node cluster having the first storage capacity based on the respective elapsed times tracked via the metadata, wherein a given elapsed time less than a time threshold indicates thrashing of one or more data blocks of the first quantity of data blocks between the warm storage tier and the cold storage tier.

Clause 33. The method of clause 31, further comprising:
responsive to a query targeting a data block stored in the cold storage tier with a respective block identifier included in the one or more buffers of the warm storage tier, incrementing a counter corresponding to the block identifier for the data block targeted by the query; and
promoting the data block targeted by the query from the cold storage tier to the warm storage tier, in response to the counter corresponding to the block identifier exceeding a threshold count, wherein the threshold count is two or more.

Clause 34. The method of clause 33, further comprising:
adjusting the threshold count for promotion from the cold storage tier to the warm storage tier for data blocks having block identifiers included in the metadata stored in the one or more buffers based on detection of thrashing.

Clause 35. The method of clause 33, further comprising:
turning off, in response to not detecting thrashing, a requirement for promotion to the war storage tier that data blocks be targeted by queries at least a number of times exceeding a threshold count while stored in the cold storage tier and while having corresponding block identifiers included in the metadata stored in the one or more buffers of the warm storage tier; and
turning on, in response to detecting thrashing, the requirement that the data blocks be targeted by a query at least the number of times exceeding the threshold count while stored in the cold storage tier and while having corresponding block identifiers stored included in the metadata stored in the one or more buffers of the warm storage tier
wherein, elapsed times less than a time threshold indicates thrashing of one or more data blocks of the first quantity of data blocks between the warm storage tier and the cold storage tier.

Clause 36. One or more non-transitory, computer-readable, storage media storing program instructions that, when executed on or across one or more processors, cause the one or more processors to:
maintain, in one or more buffers of a warm storage tier, metadata comprising block identifiers for an additional number of data blocks that are in addition to a first quantity of data blocks stored in the warm storage tier;
responsive to a query targeting a data block stored in a cold storage tier with a respective block identifier included in the one or more buffers of the warm storage tier, increment a counter corresponding to the block identifier for the data block targeted by the query; and
promote the data block targeted by the query from the cold storage tier to the warm storage tier, in response to the counter corresponding to the block identifier exceeding a threshold count, wherein the threshold count is two or more.

Clause 37. The one or more non-transitory, computer-readable media of clause 36, wherein the program instructions, when executed on or across the one or more processors, further cause the one or more processors to:
maintain additional metadata for the first quantity of data blocks stored in the warm storage tier, wherein the additional metadata comprises block identifiers and corresponding block query hit counters for the respective ones of the first quantity of data blocks stored in the warm storage tier; and
flag, upon eviction from the warm storage tier, respective ones of the data block identifiers with associated counters that indicate a single query hit for a corresponding data block while the corresponding data block was stored in the warm storage tier,
wherein the metadata maintained in the one or more buffers indicates respective ones of the data block identifiers that have been flagged as only receiving a single query hit while stored in the warm storage tier, and
wherein the metadata stored in the one or more buffers comprises respective counters for the flagged data blocks, wherein the respective counters indicate respective quantities of query hits for the flagged data blocks while the block identifiers for the flagged data blocks are included in the metadata of the one or more buffers.

Clause 38. The one or more non-transitory, computer-readable media of clause 37, wherein the program instructions, when executed on or across the one or more processors, further cause the one or more processors to:
track, via the metadata maintained in the one or more buffers of the warm storage tier, respective elapsed times since the data blocks having block identifiers included in the one or more buffers of the warm storage tier have been accessed via the query or another given query.

Clause 39. The one or more non-transitory, computer-readable media of clause 37, wherein the program instructions, when executed on or across the one or more processors, further cause the one or more processors to:
  turn off, in response to not detecting thrashing, a requirement for promotion to the warm storage tier that data blocks be targeted by queries at least a number of times exceeding the threshold count while stored in the cold storage tier and while having corresponding block identifiers included in the metadata stored in the one or more buffers of the warm storage tier; and
  turn on, in response to detecting thrashing, the requirement that the data blocks be targeted by queries at least the number of times exceeding the threshold count while stored in the cold storage tier and while having corresponding block identifiers included in the metadata stored in the one or more buffers of the warm storage tier
  wherein, elapsed times less than a time threshold indicates thrashing of one or more data blocks of the first quantity of data blocks between the warm storage tier and the cold storage tier.

Clause 40. The one or more non-transitory, computer-readable media of clause 37, wherein the program instructions, when executed on or across the one or more processors, further cause the one or more processors to:
  providing a recommendation to re-configure a node cluster of the warm storage tier based on the respective elapsed times tracked via the metadata, wherein a given elapsed time less than a time threshold indicates thrashing of one or more data blocks of the first quantity of data blocks between the warm storage tier and the cold storage tier.

Embodiments of up-sizing or down-sizing prediction and/or thrashing detection or avoidance for managed databases as described herein may be executed on one or more computer systems, which may interact with various other devices. One such computer system is illustrated by FIG. 24. In different embodiments, computer system 2400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2400 includes one or more processors 2410 coupled to a system memory 2420 via an input/output (I/O) interface 2430. Computer system 2400 further includes a network interface 2440 coupled to I/O interface 2430, and one or more input/output devices 2450, such as cursor control device 2460, keyboard 2470, and display(s) 2480. Display(s) 2480 may include standard computer monitor(s) and/or other display systems, technologies or devices. In at least some implementations, the input/output devices 2450 may also include a touch- or multi-touch enabled device such as a pad or tablet via which a user enters input via a stylus-type device and/or one or more digits. In some embodiments, it is contemplated that embodiments may be implemented using a single instance of computer system 2400, while in other embodiments multiple such systems, or multiple nodes making up computer system 2400, may host different portions or instances of embodiments. For example, in one embodiment some elements may be implemented via one or more nodes of computer system 2400 that are distinct from those nodes implementing other elements.

In various embodiments, computer system 2400 may be a uniprocessor system including one processor 2410, or a multiprocessor system including several processors 2410 (e.g., two, four, eight, or another suitable number). Processors 2410 may be any suitable processor capable of executing instructions. For example, in various embodiments, processors 2410 may be general-purpose or embedded processors implementing any of a variety of instruction set architectures (ISAs), such as the x86, PowerPC, SPARC, or MIPS ISAs, or any other suitable ISA. In multiprocessor systems, each of processors 2410 may commonly, but not necessarily, implement the same ISA.

In some embodiments, at least one processor 2410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2420 may store program instructions and/or data accessible by processor 2410. In various embodiments, system memory 2420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2420 as program instructions 2425 and data storage 2435, respectively. In other embodiments, program instructions and/or data may be received, sent or stored upon different types of computer-accessible media or on similar media separate from system memory 2420 or computer system 2400. Generally speaking, a non-transitory, computer-readable storage medium may include storage media or memory media such as magnetic or optical media, e.g., disk or CD/DVD-ROM coupled to computer system 2400 via I/O interface 2430. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2440.

In one embodiment, I/O interface 2430 may coordinate I/O traffic between processor 2410, system memory 2420, and any peripheral devices in the device, including network interface 2440 or other peripheral interfaces, such as input/output devices 2450. In some embodiments, I/O interface 2430 may perform any necessary protocol, timing or other data transformations to convert data signals from one component (e.g., system memory 2420) into a format suitable for use by another component (e.g., processor 2410). In some embodiments, I/O interface 2430 may include support for devices attached through various types of peripheral buses, such as a variant of the Peripheral Component Interconnect (PCI) bus standard or the Universal Serial Bus (USB) standard, for example. In some embodiments, the function of I/O interface 2430 may be split into two or more separate components, such as a north bridge and a south bridge, for example. In addition, in some embodiments some or all of the functionality of I/O interface 2430, such as an interface to system memory 2420, may be incorporated directly into processor 2410.

Network interface 2440 may allow data to be exchanged between computer system 2400 and other devices attached to a network, such as other computer systems, or between nodes of computer system 2400. In various embodiments, network interface 2440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2450 may, in some embodiments, include one or more display terminals, keyboards, keypads, touchpads, scanning devices, voice or optical recognition devices, or any other devices suitable for entering or retrieving data by one or more computer system 2400. Multiple input/output devices 2450 may be present in computer system 2400 or may be distributed on various nodes of computer system 2400. In some embodiments, similar input/output devices may be separate from computer system 2400 and may interact with one or more nodes of computer system 2400 through a wired or wireless connection, such as over network interface 2440.

Figure 24:
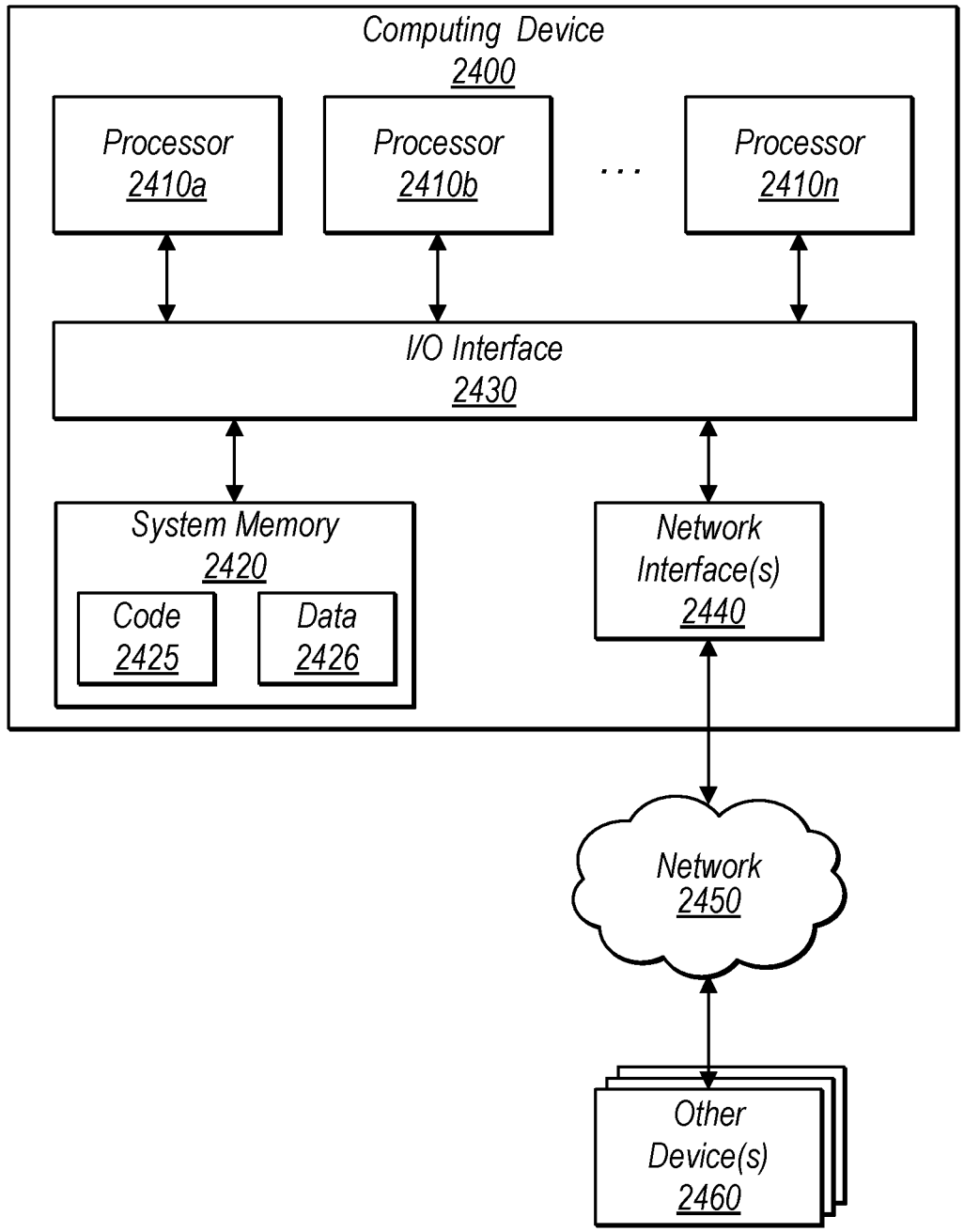
FIG. 24 is a block diagram illustrating an example computing device that may be used in at least some embodiments.

As shown in FIG. 24, memory 2420 may include program instructions 2425, that implement the various methods and techniques as described herein, and data storage 2435, comprising various data accessible by program instructions 2425. In one embodiment, program instructions 2425 may include software elements of embodiments as described herein and as illustrated in the Figures. Data storage 2435 may include data that may be used in embodiments. In other embodiments, other or different software elements and data may be included.

Those skilled in the art will appreciate that computer system 2400 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2400 may be transmitted to computer system 2400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices configured to implement
a data processing service, wherein the data processing service uses a plurality of storage tiers to store data blocks, the plurality of storage tiers comprising at least:
a warm storage tier implemented using storage included in nodes of a first node cluster of the data processing service, wherein
the first node cluster has a first storage capacity to store a first quantity of data blocks; and
a cold storage tier implemented using storage of a data storage service; and
wherein the data processing service is further configured to:
maintain, in one or more buffers of the warm storage tier, metadata comprising block identifiers for an additional number of data blocks that fit within a second storage capacity of a re-sized node cluster of the warm storage tier; and
responsive to a query targeting a data block stored in the cold storage tier with a respective block identifier in the one or more buffers of the warm storage tier, increment a counter representing a number of block hits for the re-sized node cluster having the second storage capacity to store the additional number of data blocks.

2. The system of claim 1, wherein the data processing service is further configured to:
responsive to the query targeting the data block stored in the cold storage tier with the respective block identifier in one of the one or more buffers of the warm storage tier, evict a first data block from the warm storage tier to enable promotion of the data block, targeted by the query, to the warm storage tier; and
evict the respective block identifier of the data block, targeted by the query, from the one or more buffers to enable addition of a block identifier, to the one or more buffers, for the first data block evicted from the warm storage tier.

3. The system of claim 1, wherein the data processing service is further configured to:
responsive to another query targeting a data block stored in the cold storage tier without a block identifier in the one or more buffers of the warm storage tier,
evict a first data block from the warm storage tier to enable promotion of the data block, targeted by the other query, to the warm storage tier; and
evict a block identifier of a second data block, maintained in the one or more buffers, to enable addition of a block identifier for the first data block evicted from the warm storage tier.

4. The system of claim 1, wherein the data processing service is further configured to:
maintain, in a first level of the one or more buffers, the metadata comprising the block identifiers for the additional number of data blocks that fit within the second storage capacity of the re-sized node cluster of the warm storage tier; and
maintain, in a second level of the one or more buffers, metadata comprising block identifiers for another number of data blocks that fit within a third storage capacity of another re-sized node cluster of the warm storage tier.

5. The system of claim 4, wherein the data processing service is further configured to:
responsive to the query targeting the data block stored in the cold storage tier with the respective block identifier in one of the one or more buffers of the warm storage tier,
evict a first data block from the warm storage tier to enable promotion of the data block, targeted by the query, to the warm storage tier; and
evict the respective block identifier of the data block, targeted by the query, from the one or more buffers to enable addition of a block identifier, to the first level of the one or more buffers, for the first data block evicted from the warm storage tier.

6. The system of claim 4, wherein the data processing service is further configured to:
responsive to another query targeting a data block stored in the cold storage tier without a block identifier in the first or second levels of the one or more buffers of the warm storage tier,
evict a first data block from the warm storage tier to enable promotion of the data block, targeted by the other query, to the warm storage tier;
evict a block identifier of a second data block, maintained in the first level of the one or more buffers, to enable addition of a block identifier for the first data block evicted from the warm storage tier to the first level of the one or more buffers; and
evict a block identifier of a third data block, maintained in the second level of the one or more buffers, to enable addition of the block identifier of the second data block to the second level of the one or more buffers.

7. A method, comprising:
storing data blocks, for use by a data processing service, in a plurality of storage tiers, wherein the plurality of storage tiers comprise at least:
a warm storage tier implemented using storage included in nodes of a first node cluster of the data processing service, wherein the first node cluster has a first storage capacity to store a first quantity of data blocks; and
a cold storage tier implemented using storage of a data storage service;
maintaining, in one or more buffers of the warm storage tier, metadata comprising block identifiers for an additional number of data blocks that fit within a second storage capacity of a re-sized node cluster of the warm storage tier; and
responsive to a query targeting a data block stored in the cold storage tier with a respective block identifier in the one or more buffers of the warm storage tier, incrementing a counter representing a number of block hits for the re-sized node cluster having the second storage capacity to store the additional number of data blocks.

8. The method of claim 7, further comprising determining a recommendation for projected performance of the re-sized node cluster, wherein the recommendation is based at least in part on a value of the counter.

9. The method of claim 8, wherein the recommendation is additionally based on computing capacity of the nodes in the first node cluster and communication bandwidth of the nodes in the first node cluster.

10. The method of claim 7, wherein the one or more buffers of the warm storage tier are located in respective nodes of the first node cluster.

11. The method of claim 7, wherein the one or more buffers of the warm storage tier are located in a leader node of the first node cluster.

12. The method of claim 7, further comprising:
responsive to the query targeting the data block stored in the cold storage tier with the respective block identifier in one of the one or more buffers of the warm storage tier,
evicting a first data block from the warm storage tier to enable promotion of the data block, targeted by the query, to the warm storage tier; and
evicting the respective block identifier of the data block, targeted by the query, from the one or more buffers to enable addition of a block identifier, to the one or more buffers, for the first data block evicted from the warm storage tier.

13. The method of claim 7, further comprising:
responsive to another query targeting a data block stored in the cold storage tier without a block identifier in the one or more buffers of the warm storage tier,
evicting a first data block from the warm storage tier to enable promotion of the data block, targeted by the other query, to the warm storage tier; and
evicting a block identifier of a second data block, maintained in the one or more buffers, to enable addition of a block identifier for the first data block evicted from the warm storage tier.

14. The method of claim 7, further comprising:
maintaining, in a first level of the one or more buffers, the metadata comprising the block identifiers for the additional number of data blocks that fit within the second storage capacity of the re-sized node cluster of the warm storage tier; and
maintaining, in a second level of the one or more buffers, metadata comprising block identifiers for another number of data blocks that fit within a third storage capacity of another re-sized node cluster of the warm storage tier.

15. The method of claim 14, wherein the data processing service is further configured to:
responsive to another query targeting a data block stored in the cold storage tier without a block identifier in the first or second levels of the one or more buffers of the warm storage tier,
evicting a first data block from the warm storage tier to enable promotion of the data block, targeted by the other query, to the warm storage tier;
evicting a block identifier of a second data block, maintained in the first level of the one or more buffers, to enable addition of a block identifier for the first data block evicted from the warm storage tier to the first level of the one or more buffers; and
evicting a block identifier of a third data block, maintained in the second level of the one or more buffers, to enable addition of the block identifier of the second data block to the second level of the one or more buffers.

16. The method of claim 14, wherein the data processing service is further configured to:
responsive to the query targeting the data block stored in the cold storage tier with the respective block identifier in one of the one or more buffers of the warm storage tier, evicting a first data block from the warm storage tier to enable promotion of the data block, targeted by the query, to the warm storage tier; and
evicting the respective block identifier of the data block, targeted by the query, from the one or more buffers to enable addition of a block identifier, to the first level of the one or more buffers, for the first data block evicted from the warm storage tier.

17. The method of claim 7, wherein the second storage capacity to store the additional number of data blocks corresponds to one or more additional nodes being included in the re-sized node cluster.

18. The method of claim 7, wherein:
the second storage capacity to store the additional number of data blocks corresponds to one or more respective increases to respective storage capacities of one or more respective nodes of the first node cluster; and
the additional number of data blocks are stored using the respective storage capacities of the one or more respective nodes of the first node cluster that have been increased.

19. One or more non-transitory, computer-readable storage media storing program instructions that when executed on or across one or more processors, cause the one or more processors to:
store data blocks, for use by a data processing service, in a plurality of storage tiers, wherein the plurality of storage tiers comprise at least:
a warm storage tier implemented using storage included in nodes of a first node cluster of the data processing service, wherein the first node cluster has a first storage capacity to store a first quantity of data blocks; and
a cold storage tier implemented using storage of a data storage service;
maintain, in one or more buffers of the warm storage tier, metadata comprising block identifiers for an additional number of data blocks that fit within a second storage capacity of a re-sized node cluster of the warm storage tier; and
responsive to a query targeting a data block stored in the cold storage tier with a respective block identifier in the one or more buffers of the warm storage tier, increment a counter representing a number of block hits for the re-sized node cluster having the second storage capacity to store the additional number of blocks.

20. The one or more non-transitory, computer-readable storage media of claim 19, wherein the program further calls the processors to:
maintain, in a first level of the one or more buffers, the metadata comprising the block identifiers for the additional number of data blocks that fit within the second storage capacity of the re-sized node cluster of the warm storage tier; and
maintain, in a second level of the one or more buffers, metadata comprising block identifiers for another number of data blocks that fit within a third storage capacity of another re-sized node cluster of the warm storage tier.

* * * * *